United States Patent
Ramohalli Gopala Rao et al.

(10) Patent No.: US 11,989,101 B2
(45) Date of Patent: *May 21, 2024

(54) DATA STORAGE MANAGEMENT SYSTEM FOR MULTI-CLOUD PROTECTION, RECOVERY, AND MIGRATION OF DATABASES-AS-A-SERVICE (DBAAS) AND/OR SERVERLESS DATABASE MANAGEMENT SYSTEMS (DBMS)

(71) Applicant: Commvault Systems, Inc., Tinton Falls, NJ (US)

(72) Inventors: Girish Ramohalli Gopala Rao, Tinton Falls, NJ (US); Sunil Babu Telagamsetti, Telangana (IN); Brahmaiah Vallabhaneni, Marlboro, NJ (US); David Alan Oshinsky, East Brunswick, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/586,580

(22) Filed: Jan. 27, 2022

(65) Prior Publication Data

US 2022/0147422 A1 May 12, 2022

Related U.S. Application Data

(63) Continuation of application No. 16/711,209, filed on Dec. 11, 2019, now Pat. No. 11,269,734.
(Continued)

(51) Int. Cl.
*A61N 1/00* (2006.01)
*G06F 9/455* (2018.01)
(Continued)

(52) U.S. Cl.
CPC ...... *G06F 11/1464* (2013.01); *G06F 9/45558* (2013.01); *G06F 11/1446* (2013.01);
(Continued)

(58) Field of Classification Search
CPC .. G06F 11/1464; G06F 16/285; G06F 16/214; G06F 9/45558; G06F 11/1446;
(Continued)

(56) References Cited

U.S. PATENT DOCUMENTS

| | | |
|---|---|---|
| 4,686,620 A | 8/1987 | Ng |
| 4,995,035 A | 2/1991 | Cole et al. |

(Continued)

FOREIGN PATENT DOCUMENTS

| | | |
|---|---|---|
| EP | 0259912 | 3/1988 |
| EP | 0405926 | 1/1991 |

(Continued)

OTHER PUBLICATIONS

U.S. Appl. No. 16/907,023, filed Jun. 19, 2020, Owen et al.
(Continued)

*Primary Examiner* — Isaac M Woo
(74) *Attorney, Agent, or Firm* — Commvault Systems, Inc.

(57) ABSTRACT

A streamlined approach enables customers to retain management control over their data in a database-as-a-service ("DBaaS") setting, by providing managed backup copies outside cloud service providers' sphere of control. An illustrative data storage management system provides control over performing backup operations to generate managed backup copies, storing managed backup copies, recovering managed backup copies in whole or in part, migrating managed backup copies, and migrating DBaaS instances. Management control also extends to choices of where to store the managed backup copies, whether on the same cloud
(Continued)

computing platform as the source DBaaS, on a different cloud computing platform, and/or in a non-cloud data center.

20 Claims, 37 Drawing Sheets

Related U.S. Application Data

(60) Provisional application No. 62/862,558, filed on Jun. 17, 2019.

(51) Int. Cl.
  *G06F 11/14* (2006.01)
  *G06F 16/21* (2019.01)
  *G06F 16/28* (2019.01)
  *H04L 67/10* (2022.01)
  *H04L 67/30* (2022.01)

(52) U.S. Cl.
  CPC ........ *G06F 11/1451* (2013.01); *G06F 16/214* (2019.01); *G06F 16/285* (2019.01); *H04L 67/10* (2013.01); *H04L 67/30* (2013.01); *G06F 2009/45562* (2013.01); *G06F 2201/80* (2013.01); *G06F 2201/82* (2013.01)

(58) Field of Classification Search
  CPC ....... G06F 11/1451; G06F 2009/45562; G06F 2201/80; G06F 2201/82; H04L 67/10; H04L 67/30
  USPC .................................................. 707/600–899
  See application file for complete search history.

(56) References Cited

U.S. PATENT DOCUMENTS

| | | | |
|---|---|---|---|
| 5,005,122 A | 4/1991 | Griffin et al. |
| 5,093,912 A | 3/1992 | Dong et al. |
| 5,123,107 A | 6/1992 | Mensch, Jr. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,619,644 A | 4/1997 | Crockett et al. |
| 5,638,509 A | 6/1997 | Dunphy et al. |
| 5,664,204 A | 9/1997 | Wang |
| 5,673,381 A | 9/1997 | Huai et al. |
| 5,699,361 A | 12/1997 | Ding et al. |
| 5,729,743 A | 3/1998 | Squibb |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,327,590 B1 | 12/2001 | Chidlovskii et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,564,228 B1 | 5/2003 | O'Connor |
| 6,658,526 B2 | 12/2003 | Nguyen et al. |
| 6,941,429 B1 | 9/2005 | Kamvysselis et al. |
| 6,959,327 B1 | 10/2005 | Vogl |
| 6,973,555 B2 | 12/2005 | Fujiwara |
| 7,000,238 B2 | 2/2006 | Nadler |
| 7,035,880 B1 | 4/2006 | Crescenti |
| 7,079,341 B2 | 7/2006 | Kistler et al. |
| 7,096,418 B1 | 8/2006 | Singhal |
| 7,107,298 B2 | 9/2006 | Prahlad |
| 7,130,272 B1 | 10/2006 | Gai et al. |
| 7,143,203 B1 | 11/2006 | Altmejd |
| 7,225,220 B2 | 5/2007 | Gonzalez et al. |
| 7,246,207 B2 | 7/2007 | Kottomtharayil |
| 7,260,633 B2 | 8/2007 | Lette |
| 7,315,923 B2 | 1/2008 | Retnamma et al. |
| 7,334,144 B1 | 2/2008 | Schlumberger |
| 7,340,616 B2 | 3/2008 | Rothman et al. |
| 7,343,356 B2 | 3/2008 | Prahlad |
| 7,343,453 B2 | 3/2008 | Prahlad |
| 7,346,751 B2 | 3/2008 | Prahlad |
| 7,366,846 B2 | 4/2008 | Boyd et al. |
| 7,386,744 B2 | 6/2008 | Barr |
| 7,395,282 B1 | 7/2008 | Crescenti |
| 7,448,079 B2 | 11/2008 | Tremain |
| 7,472,079 B2 | 12/2008 | Fellenstein |
| 7,483,895 B2 | 1/2009 | Hysom |
| 7,502,820 B2 | 3/2009 | Manders |
| 7,516,346 B2 | 4/2009 | Pinheiro et al. |
| 7,516,348 B1 | 4/2009 | Ofer |
| 7,526,798 B2 | 4/2009 | Chao |
| 7,529,782 B2 | 5/2009 | Prahlad et al. |
| 7,546,475 B2 | 6/2009 | Mayo et al. |
| 7,587,570 B2 | 9/2009 | Sarkar et al. |
| 7,617,191 B2 | 11/2009 | Wilbrink et al. |
| 7,617,262 B2 | 11/2009 | Prahlad et al. |
| 7,627,827 B2 | 12/2009 | Taylor et al. |
| 7,631,351 B2 | 12/2009 | Erofeev |
| 7,651,593 B2 | 1/2010 | Prahlad |
| 7,653,668 B1 | 1/2010 | Shelat |
| 7,668,884 B2 | 2/2010 | Prahlad |
| 7,685,269 B1 | 3/2010 | Thrasher et al. |
| 7,694,070 B2 | 4/2010 | Mogi |
| 7,734,669 B2 | 6/2010 | Kottomtharayil et al. |

(56) References Cited

U.S. PATENT DOCUMENTS

| | | |
|---|---|---|
| 7,739,548 B2 | 6/2010 | Goodrum et al. |
| 7,747,579 B2 | 6/2010 | Prahlad et al. |
| 7,761,736 B2 | 7/2010 | Nguyen et al. |
| 7,765,167 B2 | 7/2010 | Prahlad |
| 7,769,616 B2 | 8/2010 | Ollivier |
| 7,778,984 B2 | 8/2010 | Zhang |
| 7,792,789 B2 | 9/2010 | Prahlad |
| 7,797,453 B2 | 9/2010 | Meier et al. |
| 7,814,149 B1 | 10/2010 | Stringham |
| 7,814,351 B2 | 10/2010 | Redlich et al. |
| 7,818,082 B2 | 10/2010 | Roumeliotis et al. |
| 7,822,967 B2 | 10/2010 | Fung |
| 7,840,537 B2 | 11/2010 | Gokhale |
| 7,882,077 B2 | 2/2011 | Gokhale |
| 7,899,788 B2 | 3/2011 | Chadhok et al. |
| 7,917,438 B2 | 3/2011 | Kenedy et al. |
| 7,975,061 B1 | 7/2011 | Gokhale et al. |
| 7,996,270 B2 | 8/2011 | Sundaresan |
| 8,001,277 B2 | 8/2011 | Mega |
| 8,037,028 B2 | 10/2011 | Prahlad |
| 8,065,166 B2 | 11/2011 | Maresh |
| 8,108,427 B2 | 1/2012 | Prahlad |
| 8,112,605 B2 | 2/2012 | Kavuri |
| 8,134,727 B1 | 3/2012 | Shmunis |
| 8,140,786 B2 | 3/2012 | Bunte |
| 8,156,086 B2 | 4/2012 | Lu et al. |
| 8,170,995 B2 | 5/2012 | Prahlad et al. |
| 8,219,524 B2 | 7/2012 | Gokhale |
| 8,230,195 B2 | 7/2012 | Amarendran et al. |
| 8,266,406 B2 | 9/2012 | Kavuri |
| 8,285,681 B2 | 10/2012 | Prahlad |
| 8,296,534 B1 | 10/2012 | Gupta et al. |
| 8,307,177 B2 | 11/2012 | Prahlad |
| 8,316,091 B2 | 11/2012 | Hirvela et al. |
| 8,321,688 B2 | 11/2012 | Auradkar |
| 8,352,608 B1 | 1/2013 | Keagy et al. |
| 8,364,652 B2 | 1/2013 | Vijayan et al. |
| 8,364,802 B1 | 1/2013 | Keagy et al. |
| 8,370,307 B2 | 2/2013 | Wolfe |
| 8,396,838 B2 | 3/2013 | Brockway et al. |
| 8,407,190 B2 | 3/2013 | Prahlad |
| 8,417,697 B2 | 4/2013 | Ghemawat et al. |
| 8,429,630 B2 | 4/2013 | Nickolov |
| 8,434,131 B2 | 4/2013 | Varadharajan et al. |
| 8,510,573 B2 | 8/2013 | Muller |
| 8,527,549 B2 | 9/2013 | Cidon |
| 8,566,362 B2 | 10/2013 | Mason et al. |
| 8,578,120 B2 | 11/2013 | Attarde et al. |
| 8,612,439 B2 | 12/2013 | Prahlad |
| 8,626,741 B2 | 1/2014 | Vijakumar et al. |
| 8,635,184 B2 | 1/2014 | Hsu et al. |
| 8,660,038 B1 | 2/2014 | Pascazio |
| 8,674,823 B1 | 3/2014 | Contrario et al. |
| 8,683,103 B2 | 3/2014 | Ripberger |
| 8,707,070 B2 | 4/2014 | Muller |
| 8,769,048 B2 | 7/2014 | Kottomtharayil |
| 8,780,400 B2 | 7/2014 | Shmunis |
| 8,799,242 B2 | 8/2014 | Leonard et al. |
| 8,849,761 B2 | 9/2014 | Prahlad |
| 8,849,955 B2 | 9/2014 | Prahlad |
| 8,924,511 B2 | 12/2014 | Brand |
| 8,938,481 B2 | 1/2015 | Kumarasamy et al. |
| 8,950,009 B2 | 2/2015 | Vijayan et al. |
| 8,954,446 B2 | 2/2015 | Vijayan et al. |
| 9,020,900 B2 | 4/2015 | Vijayan et al. |
| 9,021,282 B2 | 4/2015 | Muller et al. |
| 9,021,307 B1 | 4/2015 | Parameswaran et al. |
| 9,098,495 B2 | 8/2015 | Gokhale |
| 9,189,170 B2 | 11/2015 | Kripalani et al. |
| 9,195,636 B2 | 11/2015 | Smith |
| 9,239,687 B2 | 1/2016 | Vijayan et al. |
| 9,262,496 B2 | 2/2016 | Kumarasamy et al. |
| 9,307,177 B2 | 4/2016 | Park et al. |
| 9,336,226 B2 | 5/2016 | Vibhor et al. |
| 9,436,555 B2 | 9/2016 | Dornemann et al. |
| 9,444,811 B2 | 9/2016 | Nara et al. |
| 9,454,537 B2 | 9/2016 | Prahlad et al. |
| 9,633,033 B2 | 4/2017 | Vijayan et al. |
| 9,641,388 B2 | 5/2017 | Kripalani et al. |
| 9,648,100 B2 | 5/2017 | Klose et al. |
| 9,766,825 B2 | 9/2017 | Bhagi et al. |
| 9,852,026 B2 | 12/2017 | Mitkar et al. |
| 9,959,333 B2 | 5/2018 | Kumarasamy |
| 10,228,962 B2 | 3/2019 | Dornemann et al. |
| 10,248,657 B2 | 4/2019 | Prahlad et al. |
| 10,255,143 B2 | 4/2019 | Vijayan et al. |
| 10,264,074 B2 | 4/2019 | Vijayan et al. |
| 10,296,368 B2 | 5/2019 | Dormemann et al. |
| 10,346,259 B2 | 7/2019 | Gokhale et al. |
| 10,379,598 B2 | 8/2019 | Muller |
| 10,387,073 B2 | 8/2019 | Bhagi et al. |
| 10,387,266 B2 | 8/2019 | Kumarasamy et al. |
| 10,592,145 B2 | 3/2020 | Bedadala et al. |
| 10,592,350 B2 | 3/2020 | Dornemann |
| 10,664,352 B2 | 5/2020 | Rana |
| 10,684,924 B2 | 6/2020 | Kilaru et al. |
| 10,740,193 B2 | 8/2020 | Dhatrak |
| 10,768,971 B2 | 9/2020 | Dornemann et al. |
| 10,776,329 B2 | 9/2020 | Rao et al. |
| 11,223,535 B2 | 1/2022 | Parvathamvenkatas |
| 11,269,734 B2 | 3/2022 | Ramohalli Gopala Rao et al. |
| 11,321,188 B2 | 5/2022 | Mitkar |
| 11,442,896 B2 | 9/2022 | Agrawal |
| 11,461,184 B2 * | 10/2022 | Ramohalli Gopala Rao ............... H04L 69/04 |
| 11,467,753 B2 | 10/2022 | Kilaru |
| 11,513,922 B2 | 11/2022 | Kumar |
| 11,570,243 B2 | 1/2023 | Camargos |
| 11,656,784 B2 | 5/2023 | Ashraf |
| 11,748,143 B2 | 9/2023 | Kumar |
| 2002/0035511 A1 | 3/2002 | Haji |
| 2002/0083079 A1 | 6/2002 | Meier et al. |
| 2002/0095609 A1 | 7/2002 | Tokunaga |
| 2002/0129047 A1 | 9/2002 | Cane |
| 2002/0129106 A1 | 9/2002 | Gutfreund |
| 2002/0194033 A1 | 12/2002 | Huff |
| 2002/0194511 A1 | 12/2002 | Swoboda |
| 2003/0140068 A1 | 7/2003 | Yeung |
| 2003/0200222 A1 | 10/2003 | Feinberg |
| 2004/0210724 A1 | 10/2004 | Koning et al. |
| 2005/0076251 A1 | 4/2005 | Barr |
| 2005/0268121 A1 | 12/2005 | Rothman et al. |
| 2005/0289414 A1 | 12/2005 | Adya |
| 2006/0058994 A1 | 3/2006 | Ravi |
| 2006/0101174 A1 | 5/2006 | Kanamaru |
| 2006/0190775 A1 | 8/2006 | Aggarwal et al. |
| 2006/0206507 A1 | 9/2006 | Dahbour |
| 2006/0224846 A1 | 10/2006 | Amarendran |
| 2006/0236073 A1 | 10/2006 | Soules |
| 2006/0242356 A1 | 10/2006 | Mogi et al. |
| 2006/0245411 A1 | 11/2006 | Chen et al. |
| 2006/0251067 A1 | 11/2006 | Desanti |
| 2007/0073970 A1 | 3/2007 | Yamazaki |
| 2007/0079156 A1 | 4/2007 | Fujimoto |
| 2007/0101173 A1 | 5/2007 | Fung |
| 2007/0168606 A1 | 7/2007 | Takai |
| 2007/0234302 A1 | 10/2007 | Suzuki |
| 2008/0005168 A1 | 1/2008 | Huff et al. |
| 2008/0010521 A1 | 1/2008 | Goodrum et al. |
| 2008/0147460 A1 | 6/2008 | Ollivier |
| 2008/0162592 A1 | 7/2008 | Huang |
| 2008/0183891 A1 | 7/2008 | Ni |
| 2008/0228771 A1 | 9/2008 | Prahlad |
| 2008/0244032 A1 | 10/2008 | Gilson |
| 2008/0244177 A1 | 10/2008 | Crescenti |
| 2008/0256384 A1 | 10/2008 | Branson et al. |
| 2008/0270461 A1 | 10/2008 | Gordon |
| 2008/0301479 A1 | 12/2008 | Wood |
| 2009/0077443 A1 | 3/2009 | Nguyen et al. |
| 2009/0198677 A1 | 8/2009 | Sheehy |
| 2009/0198825 A1 | 8/2009 | Miller |
| 2009/0210464 A1 | 8/2009 | Chiang-Lin |
| 2009/0268903 A1 | 10/2009 | Bojinov et al. |
| 2009/0282020 A1 | 11/2009 | McSheffrey |

(56) References Cited

U.S. PATENT DOCUMENTS

| | | |
|---|---|---|
| 2009/0287665 A1 | 11/2009 | Prahlad |
| 2009/0319534 A1 | 12/2009 | Gokhale |
| 2009/0327477 A1 | 12/2009 | Madison, Jr |
| 2010/0023722 A1 | 1/2010 | Tabbara |
| 2010/0064033 A1 | 3/2010 | Travostino |
| 2010/0070448 A1 | 3/2010 | Omoigui |
| 2010/0070466 A1 | 3/2010 | Prahlad |
| 2010/0070474 A1 | 3/2010 | Lad |
| 2010/0070725 A1 | 3/2010 | Prahlad |
| 2010/0082672 A1 | 4/2010 | Kottomtharayil |
| 2010/0082700 A1 | 4/2010 | Parab |
| 2010/0082713 A1 | 4/2010 | Frid-Nielsen et al. |
| 2010/0162002 A1 | 6/2010 | Dodgson et al. |
| 2010/0190478 A1 | 7/2010 | Brewer |
| 2010/0235333 A1 | 9/2010 | Bates |
| 2010/0257403 A1 | 10/2010 | Virk et al. |
| 2010/0269164 A1 | 10/2010 | Sosnosky et al. |
| 2010/0274772 A1 | 10/2010 | Samuels |
| 2010/0318782 A1 | 12/2010 | Auradkar et al. |
| 2010/0332401 A1 | 12/2010 | Prahlad |
| 2010/0333116 A1 | 12/2010 | Prahlad |
| 2011/0010518 A1 | 1/2011 | Kavuri et al. |
| 2011/0022642 A1 | 1/2011 | DeMilo et al. |
| 2011/0040824 A1 | 2/2011 | Harm |
| 2011/0055161 A1 | 3/2011 | Wolfe |
| 2011/0191544 A1 | 8/2011 | Naga et al. |
| 2011/0276713 A1 | 11/2011 | Brand |
| 2011/0277027 A1 | 11/2011 | Hayton et al. |
| 2012/0054626 A1 | 3/2012 | Odenheimer |
| 2012/0084262 A1 | 4/2012 | Dwarampudi et al. |
| 2012/0110186 A1 | 5/2012 | Kapur et al. |
| 2012/0131645 A1 | 5/2012 | Harm |
| 2012/0240183 A1 | 9/2012 | Sinha |
| 2013/0007245 A1 | 1/2013 | Malik et al. |
| 2013/0035795 A1 | 2/2013 | Pfeiffer et al. |
| 2013/0125198 A1 | 5/2013 | Ferguson et al. |
| 2013/0238572 A1 | 9/2013 | Prahlad et al. |
| 2013/0238969 A1 | 9/2013 | Smith |
| 2013/0262385 A1 | 10/2013 | Vibhor et al. |
| 2013/0297902 A1 | 11/2013 | Collins et al. |
| 2013/0326279 A1 | 12/2013 | Chavda et al. |
| 2014/0189432 A1 | 7/2014 | Gokhale et al. |
| 2014/0283010 A1 | 9/2014 | Rutkowski et al. |
| 2014/0380014 A1 | 12/2014 | Moyer |
| 2015/0113055 A1 | 4/2015 | Vijayan et al. |
| 2015/0127967 A1 | 5/2015 | Dutton |
| 2015/0198995 A1 | 7/2015 | Muller et al. |
| 2016/0005707 A1 | 1/2016 | Kwon et al. |
| 2016/0042090 A1 | 2/2016 | Mitkar et al. |
| 2016/0057077 A1 | 2/2016 | Gomatam et al. |
| 2016/0100013 A1 | 4/2016 | Vijayan et al. |
| 2016/0350391 A1 | 12/2016 | Vijayan et al. |
| 2017/0039218 A1 | 2/2017 | Prahlad |
| 2017/0126807 A1 | 5/2017 | Vijayan et al. |
| 2017/0235647 A1 | 8/2017 | Kilaru et al. |
| 2018/0285383 A1 | 10/2018 | Nara |
| 2018/0375938 A1 | 12/2018 | Vijayan et al. |
| 2019/0108341 A1 | 4/2019 | Bedhapudi et al. |
| 2019/0179805 A1 | 6/2019 | Prahlad et al. |
| 2019/0182325 A1 | 6/2019 | Vijayan et al. |
| 2019/0278662 A1 | 9/2019 | Nagrale et al. |
| 2019/0303246 A1 | 10/2019 | Gokhale et al. |
| 2020/0034248 A1 | 1/2020 | Nara |
| 2020/0073574 A1 | 3/2020 | Pradhan |
| 2020/0097369 A1 | 3/2020 | Kilaru |
| 2020/0117641 A1 | 4/2020 | Mitkar et al. |
| 2020/0162551 A1 | 5/2020 | Vijayan et al. |
| 2020/0278915 A1 | 9/2020 | Degaonkar et al. |
| 2020/0319694 A1 | 10/2020 | Mohanty et al. |
| 2020/0349027 A1 | 11/2020 | Bansod et al. |
| 2020/0394107 A1 | 12/2020 | Rao et al. |
| 2020/0394110 A1 | 12/2020 | Ramohalli Gopala Rao et al. |
| 2021/0026982 A1 | 1/2021 | Amarendran et al. |
| 2021/0040949 A1 | 2/2021 | Nickel et al. |
| 2021/0049079 A1 | 2/2021 | Kumar et al. |
| 2021/0089215 A1 | 3/2021 | Ashraf et al. |
| 2021/0173744 A1 | 6/2021 | Aggarwal et al. |
| 2021/0218636 A1 | 7/2021 | Parvathamvenkatas et al. |
| 2021/0255771 A1 | 8/2021 | Kilaru et al. |
| 2021/0271564 A1 | 9/2021 | Mitkar et al. |
| 2021/0397522 A1 | 12/2021 | Owen |
| 2021/0409499 A1 | 12/2021 | Brazeau et al. |
| 2022/0147422 A1 | 5/2022 | Ramohalli Gopala Rao et al. |

FOREIGN PATENT DOCUMENTS

| | | |
|---|---|---|
| EP | 0467546 | 1/1992 |
| EP | 0774715 | 5/1997 |
| EP | 0809184 | 11/1997 |
| EP | 817040 | 1/1998 |
| EP | 0899662 | 3/1999 |
| EP | 0981090 | 2/2000 |
| WO | WO 951/3580 | 5/1995 |
| WO | WO 99/12098 | 3/1999 |

OTHER PUBLICATIONS

U.S. Appl. No. 17/130,540, filed Dec. 22, 2020, Kumar et al.
U.S. Appl. No. 63/082,631, filed Sep. 24, 2020, Kavaipatti Anantharamakrishnan et al.
Armstead et al., "Implementation of a Campwide Distributed Mass Storage Service: The Dream vs. Reality," IEEE, Sep. 11-14, 1995, pp. 190-199.
Bates, S. et al., "Sharepoint 2007 User's Guide," pp. 1-88, 2007, Springer-Verlag New York, Inc., 104 pages.
Brandon, J., "Virtualization Shakes Up Backup Strategy," <http://www.computerworld.com>, internet accessed on Mar. 6, 2008, 3 pages.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Chiappetta, Marco, "ESA Enthusiast System Architecture," <http://hothardware.com/Articles/NVIDIA_ESA_Enthusiast_System_Architecture/>, Nov. 5, 2007, 2 pages.
CommVault Systems, Inc., "A CommVault White Paper: VMware Consolidated Backup (VCB) Certification Information Kit," 2007, 23 pages.
CommVault Systems, Inc., "CommVault Solutions—VMware," <http://www.commvault.com/solutions/vmware/>, internet accessed Mar. 24, 2008, 2 pages.
CommVault Systems, Inc., "Enhanced Protection and Manageability of Virtual Servers," Partner Solution Brief, 2008, 6 pages.
Davis, D., "3 VMware Consolidated Backup (VCB) Utilities You Should Know," Petri IT Knowlegebase, <http://www.petri.co.il/vmware-consolidated-backup-utilities.htm>, internet accessed on Jul. 14, 2008, Jan. 7, 2008.
Davis, D., "Understanding VMware VMX Configuration Files," Petri IT Knowledgebase, <http://www.petri.co.il/virtual_vmware_vmx_configuration_files.htm>, internet accessed on Jun. 19, 2008, 6 pages.
Davis, D., "VMware Server & Workstation Disk Files Explained," Petri IT Knowledgebase, <http://www.petri.co.il/virtual_vmware_files_explained.htm>, internet accessed on Jun. 19, 2008, 5 pages.
Davis, D., "VMware Versions Compared," Petri IT Knowledgebase, <http://www.petri.co.il/virtual_vmware_versions_compared.htm>, internet accessed on Apr. 28, 2008, 6 pages.
Eitel, "Backup and Storage Management in Distributed Heterogeneous Environments," IEEE, Jun. 12-16, 1994, pp. 124-126.
Gait, J., "The Optical File Cabinet: A Random-Access File System for Write-Once Optical Disks," IEEE Computer, vol. 21, No. 6, pp. 11-22 (Jun. 1988).
Jander, M., "Launching Storage-Area Net," Data Communications, US, McGraw Hill, NY, vol. 27, No. 4 (Mar. 21, 1998), pp. 64-72.
Microsoft Corporation, "How NTFS Works," Windows Server TechCenter, updated Mar. 28, 2003, internet accessed Mar. 26, 2008, 26 pages.

(56) References Cited

OTHER PUBLICATIONS

Rosenblum et al., "The Design and Implementation of a Log-Structured File System," Operating Systems Review SIGOPS, vol. 25, No. 5, New York, US, pp. 1-15 (May 1991).
Sanbarrow.com, "Disktype-table," <http://sanbarrow.com/vmdk/disktypes.html>, internet accessed on Jul. 22, 2008, 4 pages.
Sanbarrow.com, "Files Used by a VM," <http://sanbarrow.com/vmx/vmx-files-used-by-a-vm.html>, internet accessed on Jul. 22, 2008, 2 pages.
Sanbarrow.com, "Monolithic Versus Split Disks," <http://sanbarrow.com/vmdk/monolithicversusspllit.html>, internet accessed on Jul. 14, 2008, 2 pages.
VMware, Inc., "Open Virtual Machine Format," <http://www.vmware.com/appliances/learn/ovf.html>, internet accessed on May 6, 2008, 2 pages.
VMware, Inc., "OVF, Open Virtual Machine Format Specification, version 0.9," White Paper, <http://www.vmware.com>, 2007, 50 pages.
VMware, Inc., "Understanding VMware Consolidated Backup," White Paper, <http://www.vmware.com>, 2007, 11 pages.
VMware, Inc., "Using VMware Infrastructure for Backup and Restore," Best Practices, <http://www.vmware.com>, 2006, 20 pages.
VMware, Inc., "Virtual Disk API Programming Guide," <http://www.vmware.com>, Revision Apr. 11, 2008, 2008, 44 pages.
VMware, Inc., "Virtual Disk Format 1.1," VMware Technical Note, <http://www.vmware.com>, Revision Nov. 13, 2007, Version 1.1, 2007, 18 pages.
VMware, Inc., "Virtual Machine Backup Guide, ESX Server 3.0.1 and VirtualCenter 2.0.1," <http://www.vmware.com>, updated Nov. 21, 2007, 74 pages.
VMware, Inc., "Virtual Machine Backup Guide, ESX Server 3.5, ESX Server 3i version 3.5, VirtualCenter 2.5," <http://www.vmware.com>, updated Feb. 21, 2008, 78 pages.
VMware, Inc., "Virtualized iSCSI SANS: Flexible, Scalable Enterprise Storage for Virtual Infrastructures," White Paper, <http://www.vmware.com>, Mar. 2008, 13 pages.
VMware, Inc., "VMware Consolidated Backup, Improvements in Version 3.5," Information Guide, <http://www.vmware.com>, 2007, 11 pages.
VMware, Inc., "VMware Consolidated Backup," Product Datasheet, <http://www.vmware.com>, 2007, 2 pages.
VMware, Inc., "VMware ESX 3.5," Product Datasheet, <http://www.vmware.com>, 2008, 4 pages.
VMware, Inc., "VMware GSX Server 3.2, Disk Types: Virtual and Physical," <http://www.vmware.com/support/gsx3/doc/disks_types_gsx.html>, internet accessed on Mar. 25, 2008, 2 pages.
VMware, Inc., "VMware OVF Tool," Technical Note, <http://www.vmware.com>, 2007, 4 pages.
VMware, Inc., "VMware Workstation 5.0, Snapshots in a Linear Process," <http://www.vmware.com/support/ws5/doc/ws_preserve_sshot_linear.html>, internet accessed on Mar. 25, 2008, 1 page.
VMware, Inc., "VMware Workstation 5.0, Snapshots in a Process Tree," <http://www.vmware.com/support/ws5/doc/ws_preserve_sshot_tree.html>, internet accessed on Mar. 25, 2008, 1 page.
VMware, Inc., "VMware Workstation 5.5, What Files Make Up a Virtual Machine?" <http://www.vmware.com/support/ws55/doc/ws_learning_files_in_a_vm.html>, internet accessed on Mar. 25, 2008, 2 pages.
Wikipedia, "Cloud computing," <http://en.wikipedia.org/wiki/Cloud_computing>, internet accessed Jul. 8, 2009, 13 pages.
Wikipedia, "Cluster (file system)," <http://en.wikipedia.org/wiki/Cluster_%28file_system%29>, internet accessed Jul. 25, 2008, 1 page.
Wikipedia, "Cylinder-head-sector," <http://en.wikipedia.org/wiki/Cylinder-head-sector>, internet accessed Jul. 22, 2008, 6 pages.
Wikipedia, "File Allocation Table," <http://en.wikipedia.org/wiki/File_Allocation_Table>, internet accessed on Jul. 25, 2008, 19 pages.
Wikipedia, "Logical Disk Manager," <http://en.wikipedia.org/wiki/Logical_Disk_Manager>, internet accessed Mar. 26, 2008, 3 pages.
Wikipedia, "Logical Volume Management," <http://en.wikipedia.org/wiki/Logical_volume_management>, internet accessed on Mar. 26, 2008, 5 pages.
Wikipedia, "Storage Area Network," <http://en.wikipedia.org/wiki/Storage_area_network>, internet accessed on Oct. 24, 2008, 5 pages.
Wikipedia, "Virtualization," <http://en.wikipedia.org/wiki/Virtualization>, internet accessed Mar. 18, 2008, 7 pages.
International Search Report and Written Opinion for PCT/US2011/054374, dated May 2, 2012, 9 pages.
U.S. Appl. No. 16/721,644, filed Dec. 19, 2019, Kumar et al.
U.S. Appl. No. 16/792,026, filed Feb. 14, 2020, Kilaru et al.
U.S. Appl. No. 16/868,964, filed May 7, 2020, Mitkar et al.
U.S. Appl. No. 16/914,020, filed Jun. 26, 2020, Amarendran et al.
U.S. Appl. No. 17/079,023, filed Oct. 23, 2020, Agrawal et al.
U.S. Appl. No. 17/114,296, filed Dec. 7, 2020, Ashraf et al.
U.S. Appl. No. 17/129,581, filed Dec. 21, 2020, Parvathamvenkatas et al.
Arneson, "Mass Storage Archiving in Network Environments," Digest of Papers, Ninth IEEE Symposium on Mass Storage Systems, Oct. 31, 1988Nov. 3, 1988, pp. 45-50, Monterey, CA.
Google Cloud Regions and Zones, accessed on https://cloud.google.com/compute/docs/regions-zones/, Apr. 26, 2019, available on https://web.archive.org/web/20190415102759/cloud.google.com/compute/docs/regions-zones/, Dec. 4, 2023, 30 pages.
Margaret Rouse, "Definition of Availability Zones", TechTarget, accessed on searchaws.techtarget.com/definition/availability-zones, Apr. 26, 2019, available on https://web.archive.org/web/20180911194556/https://searchaws.techtarget.com/definition/availability-zones, Dec. 4, 2023, 5 pages.
Mell et al., "The NIST Definition of Cloud Computing," NIST Special Publication, 2011.
VMware, Inc., "The Open Virtual Machine Format Whitepaper for OVF Specification, version 0.9," White Paper, <http://www.vmware.com>, 2007, 16 pages.
Watts et al. "SaaS vs PaaS vs IaaS: What's The Difference & How To Choose", BMC Blogs, BMC Software, Inc., accessed on https://www.bmc.com/blogs/saas-vs-paas-vs-iaas-whats-the-difference-and-how-to-choose/, Jun. 15, 2019, 18 Pages.

* cited by examiner

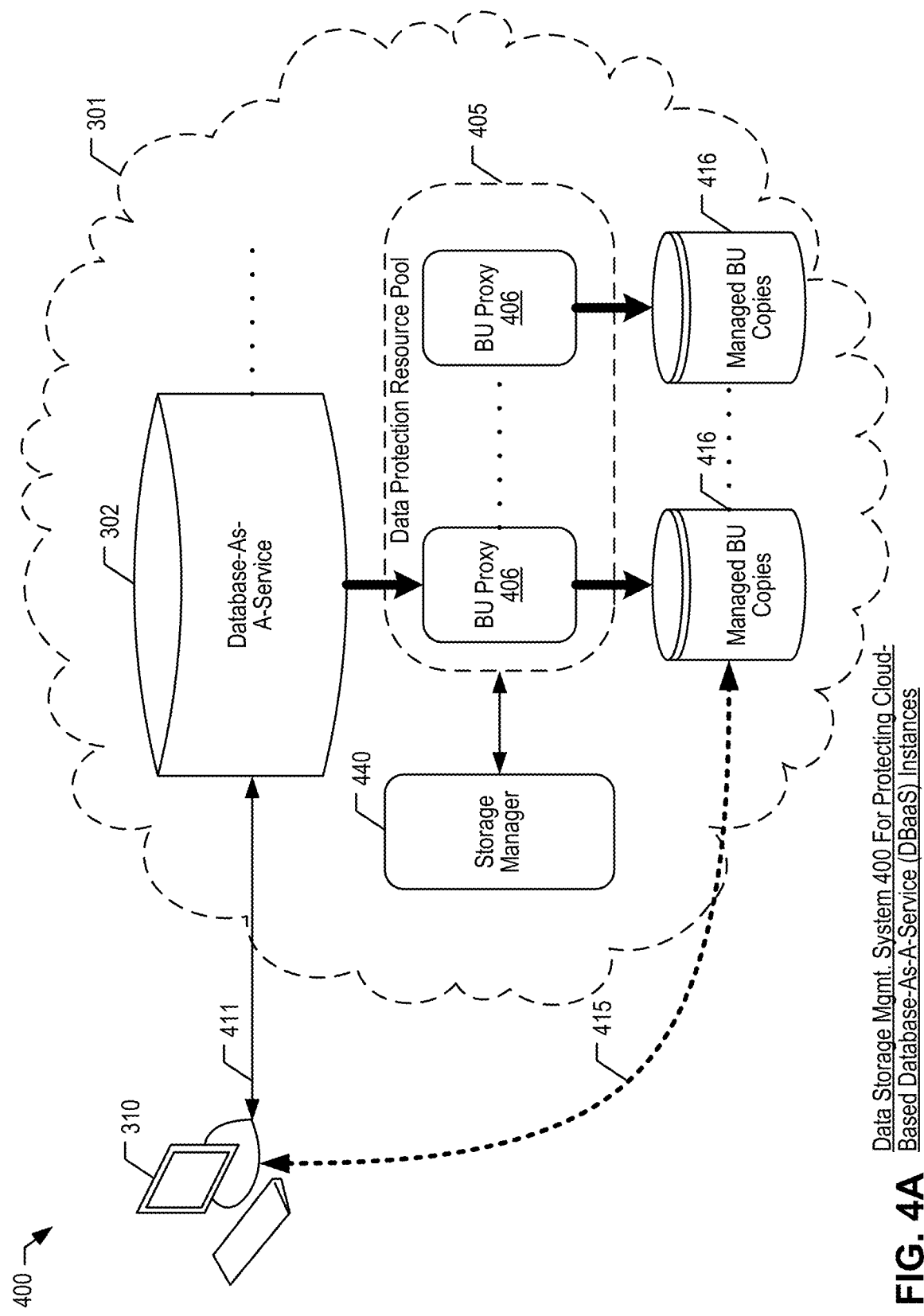
FIG. 4A  Data Storage Mgmt. System 400 For Protecting Cloud-Based Database-As-A-Service (DBaaS) Instances

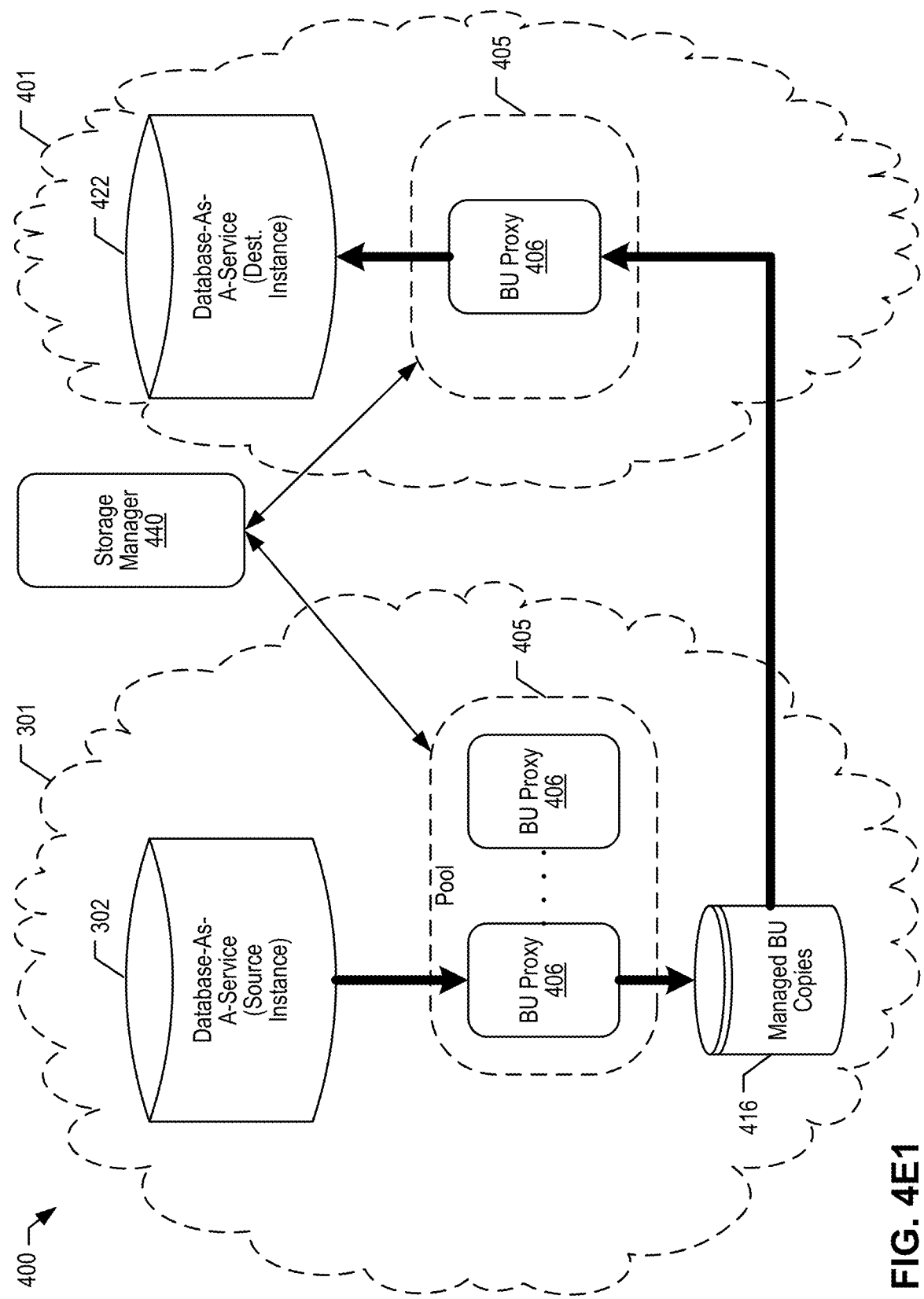
FIG. 4E1

FIG. 13G

DATA STORAGE MANAGEMENT SYSTEM FOR MULTI-CLOUD PROTECTION, RECOVERY, AND MIGRATION OF DATABASES-AS-A-SERVICE (DBAAS) AND/OR SERVERLESS DATABASE MANAGEMENT SYSTEMS (DBMS)

INCORPORATION BY REFERENCE TO ANY PRIORITY APPLICATIONS

This application is a Continuation of U.S. patent application Ser. No. 16/711,209 filed on Dec. 11, 2019, which claims the benefit of priority to U.S. Provisional Pat. App. No. 62/862,558, which was filed on Jun. 17, 2019. Any and all applications for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines (VMs), and so on as part of a daily, weekly, or monthly maintenance schedule. The company may similarly protect computing systems used by its employees, such as those used by an accounting department, marketing department, engineering department, and so forth.

The increasing availability and reliability of cloud-based platform-as-a-service solutions provides convenience to customers who do not wish to host their own database management systems (DBMS). Instead, cloud service providers such as Amazon AWS, Microsoft Azure, Oracle Cloud, Google Cloud, IBM Cloud, Alibaba Cloud, etc., provide readily available DBMS services in cloud computing environments. These are commonly known in the art as "database-as-a-service" (DBaaS) or "serverless DBMS" or "serverless cloud databases" or "cloud-native databases." Proprietary and open source DBMSs are available as DBaaS. Typically, a customer activates one or more instances of one or more desired DBaaS (e.g., MySQL, Oracle, PostgreSQL, Microsoft SQL, Aurora, Maria DB, Dynamo DB, Redshift, Data Lake, Microsoft Office 365 Suite, Cosmos DB, MongoDB, IBM DB2, etc.) in a cloud computing account, thus obtaining immediate access to a fully featured DBMS. The term "DBMS" is used herein to identify the kind of database management system (e.g., MySQL, Oracle, DB2, etc.), whereas the term "DBaaS" is used herein to refer to a DBMS served as a service in a cloud computing environment. Accordingly, a MySQL DBMS might execute as a first DBaaS instance, a PostgreSQL DBMS might execute as a second DBaaS instance, and a second PostgreSQL DBMS (the same or different version as the first) might execute as a third DBaaS instance. And so on.

However, the convenience of using DBaaS is overshadowed when cloud service providers do not offer transparency in protecting the DBaaS data. Typical DBaaS backups by cloud service providers are limited to snapshots of the DBaaS instance. The snapshots are useful for restoring data in case of a catastrophic failure, but the snapshots are otherwise opaque to DBaaS users. Customers who wish to manage the protection of their own data, including data in a DBaaS setting, need a more transparent solution.

SUMMARY

The present inventors devised a streamlined approach that enables customers to retain management control over their DBaaS data, by providing "managed backup copies" outside cloud service providers' sphere of control. An illustrative data storage management system provides control over performing backup operations to generate managed backup copies, storing managed backup copies, recovering managed backup copies in whole or in part, and migrating managed backup copies. Management control also extends to choices of where to store the managed backup copies, whether on the same cloud computing platform as the source DBaaS, on a different cloud computing platform, and/or in a non-cloud data center. Unlike the opaque "black box" snapshots offered by cloud service providers, the illustrative embodiments enable customers to use the managed backup copies to control access to backed up data and to further control when and where the data can be migrated and used.

Numerous advantages accrue to users of the illustrative data storage management system by way of the managed backup copies. Exemplary embodiments migrate DBaaS in-cloud from one instance to another, across cloud computing accounts, across cloud availability zones, and/or across cloud service providers, as well migrating to non-cloud data centers. In addition to control over storage, recovery, and migration of managed backup copies, the data storage management system offers other features for managed backup copies, e.g., restoring at certain levels of granularity, such as table-level restores. Managed backup copies are available for long-term retention, compliance purposes, legal hold, etc., which in some cases cannot be guaranteed by the cloud service provider. Furthermore, some customers prefer to have access to managed backup copies outside the cloud computing environment of the DBaaS. Exemplary embodiments can additionally leverage the opaque cloud-provided snapshots into managed backup copies controlled by the illustrative data storage management system.

An illustrative discovery utility collects version and configuration information about all DBaaS instances in a cloud computing account. The utility generates a "DBaaS catalog" comprising the collected DBaaS information. An illustrative storage manager processes the catalog's information to create an administrable "cloudDB entity" corresponding to each discovered DBaaS. The storage manager is a computing resource that is generally responsible for managing storage operations throughout the data storage management system. The storage manager executes on a non-virtualized computing device or on a virtual machine, in cloud or non-cloud environments, without limitation. The data storage management system creates preferences for treating the cloudDB entity, e.g., storage policies, retention policies, schedule policies, etc. The preferences also specify a "data protection resource pool" (or "pool") for performing storage operations upon the cloudDB entity, such as backups, restores, migrations, archiving, etc.

The data protection resource pool is a logical entity that corresponds to a set of virtual machines or other computing resources that are specially-equipped for interworking with and protecting the customer's DBaaS instances. Preferably, to achieve better performance, the pool's virtual machines are configured in the customer's cloud computing account. In some embodiments, the pool's virtual machines are in another cloud computing account or in a non-cloud data center. In some embodiments, non-virtualized computing devices are used instead of virtual machines to form the data protection resource pool. Each data protection resource, whether a virtual machine or a non-virtualized computing device, is configured according to a custom-configured "proxy image" profile that is based on the information in the DBaaS catalog.

An illustrative profiling utility analyzes the DBaaS catalog to identify all unique versions of the customer's DBaaS instances, e.g., MySQL 5.6, MySQL, 5.8, Oracle 12.0, PostgreSQL 9.6, etc. The profiling utility then gathers client binaries (i.e., executables) for each unique version identified from the DBaaS catalog. The utility then identifies data agents that are suitable for backing up and restoring the unique versions, e.g., data agent for MySQL, data agent for Oracle, data agent for PostgreSQL, etc. Binaries (executables) for each identified data agent are gathered. Finally, binaries are gathered for a media agent that will handle managed backup copies, including indexing of copies and transmission to/from secondary storage. All the gathered binaries are configured into the proxy image. Thus, the proxy image is custom-configured to encompass relevant executables needed for protecting the customer's particular DBaaS environment. The proxy image is then applied to all the data protection resources in the resource pool. Thus, in an exemplary virtualized data protection resource pool, every virtual machine is equipped with a set of DBMS executables, matching data agent executables, and media agent executables. Likewise, non-virtualized data protection computing devices also are equipped with a set of DBMS executables, matching data agent executables, and media agent executables. The executables will be invoked on demand at such time as a storage operation (e.g., backup, restore, migrate, etc.) is needed for one of the customer's DBaaS instances. The proxy image is upgradable over time to keep up with the customer's current DBaaS environment.

When a backup storage operation is triggered for a certain DBaaS instance, the storage manager selects a backup proxy from the pool, e.g., a cloud-based VM. Illustratively, the VM instance is powered up on-demand to act as the backup proxy, if it's not already powered on. The storage manager identifies a suitable data agent for the target DBaaS instance and instructs it to begin the storage operation in reference to the DBaaS instance, providing parameters (e.g., for compression, encryption, deduplication, etc.) and instructing the data agent to communicate with a media agent on the backup proxy. The storage manager instructs the media agent to communicate with the identified data agent and provides parameters (e.g., storage destination, compression, encryption, deduplication, etc.) for generating and storing backup copies.

On the backup proxy, the identified data agent activates the client binary corresponding to the DBaaS instance, thus executing a DBMS client locally on the backup proxy. The data agent instructs the DBMS client to establish communications with the target DBaaS instance and to invoke data extraction commands, e.g., data dump commands, directed to the DBaaS instance. The DBMS client illustratively employs DBMS-specific commands and/or application programming interfaces (APIs) for invoking data extraction at the DBaaS instance. Native DBaaS features ensure that the DBaaS instance is properly quiesced for data extraction and the DBaaS instance begins transmitting data to the client DBMS on the backup proxy. The data transmission from DBaaS instance to client DBMS uses DBaaS-specific formatting and sizing of data segments as they are extracted from the DBaaS instance. The data agent captures the data segments as they are received at the backup proxy and proceeds to process each one according to the instructions received from the storage manager, transmitting the processed data segments to the media agent. The media agent in turn further processes the data segments into individual backup copies (e.g., "segment backup copies") according to instructions received from the storage manager, stores each individual segment backup copy to secondary storage, and makes entries in a local index to associate and to track all the individual segment backup copies of the DBaaS. On completion, the set of individual segment backup copies are associated together to form a logical managed backup copy of the database data in the target DBaaS instance. On completion of the storage operation, the media agent reports success to the storage manager. The data agent instructs the client DBMS to disengage from the DBaaS instance. The DBaaS instance can resume normal operations at this point. The cloud VM hosting the backup proxy is powered down if no longer needed for other storage operations and can be powered on again later on demand.

The managed backup copy of the DBaaS is now under the control of the data storage management system. The managed backup copy can be copied again (e.g., into auxiliary copies, into archive copies, etc.) to storage within and outside the cloud computing environment of the DBaaS. To restore or migrate a managed backup copy, the storage manager once again selects a backup proxy and instructs a suitable data agent and media agent to restore/migrate the managed backup copy to the same DBaaS instance or to another target, reversing the backup operations. Again, the DBMS client at the backup proxy is used for transmitting data to the destination DBaaS or off-cloud DBMS.

By powering on and off the VMs that are equipped to act as backup proxies, the illustrative embodiments maintain a low-cost on-demand service model that can be contrasted to the prior art. Accordingly, the backup proxy VMs are preferably instantiated with the proxy image but kept in a powered off mode until needed for a backup, restore, or migration operation, after which they are powered down again. Powered up VMs are used sparingly to minimize the customer's cost of running the illustrative data storage management system, including generating and using managed backup copies.

A "cloud computing environment" as used herein comprises a collection (or suite) of resources provided as a service by the cloud service provider to a cloud service account. A cloud computing environment is accessed via the cloud service account that entitles the subscriber to a suite of services in a given cloud service supplied by a cloud service provider. Cloud computing environments vary among cloud services, among cloud availability zones, and even among cloud service accounts from the same cloud service provider. A cloud computing environment as used herein need not comprise data processing (computing) resources and can be limited to data storage and retrieval features. In the present context, a cloud computing environment is said to host DBaaS instances.

BRIEF DESCRIPTION OF THE DRAWINGS

FIG. 4A is a block diagram illustrating some salient portions of a system 400 for protecting cloud-based DBaaS according to an illustrative embodiment of the present invention, including in-cloud data storage management resources and managed backup copies.

FIG. 4E1 is a block diagram illustrating a configuration of system 400 supporting database migration to a destination outside the DBaaS cloud computing environment.

FIGS. 13A-13G depict illustrative screenshots of administrative features, such as in block 706 of method 700.

DETAILED DESCRIPTION

Detailed descriptions and examples of systems and methods according to one or more illustrative embodiments of the present invention may be found in the section entitled DATA STORAGE MANAGEMENT SYSTEM FOR PROTECTING CLOUD-BASED DATA INCLUDING DATABASES-AS-A-SERVICE, as well as in the section entitled Example Embodiments, and also in FIGS. 4A-13G herein. Furthermore, components and functionality for protecting cloud-based data, including databases-as-a-service, may be configured and/or incorporated into information management systems such as those described herein in FIGS. 1A-1H and 2A-2C, as well as FIG. 3.

Various embodiments described herein are intimately tied to, enabled by, and would not exist except for, computer technology. For example, protecting cloud-based data, including databases-as-a-service, described herein in reference to various embodiments cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
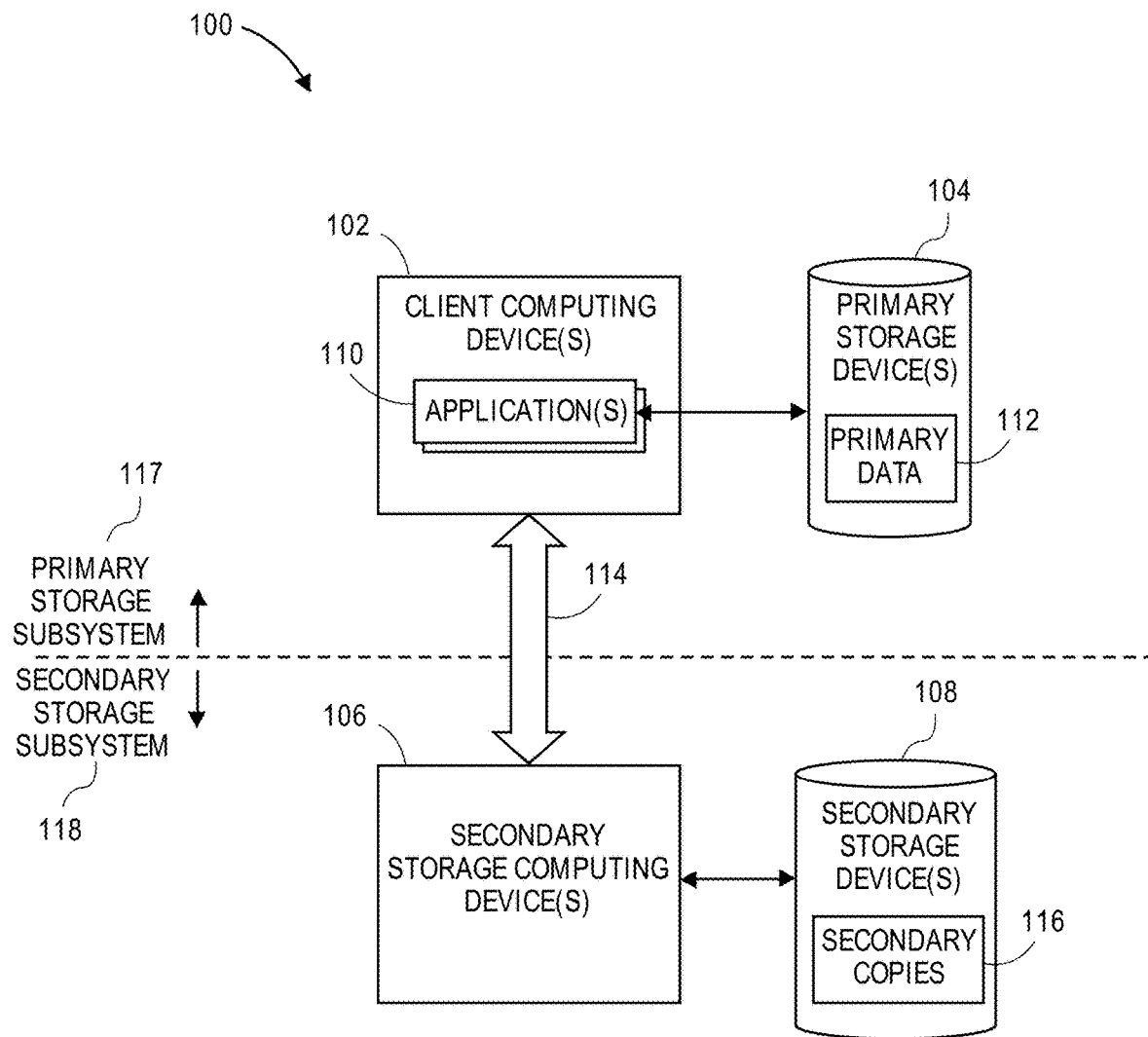
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. No. 9,633,033, entitled "High Availability Distributed Deduplicated Storage System";

U.S. Pat. Pub. No. 2006/0224846, entitled "System and Method to Support Single Instance Storage Operations";

U.S. Pat. Pub. No. 2016-0350391, entitled "Replication Using Deduplicated Secondary Copy Data";

U.S. Pat. Pub. No. 2017-0168903 A1, entitled "Live Synchronization and Management of Virtual Machines across Computing and Virtualization Platforms and Using Live Synchronization to Support Disaster Recovery";

U.S. Pat. Pub. No. 2017-0185488 A1, entitled "Application-Level Live Synchronization Across Computing Platforms Including Synchronizing Co-Resident Applications To Disparate Standby Destinations And Selectively Synchronizing Some Applications And Not Others";

U.S. Pat. Pub. No. 2017-0192866 A1, entitled "System For Redirecting Requests After A Secondary Storage Computing Device Failure";

U.S. Pat. Pub. No. 2017-0235647 A1, entitled "Data Protection Operations Based on Network Path Information"; and U.S. Pat. Pub. No. 2017-0242871 A1, entitled "Data Restoration Operations Based on Network Path Information".

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. AVM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, California; Microsoft Virtual Server and Microsoft Windows Server Hyper-V, both by Microsoft Corporation of Redmond, Washington; Sun xVM by Oracle America Inc. of Santa Clara, California; and Xen by Citrix Systems, Santa Clara, California The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1B:
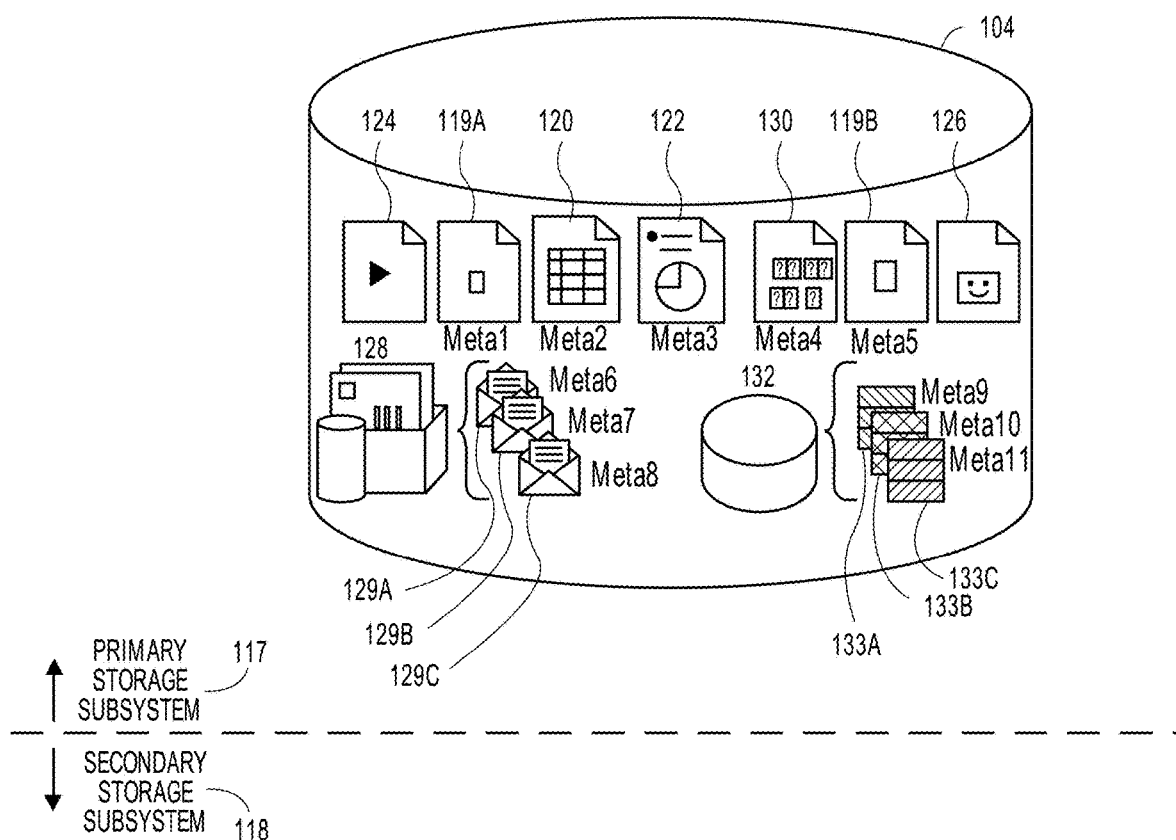
FIG. 1B is a detailed view of a primary storage device, a secondary storage device, and some examples of primary data and secondary copy data.
Figure 1B:
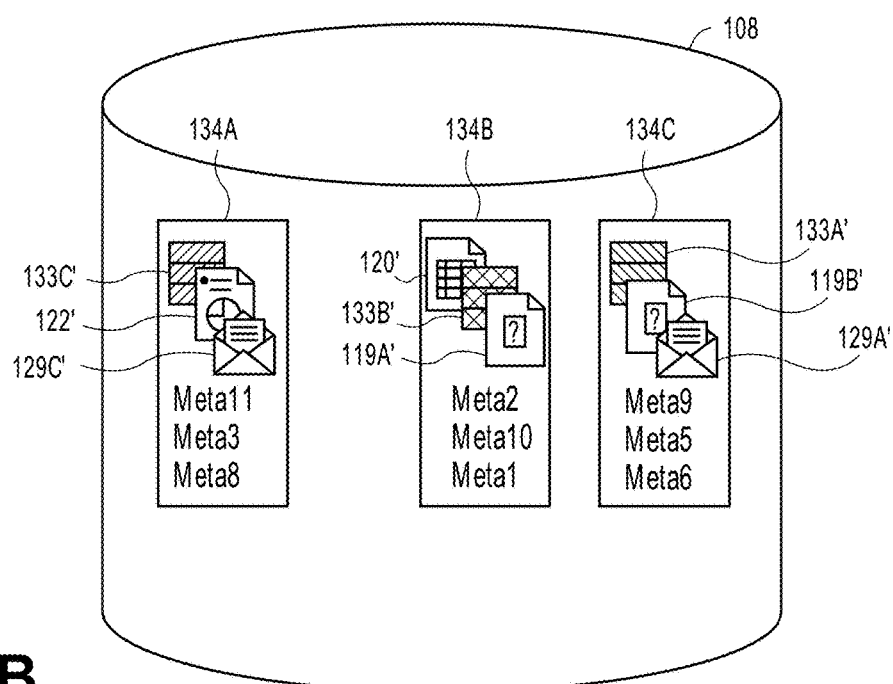
Figure 1C:
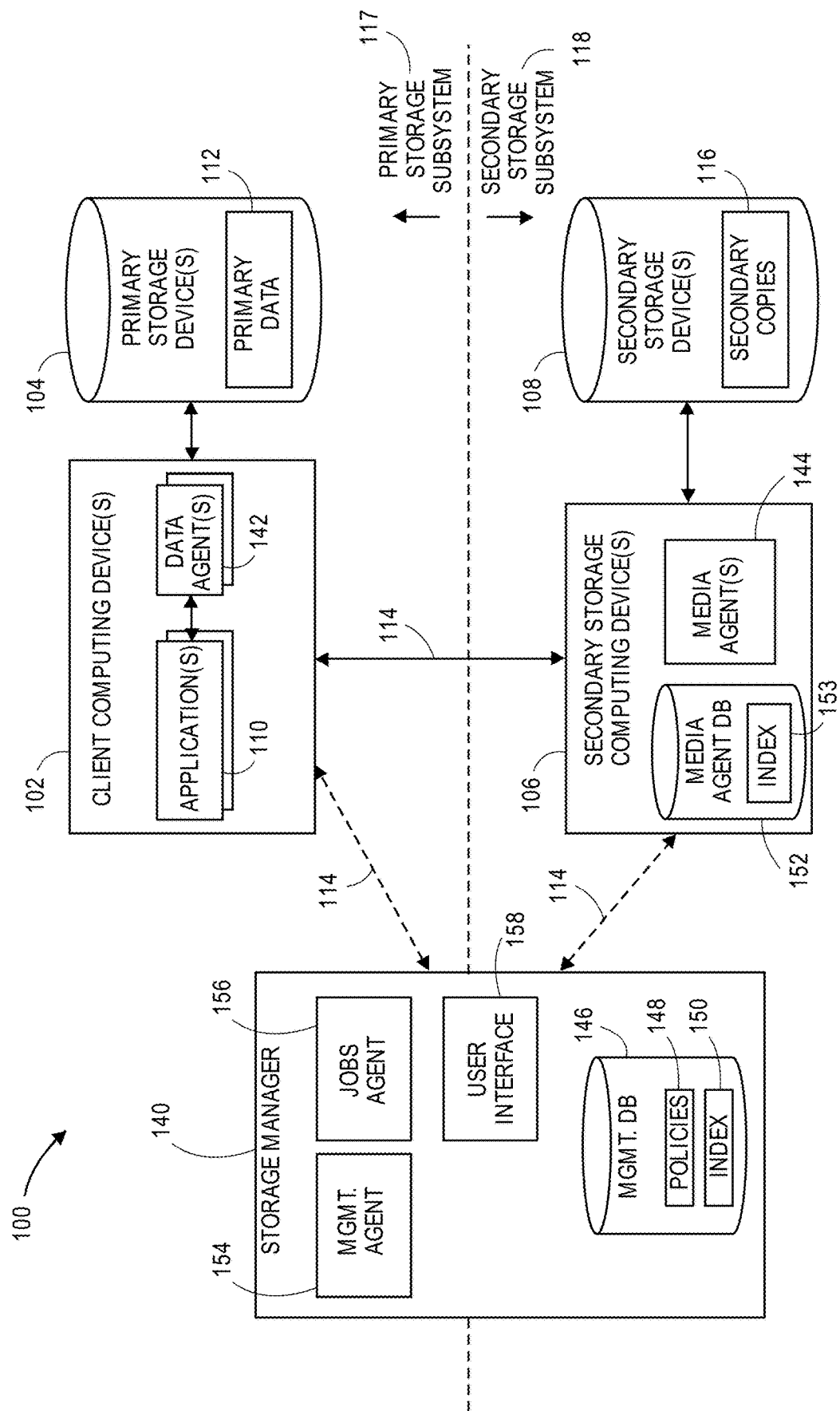
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise, secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110. Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or another non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

communicating with data agents 142 and media agents 144, including transmitting instructions, messages, and/or queries, as well as receiving status reports, index information, messages, and/or queries, and responding to same;

initiating execution of information management operations;

initiating restore and recovery operations;

managing secondary storage devices 108 and inventory/capacity of the same;

allocating secondary storage devices 108 for secondary copy operations;

reporting, searching, and/or classification of data in system 100;

monitoring completion of and status reporting related to information management operations and jobs;

tracking movement of data within system 100;

tracking age information relating to secondary copies 116, secondary storage devices 108, comparing the age information against retention guidelines, and initiating data pruning when appropriate;

tracking logical associations between components in system 100;

protecting metadata associated with system 100, e.g., in management database 146;

implementing job management, schedule management, event management, alert management, reporting, job history maintenance, user security management, disaster recovery management, and/or user interfacing for system administrators and/or end users of system 100;

sending, searching, and/or viewing of log files; and implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102 and process the data appropriately. For example, during a secondary copy operation, data agent 142 may arrange or assemble the data and metadata into one or more files having a certain format (e.g., a particular backup or archive format) before transferring the file(s) to a media agent 144 or another component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
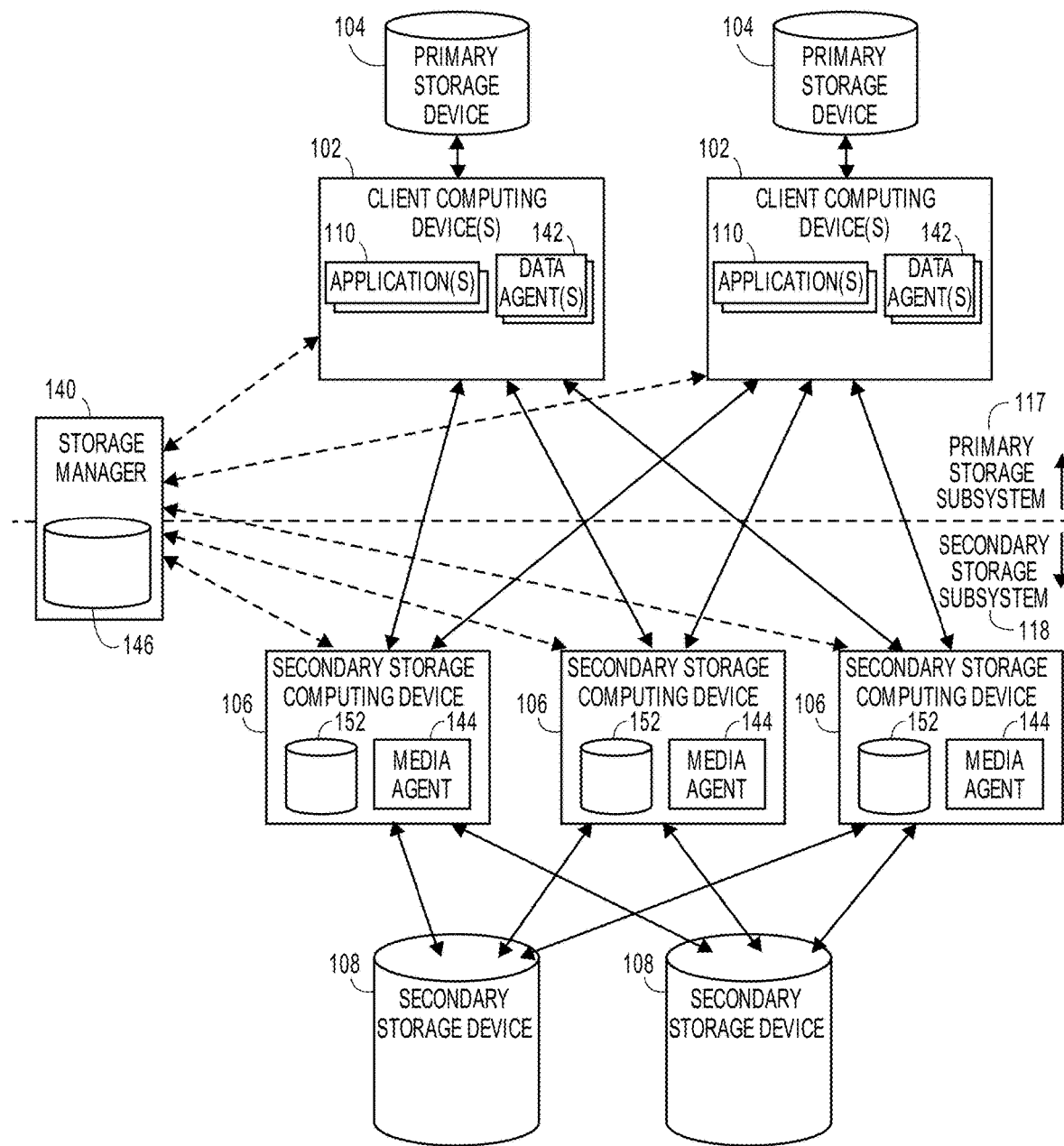
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases, a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and can make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "online archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched, and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

- schedules or other timing information, e.g., specifying when and/or how often to perform information management operations;
- the type of secondary copy 116 and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);
- whether and how to synchronize or otherwise distribute files or other data objects across multiple computing devices or hosted services; and
- retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

- frequency with which primary data 112 or a secondary copy 116 of a data object or metadata has been or is predicted to be used, accessed, or modified;
- time-related factors (e.g., aging information such as time since the creation or modification of a data object);
- deduplication information (e.g., hashes, data blocks, deduplication block size, deduplication efficiency or other metrics);
- an estimated or historic usage or cost associated with different components (e.g., with secondary storage devices 108);
- the identity of users, applications 110, client computing devices 102 and/or other computing devices that created, accessed, modified, or otherwise utilized primary data 112 or secondary copies 116;
- a relative sensitivity (e.g., confidentiality, importance) of a data object, e.g., as determined by its content and/or metadata;
- the current or historical storage capacity of various storage devices;
- the current or historical network capacity of network pathways connecting various components within the storage operation cell;
- access control lists or other security information; and
- the content of a particular data object (e.g., its textual content) or of metadata associated with the data object.

Exemplary Storage Policy and Secondary Copy Operations

Figure 1E:
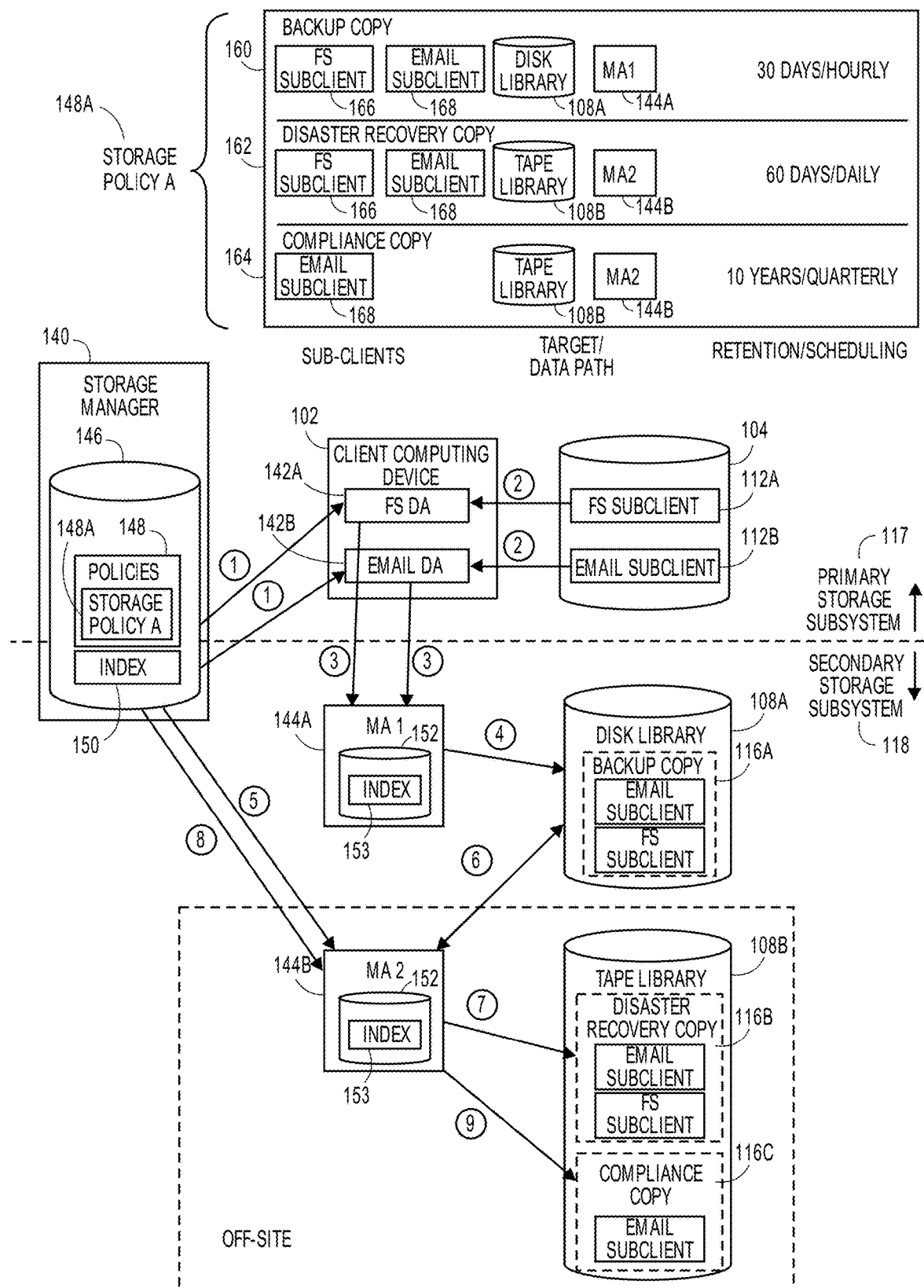
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source.

This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A or may access location information residing on disk library 108A itself.

In some cases, a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
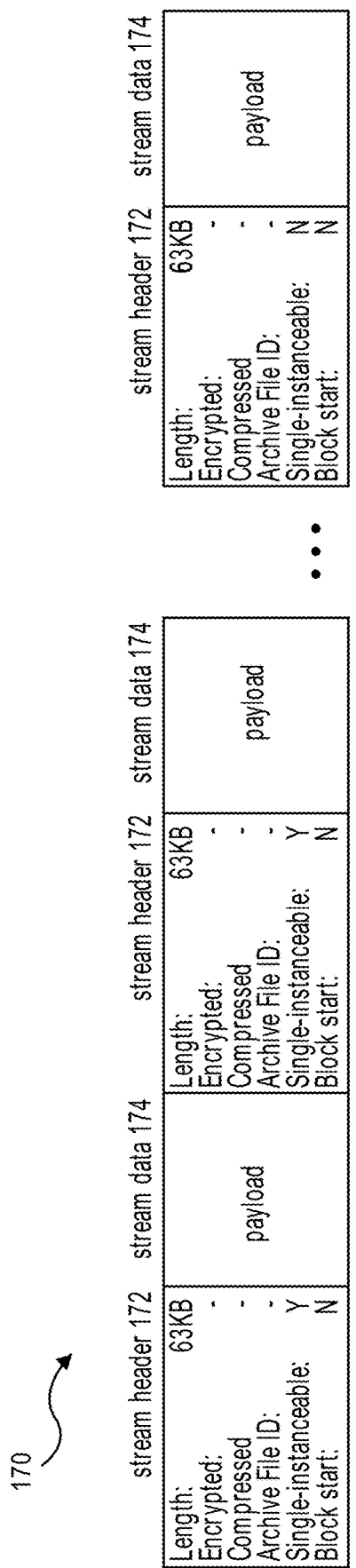
FIGS. 1F-1H are block diagrams illustrating suitable data structures that may be employed by the information management system.
Figure 1G:
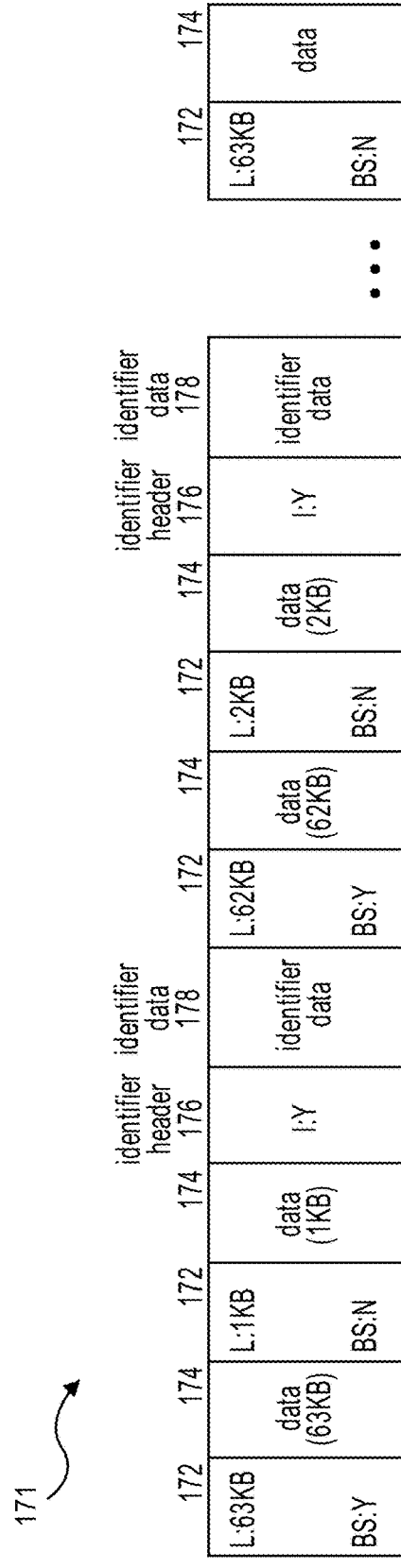

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
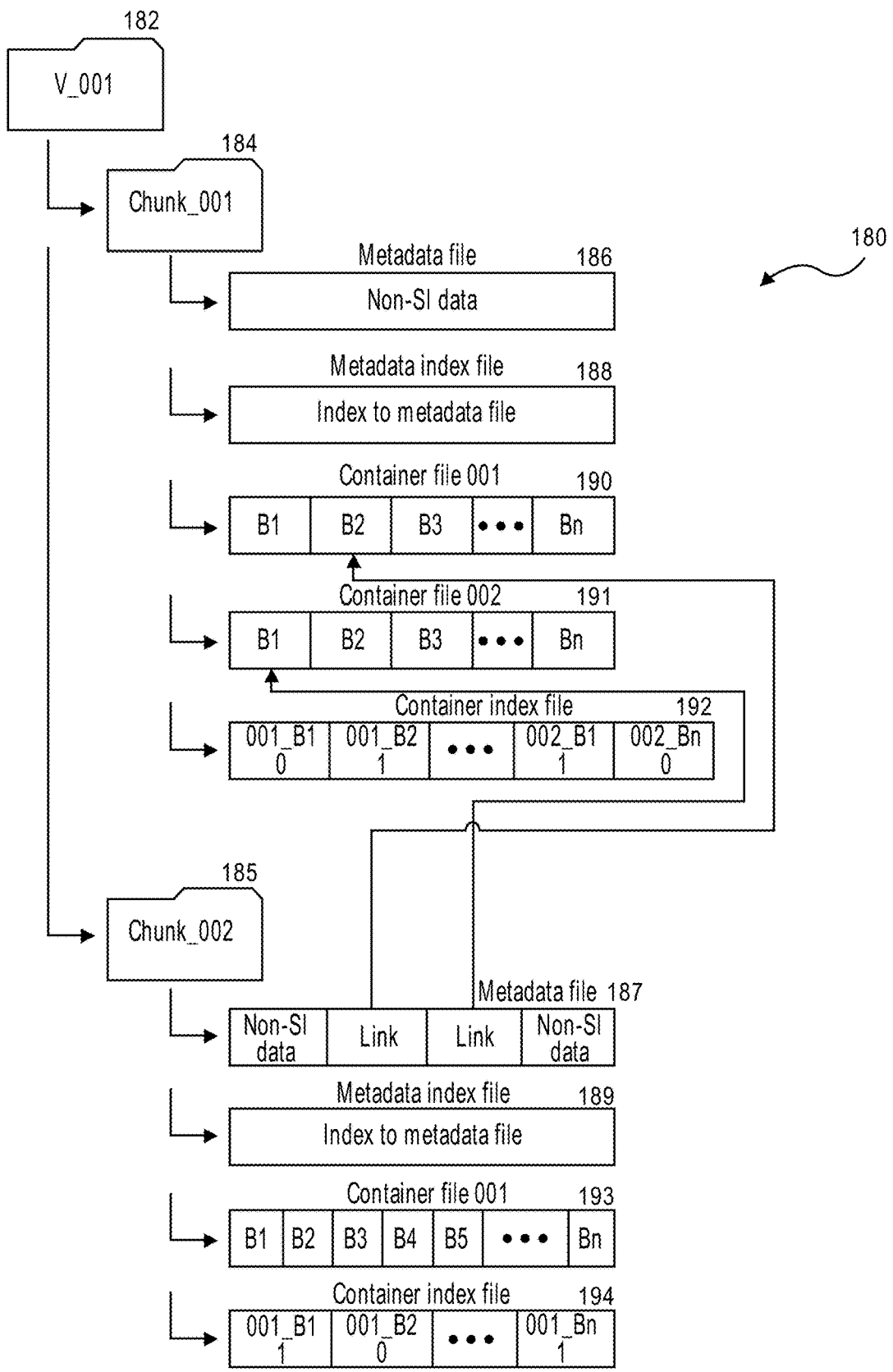

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
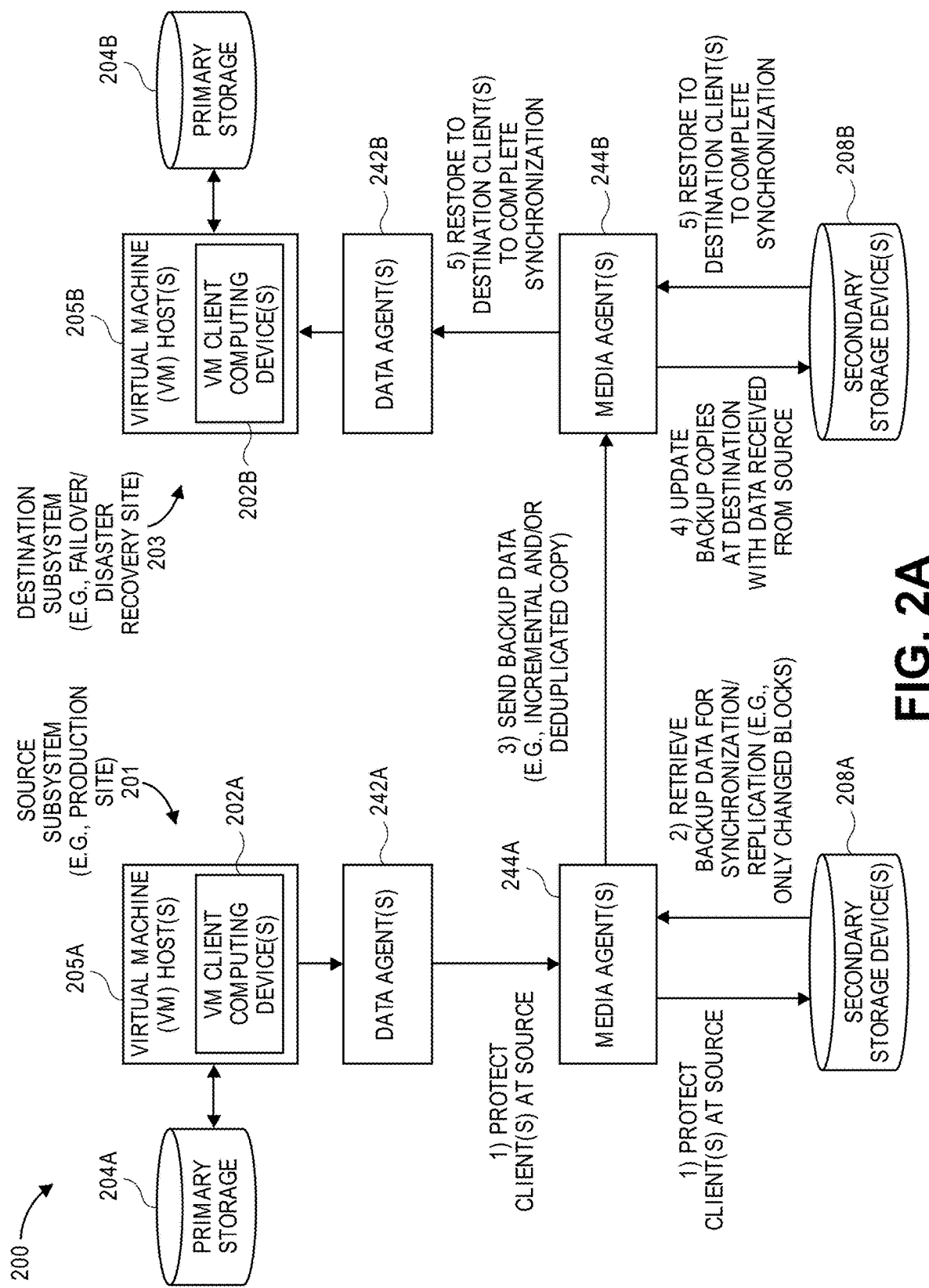
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202*a* include one or more virtual machines (or "VMs") executing on one or more corresponding VM host computers 205*a*, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242*a* and source media agent(s) 244*a* work together to write backup or other secondary copies of the primary data generated by the source client computing devices 202*a* into the source secondary storage device(s) 208*a*. At step 2, the backup/secondary copies are retrieved by the source media agent(s) 244*a* from secondary storage. At step 3, source media agent(s) 244*a* communicate the backup/secondary copies across a network to the destination media agent(s) 244*b* in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244*b* write the received backup/secondary copy data to the destination secondary storage device(s) 208*b*. At step 5, the synchronization is completed when the destination media agent(s) and destination data agent(s) 242*b* restore the backup/secondary copy data to the destination client computing device(s) 202*b*. The destination client computing device(s) 202*b* may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
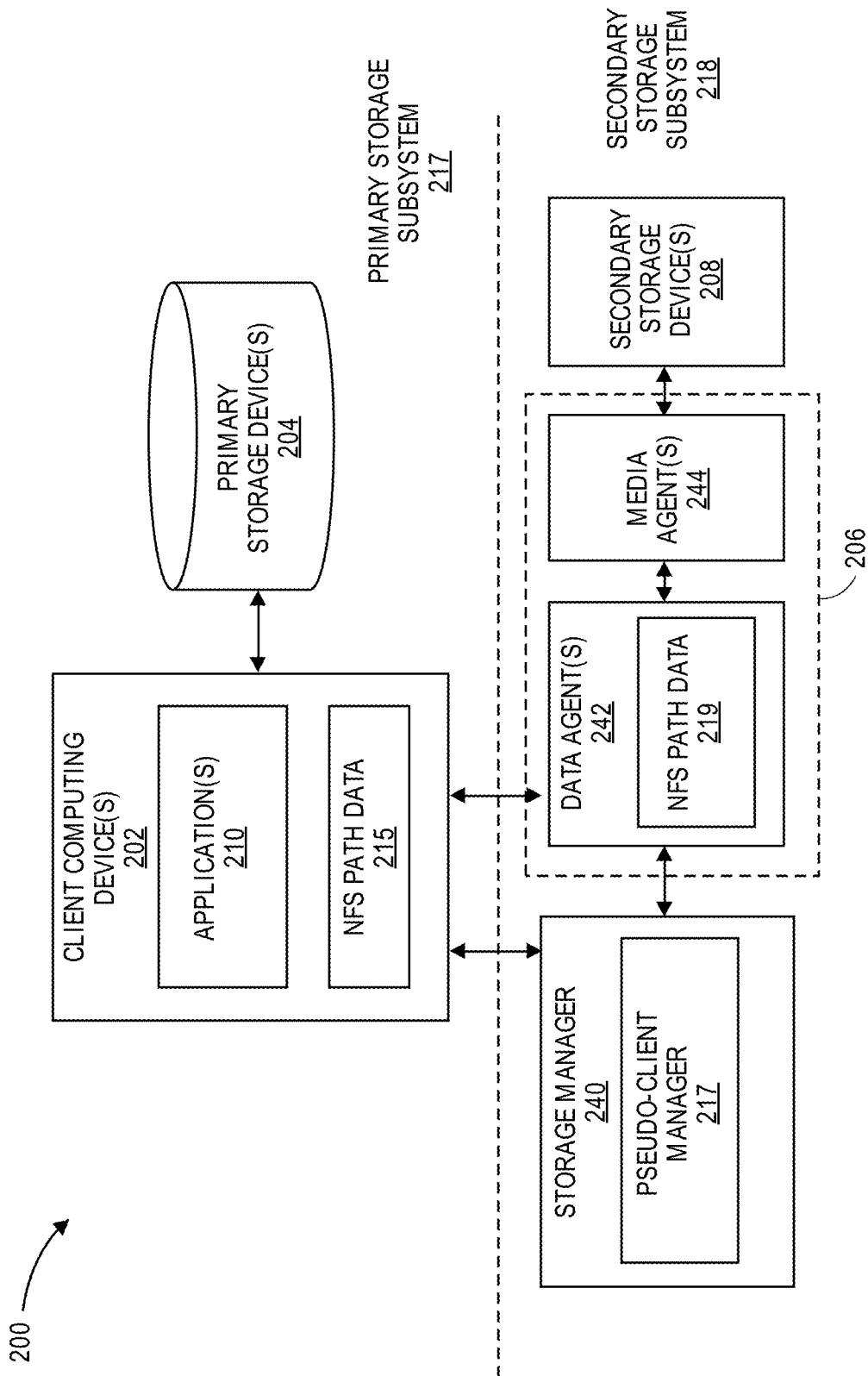
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
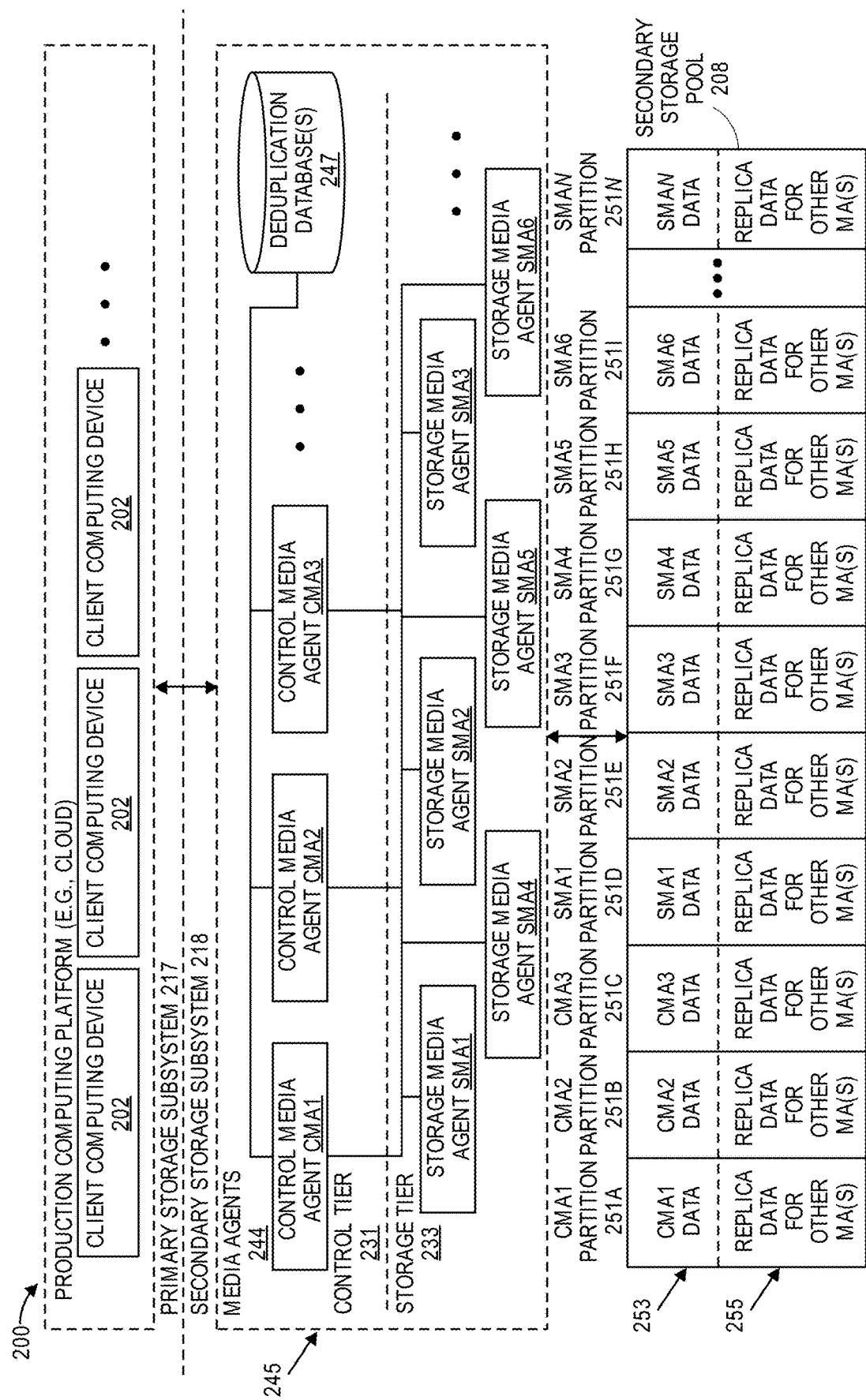
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store and be configured to receive client write and read requests from the primary storage subsystem 217 and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208 and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Figure 3:
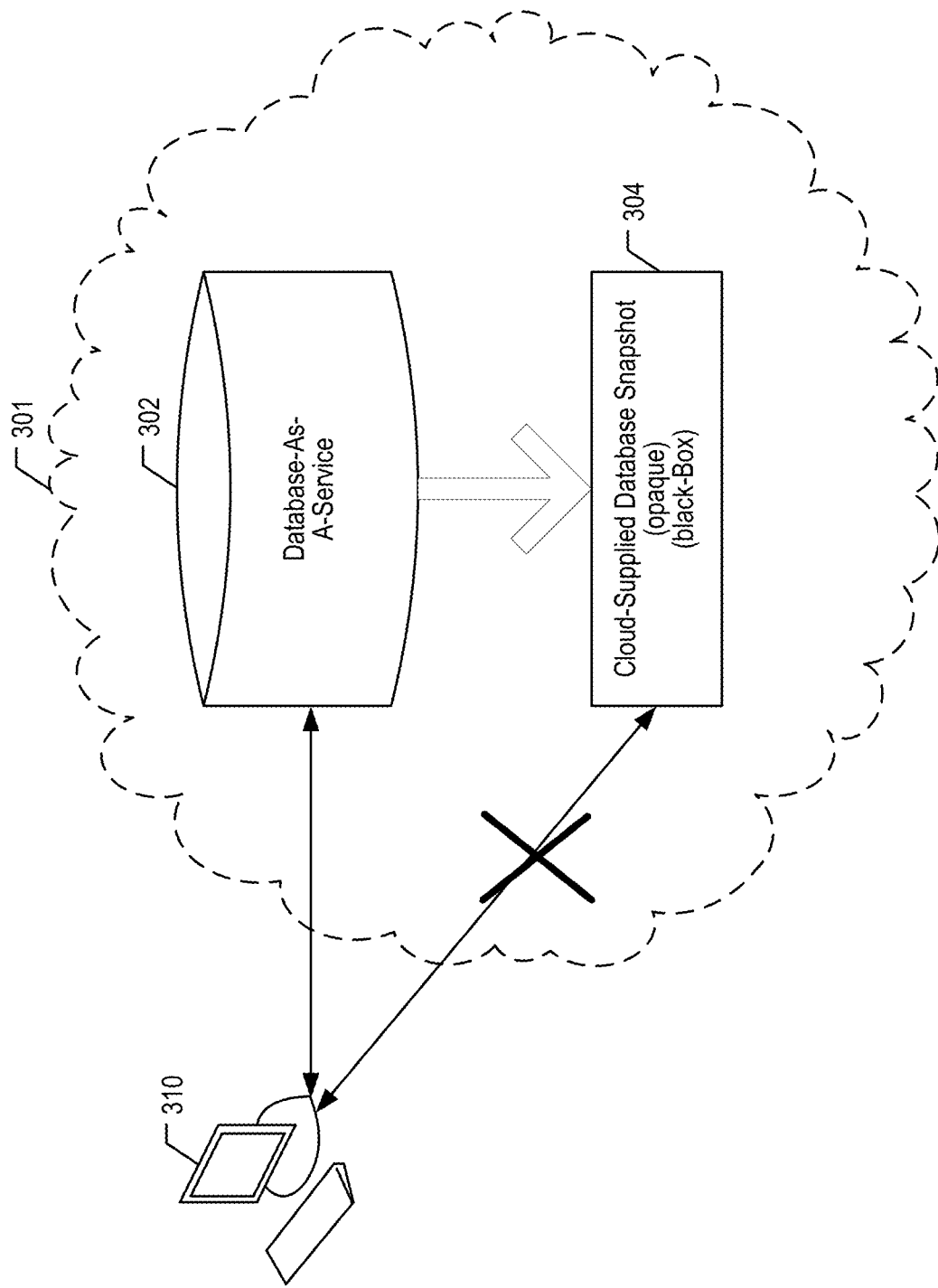
FIG. 3 is a block diagram illustrating a system in the prior art comprising DBaaS.

FIG. 3 is a block diagram illustrating a system in the prior art comprising DBaaS. The figure depicts: cloud computing account 301; DBaaS instance 302; cloud-supplied snapshot 304; and end-user computing device 310 for accessing the DBaaS.

Cloud computing account (or cloud service account) 301 is a subscriber account hosted by a cloud computing environment from a cloud services provider such as Amazon Web Services (AWS), Microsoft Azure, Google Cloud, Alibaba Cloud, Oracle Cloud, etc., without limitation. Access to a cloud computing environment is obtained via accounts (e.g., cloud computing account, cloud service account, etc.) available to subscribers, usually for a fee. Cloud computing account 301 is well known in the art. Likewise cloud computing environments also are well known in the art.

Serverless applications use various resources that are distributed within a cloud computing environment, across cloud availability zones, and/or across multiple cloud computing environments. Typically, serverless applications are hosted in a cloud service and use transitory, temporary, and/or persistent cloud storage to store their data. Serverless applications are enabled by cloud infrastructure that eliminates the need for application creators to closely manage the infrastructure needed for the application, such as provisioning servers, clusters, virtual machines, storage devices, and/or network resources. Instead, an application's creator uses resources made available in the cloud computing environment to construct the application, run the application, and store relevant data for the application, including databases of information and/or results generated by the application. Thus, serverless applications can be referred to as distributed applications.

DBaaS instance 302 is a cloud-supplied database management system (DBMS) available as software as a service to subscribers of a given cloud computing account (or cloud service account). The United States National Institute of Standards and Technology (NIST) defines Software as a Service as follows:

The capability provided to the consumer is to use the provider's applications running on a cloud infrastructure. The applications are accessible from various client devices through either a thin client interface, such as a web browser (e.g., web-based email), or a program interface. The consumer does not manage or control the underlying cloud infrastructure including network, servers, operating systems, storage, or even individual application capabilities, with the possible exception of limited user-specific application configuration settings . . . . A cloud infrastructure is the collection of hardware and software that enables the five essential characteristics of cloud computing. The cloud infrastructure can be viewed as containing both a physical layer and an abstraction layer. The physical layer consists of the hardware resources that are necessary to support the cloud services being provided, and typically includes server, storage and network components. The abstraction layer consists of the software deployed across the physical layer, which manifests the essential cloud characteristics. Conceptually the abstraction layer sits above the physical layer.

Source: Peter Mell, Timothy Grance (September 2011). Software as a Service (SaaS) in the NIST Definition of Cloud Computing, National Institute of Standards and Technology: U.S. Department of Commerce. Special publication 800-145. https://nvlpubs.nist.gov/nistpubs/Legacy/SP/nist-specialpublication800-145.pdf (accessed 26 Apr. 2019).

DBaaS instances are well known in the art. Some are open source and some are proprietary. Examples include MySQL, Oracle, PostgreSQL, Microsoft SQL, Aurora, Maria DB, Dynamo DB, Redshift, Data Lake, Microsoft Office 365 Suite, Cosmos DB, MongoDB, IBM DB2, etc.

Cloud-supplied snapshot 304 is a snapshot of DBaaS instance 302, which is taken by the cloud service provider and stored in the cloud computing environment. Cloud-supplied snapshot 304 is well known in the art. Snapshot 304 is not controlled by or accessible to those who access DBaaS instance 302. Even if snapshot 304 is available to a cloud services subscriber, its contents are opaque like a black box. Thus, a cloud services subscriber lacks the ability to view the contents of snapshot 304 other than by restoring the snapshot to DBaaS instance 302.

End-user computing device 310 is a computing device comprising one or more hardware processors. Computing device 310 is used by a cloud services subscriber for accessing the DBaaS instance 302 operating in the subscriber's cloud computing account within environment 301. Computing device 310 is well known in the art.

In sum, FIG. 3 depicts a scenario in the prior art that prevents cloud services subscribers from accessing the contents of DBaaS snapshots supplied by the cloud services provider. This drawback is overcome by the illustrative embodiments discussed in other figures herein.

Data Storage Management System for Protecting Cloud-Based Data including Databases-As-A-Service One of the benefits of the disclosed embodiments is to provide cloud-native DBaaS protection, including protection for endpoints, components, and/or assets (hereinafter "assets") associated with the DBaaS that are not already part of a traditional storage operation cell. The illustrative data protection solution is applied to the entire DBaaS entity, including its constituent assets. The illustrative embodiments orchestrate data protection for all the application's assets (e.g., file system, database, web constructs, cloud assets (e.g., Azure function, Lambda function), computing platforms (e.g., cognitive service, Azure web hook), etc. The illustrative embodiments also comprise alerting features that operate at the enterprise DBaaS level, readily identifying offline assets. Moreover, based on the disclosed holistic protection approach, a DBaaS can be restored to a "last known good state" as needed. These and other advantages and features are described in more detail in the following paragraphs and elsewhere herein.

Cloud Computing. The National Institute of Standards and Technology (NIST) provides the following definition of Cloud Computing characteristics, service models, and deployment models:

Cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction. This cloud model is composed of five essential characteristics, three service models, and four deployment models.

Essential Characteristics:

On-demand self-service. A consumer can unilaterally provision computing capabilities, such as server time and network storage, as needed automatically without requiring human interaction with each service provider.

Broad network access. Capabilities are available over the network and accessed through standard mechanisms that promote use by heterogeneous thin or thick client platforms (e.g., mobile phones, tablets, laptops, and workstations).

Resource pooling. The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, and network bandwidth.

Rapid elasticity. Capabilities can be elastically provisioned and released, in some cases automatically, to scale rapidly outward and inward commensurate with demand. To the consumer, the capabilities available for provisioning often appear to be unlimited and can be appropriated in any quantity at any time.

Measured service. Cloud systems automatically control and optimize resource use by leveraging a metering capability[1] at some level of abstraction appropriate to the type of service (e.g., storage, processing, bandwidth, and active user accounts). Resource usage can be monitored, controlled, and reported, providing transparency for both the provider and consumer of the utilized service.

[1] Typically this is done on a pay-per-use or charge-per-use basis.

Service Models:

Software as a Service (SaaS). The capability provided to the consumer is to use the provider's applications running on a cloud infrastructure[2]. The applications are accessible from various client devices through either a thin client interface, such as a web browser (e.g., web-based email), or a program interface. The consumer does not manage or control the underlying cloud infrastructure including network, servers, operating systems, storage, or even individual application capabilities, with the possible exception of limited user-specific application configuration settings.

[2] A cloud infrastructure is the collection of hardware and software that enables the five essential characteristics of cloud computing. The cloud infrastructure can be viewed as containing both a physical layer and an abstraction layer. The physical layer consists of the hardware resources that are necessary to support the cloud services being provided, and typically includes server, storage and network components. The abstraction layer consists of the software deployed across the physical layer, which manifests the essential cloud characteristics. Conceptually the abstraction layer sits above the physical layer.

Platform as a Service (PaaS). The capability provided to the consumer is to deploy onto the cloud infrastructure consumer-created or acquired applications created using programming languages, libraries, services, and tools supported by the provider.[3] The consumer does not manage or control the underlying cloud infrastructure including network, servers, operating systems, or storage, but has control over the deployed applications and possibly configuration settings for the application-hosting environment.

[3] This capability does not necessarily preclude the use of compatible programming languages, libraries, services, and tools from other sources.

Infrastructure as a Service (IaaS). The capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, and deployed applications; and possibly limited control of select networking components (e.g., host firewalls).

Deployment Models:

Private cloud. The cloud infrastructure is provisioned for exclusive use by a single organization comprising multiple consumers (e.g., business units). It may be owned, managed, and operated by the organization, a third party, or some combination of them, and it may exist on or off premises.

Community cloud. The cloud infrastructure is provisioned for exclusive use by a specific community of consumers from organizations that have shared concerns (e.g., mission, security requirements, policy, and compliance considerations). It may be owned, managed, and operated by one or more of the organizations in the community, a third party, or some combination of them, and it may exist on or off premises.

Public cloud. The cloud infrastructure is provisioned for open use by the general public. It may be owned, managed, and operated by a business, academic, or government organization, or some combination of them. It exists on the premises of the cloud provider.

Hybrid cloud. The cloud infrastructure is a composition of two or more distinct cloud infrastructures (private, community, or public) that remain unique entities, but are bound together by standardized or proprietary technology that enables data and application portability (e.g., cloud bursting for load balancing between clouds).

Source: Peter Mell, Timothy Grance (September 2011). The NIST Definition of Cloud Computing, National Institute of Standards and Technology: U.S. Department of Commerce. Special publication 800-145. nvlpubs.nist.gov/nistpubs/Legacy/SP/nistspecialpublication800-145.pdf (accessed 26 Apr. 2019). Cloud computing aims to allow those who consume the services (whether individuals or organizations) to benefit from the available technologies without the need for deep knowledge about or expertise with each of them. Wikipedia, Cloud Computing, en.wikipedia.org/wiki/Cloud_computing (accessed 26 Apr. 2019). "Cloud computing metaphor: the group of networked elements providing services need not be individually addressed or managed by users; instead, the entire provider-managed suite of hardware and software can be thought of as an amorphous cloud." Id.

Cloud Service Accounts and Variability in Cloud Services. Cloud service providers such as Amazon, Microsoft, Alibaba, Google, Salesforce, Cisco, etc. provide access to their particular cloud services via cloud service accounts, such as corporate accounts, departmental accounts, individual user accounts, etc. Each cloud service account typically has authentication features, e.g., passwords, certificates, etc., to restrict and control access to the cloud service. Each account also might have service level guarantees and/or other terms and conditions between the cloud service provider and the service subscriber, e.g., a company, a government agency, an individual user. A subscribing entity might have multiple accounts with a cloud service provider, such as an account for the Engineering department, an account for the Finance department, an account for the Human Resources department, other accounts for individual company users, etc., without limitation. Each cloud service account carries different authentication, even though the services subscriber is the same entity.

Different cloud service accounts might differ not just in service level guarantees, but might include different services. For example, one account might include long-term storage resources, whereas another account might be limited to ordinary data storage. For example, some accounts might have access to data processing functions supplied by the cloud service provider, such as machine learning algorithms, statistical analysis packages, etc., whereas other accounts might lack such features. Accordingly, the resources available to the user(s) of cloud service accounts can vary as between accounts, even if the accounts have the same subscriber and the same cloud service provider. Thus, the user experience and the technologies available as between cloud service accounts can vary significantly. Thus, when considering cloud computing, the specifics of cloud service accounts can play a role in the availability and/or portability of resources. Crossing account boundaries can pose technological barriers when considering migration of applications and their cloud services assets.

Cloud Availability Zones. "Availability zones (AZs) are isolated locations within . . . regions from which public cloud services originate and operate. Regions are geographic locations in which public cloud service providers' data centers reside. Businesses choose one or multiple worldwide availability zones for their services depending on business needs. Businesses select availability zones for a variety of reasons, including compliance and proximity to end customers. Cloud administrators can also choose to replicate services across multiple availability zones to decrease latency or protect resources. Admins can move resources to another availability zone in the event of an outage. Certain cloud services may also be limited to particular regions or AZs." Source: Margaret Rouse, Definition of Availability Zones, TechTarget, searchaws.techtarget.com/definition/availability-zones (accessed 26 Apr. 2019).

Here is a vendor-specific example of how cloud service availability zones are organized in the Google Cloud: "Certain [Google] Compute Engine resources live in regions or zones. A region is a specific geographical location where you can run your resources. Each region has one or more zones; most regions have three or more zones. For example, the us-central1 region denotes a region in the Central United States that has zones us-central1-*a*, us-central1-*b*, us-central1-*c*, and us-central1-*f*. Resources that live in a zone, such as instances or persistent disks, are referred to as zonal resources. Other resources, like static external IP addresses, are regional. Regional resources can be used by any resources in that region, regardless of zone, while zonal resources can only be used by other resources in the same zone. For example, disks and instances are both zonal resources. To attach a disk to an instance, both resources must be in the same zone. Similarly, if you want to assign a static IP address to an instance, the instance must be in the same region as the static IP. Only certain resources are region- or zone-specific. Other resources, such as images, are global resources that can be used by any other resources across any location. For information on global, regional, and zonal Compute Engine resources, see Global, Regional, and Zonal Resources." Source: Google Cloud Regions and Zones, cloud.google.com/compute/docs/regions-zones/ (accessed 26 Apr. 2019) (emphasis added).

Accordingly, when considering cloud computing, availability zones can play a role in the availability and/or portability of resources such as DBaaS. Crossing zone boundaries can pose technological barriers when considering migration of applications and their cloud service assets, even when the different availability zones are supplied by the same cloud service provider.

Traditional Non-Cloud ("On-Premises") Data Centers are Distinguishable from Cloud Computing. Traditional data centers generally do not have cloud computing characteristics. For example, the user experience is generally different, for example in regard to the name space(s) used for the storage, computing, and network resources. Moreover, substantial increases in resources needed by a user are not provisioned on demand. A traditional data center is physically located within the enterprise/organization that owns it. A traditional non-cloud data center might comprise computing resources such as servers, mainframes, virtual servers/clusters, etc.; and/or data storage resources, such as network-attached storage, storage area networks, tape libraries, etc. The owner of the traditional data center procures hardware, software, and network infrastructure (including making the associated capital investments); and manages going-forward planning for the data center. A traditional data center is staffed by professional Information Technology (IT) personnel, who are responsible for the data center's configuration, operation, upgrades, and maintenance. Thus, a traditional non-cloud data center can be thought of as self-managed by its owner/operator for the benefit of in-house users, as compared to cloud computing, which is managed by the cloud service provider and supplied as a service to outside subscribers. Clearly, a cloud computing service also has hardware, software, and networking infrastructure and professionals staffing it, as well as having an owner responsible for housing and paying for the infrastructure. However, the cloud computing service is consumed differently, served differently, and deployed differently compared to non-cloud data centers. Traditional non-cloud data centers are sometimes referred to as "on-premises" data centers, because their facilities are literally within the bounds of the organization that owns the data center. Cloud service providers' data centers generally are not within the bounds of the subscriber organization and are consumed "at a distance" "in the cloud."

Accordingly, when considering cloud computing versus non-cloud data center deployment, the choice can play a role in the availability and/or portability of resources. Crossing boundaries between non-cloud data centers and cloud computing can pose technological barriers. For example, storing a database at a non-cloud data center might require different resources and/or access features/controls than storing the database at a cloud computing service. Thus, moving the database from the non-cloud data center to a cloud service account may require data conversion, re-configuration, and/or adaptation that go above and beyond merely copying the database. Conversely, moving data, applications, and/or web services from cloud computing to a non-cloud data center also can involve data conversion, re-configuration, and/or adaptation to ensure success.

Service Models. Differences in service models, comparing non-cloud "on-premises" data centers versus IaaS versus PaaS versus SaaS, can yield different performance and cost profiles. Different service models can affect resource availability and/or portability of distributed/serverless applications, at least because the management of different resources rests with different providers and governed by different terms and conditions. See, e.g., Stephen Watts, SaaS vs PaaS vs IaaS: What's The Difference and How To Choose, BMC Blogs, BMC Software, Inc., www.bmc.com/blogs/saas-vs-paas-vs-iaas-whats-the-difference-and-how-to-choose/ (accessed 26 Apr. 2019).

Need For Technological Solutions To Protect, Restore, And Migrate DbaaS In Same-Cloud And Multi-Cloud Deployments. The present inventors devised a streamlined approach that enables customers to retain management control over their DBaaS data, by providing "managed backup copies" outside cloud service providers' sphere of control. An illustrative data storage management system provides control over performing backup operations to generate managed backup copies, storing managed backup copies, recovering managed backup copies in whole or in part, and migrating managed backup copies. Management control also extends to choices of where to store the managed backup copies, whether on the same cloud computing platform as the source DBaaS, on a different cloud computing platform, and/or in a non-cloud data center. Unlike the opaque "black box" snapshots offered by cloud service providers, the illustrative embodiments enable customers to use the managed backup copies to control access to backed up data and to further control when and where the data can be migrated and used.

Numerous advantages accrue to users of the illustrative data storage management system by way of the managed backup copies. Exemplary embodiments migrate DBaaS in-cloud from one instance to another, across cloud computing accounts, across cloud availability zones, and/or across cloud service providers, as well migrating to non-cloud data centers. In addition to control over storage, recovery, and migration of managed backup copies, the data storage management system offers other features for managed backup copies, e.g., restoring at certain levels of granularity, such as table-level restores. Managed backup copies are available for long-term retention, compliance purposes, legal hold, etc., which cannot be guaranteed by the cloud service provider. Furthermore, some customers prefer to have access to managed backup copies outside the cloud computing environment of the DBaaS. Exemplary embodiments can additionally leverage the opaque cloud-provided snapshots into managed backup copies controlled by the illustrative data storage management system. More details are given in the next figures.

FIGS. 4A-4F are block diagrams depicting a variety of embodiments of an illustrative data storage management system 400 for protecting, recovering, and/or migrating cloud-based DBaaS instances. System 400 is a data storage management system analogous to system 100 and further comprises additional components and features for protecting, recovering, and/or migrating cloud-based DBaaS instances. In some embodiments, all components of system 400 operate in a cloud computing account, e.g., 301. In some embodiments some components of system 400 operate outside the cloud computing account that hosts the subject DBaaS instance 302.

FIG. 4A is a block diagram illustrating some salient portions of a system 400 for protecting, recovering, and/or migrating cloud-based DBaaS instances according to an illustrative embodiment of the present invention, including in-cloud data storage management resources and managed backup copies. The present figure depicts: cloud computing account 301, DBaaS instance 302, computing device 310, data protection resource pool 405 comprising backup proxies 406, managed backup copies 416, and storage manager 440. Computing device 310, which was described in more detail in another figure herein, has access to DBaaS instance 302 as depicted by two-way arrow 411. Computing device 310 also has access to managed backup copies 416 as depicted by the dashed two-way arrow 415. Logical data paths for creating managed backup copies 416 from DBaaS instance 302 are depicted by the bold one-way arrows. Cloud computing account 301, DBaaS instance 302, and computing device 310 were described in more detail in another figure herein.

Accessing a DBaaS via native APIs. Generally, a certain kind of DBMS, whether open source or proprietary, comes with a set of DBMS-specific utilities and interfaces (e.g., APIs) that are accessible to and usable by DBMS users. These are native to the DBMS and are usually available on any platform that hosts the DBMS, e.g., server, cloud, etc. When a DBMS is cloud-based in the form of DBaaS, the utilities and interfaces remain associated with the DBaaS and are available to the DBaaS subscribers. Illustratively, these are referred to herein as APIs or native APIs.

Data protection resource pool ("pool") 405 is a logical grouping of so-called backup proxies that are specially configured to protect, recover, and/or migrate any number of DBaaS instances 302 that might be operating in a given cloud computing account. Pool 405 acts as a resource in system 400. There is no limitation on how many backup proxies 406 are configured within pool 405, and there is no need to have a one-to-one ratio between backup proxies 406 in pool 405 and the number of active DBaaS instance 302. Pool 405 is tracked by storage manager 440 as a resource, e.g., via an administered entity stored in management database 646. See, e.g., FIG. 6.

Backup proxy 406 is a specially configured virtual machine (VM) that can be invoked for performing backup, restore, and/or migrate operations. All backup proxies 406 in a given pool 405 are configured alike, so that they can be invoked interchangeably as needed by storage manager 440. The underlying VM hosting a backup proxy 406 is instantiated in cloud computing account 301 and configured according to the illustrative embodiments with a set of software executables (binaries). To keep out-of-pocket costs relatively low, the VM is preferably powered on on-demand when storage manager 440 initiates a backup, restore, and/or migration operation for a DBaaS instance 302. If it is still needed for another backup, restore, and/or migration operation after the first operation completed, the VM remains powered on. Otherwise, it is powered off until needed again later.

Managed backup copies 416 are analogous to secondary copies 116. Each managed copy 416 is a copy of a DBaaS instance 302 and is generated by data storage management system 400. Because copies 416 are generated by and used by data storage management system 400 rather than supplied by the cloud service provider, they are referred to herein as "managed copies" in contrast to cloud-supplied snapshot 304. Any kind of copy of a DBMS copy as backed up by a suitable data agent 542 can be embodied as a managed copy 416. See also FIG. 5. As depicted in the present figure, managed copies 416 are stored within cloud computing account 301. There is no limitation on the kind of storage resources needed for storing managed copies 416, whether cloud-based or non-cloud based resources.

Storage manager 440 is analogous to storage manager 140 and additionally comprises features, data structures, and/or functionality for operating in system 400. See also FIG. 6. As depicted in the present figure, storage manager 440 executes on a VM instance within cloud computing account 301.

Although the present figure depicts only one DBaaS instance 302 to ease the reader's understanding of the present disclosure, system 400 is configured to protect, recover, and/or migrate any number of DBaaS instances 302, without limitation.

Figure 4B:
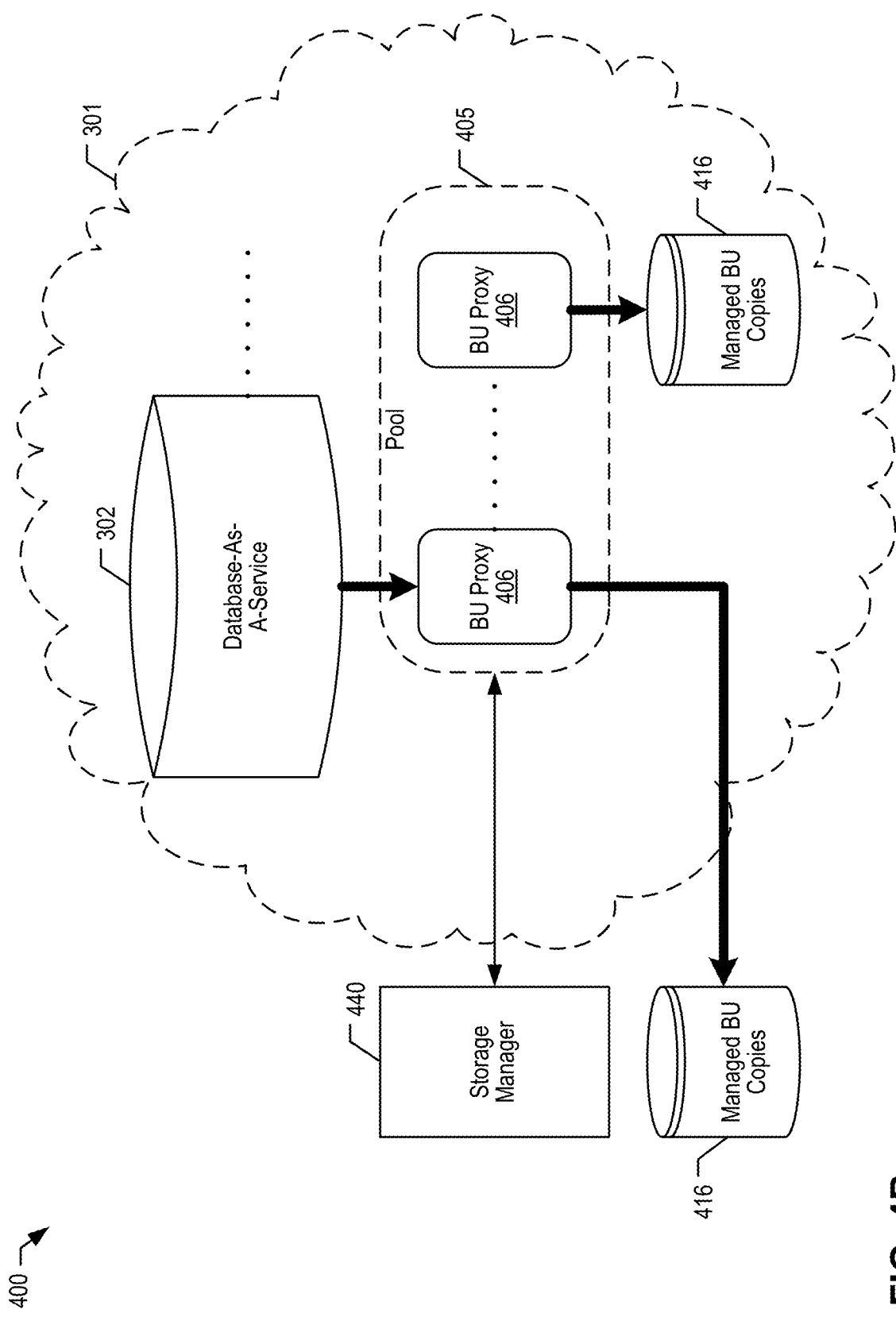
FIG. 4B is a block diagram illustrating a configuration of system 400 with a storage manager and managed backup copies outside the DBaaS cloud computing environment.

FIG. 4B is a block diagram illustrating a configuration of system 400 with a storage manager and managed backup copies outside the DBaaS cloud computing environment. The present figure depicts: cloud computing account 301, DBaaS instance 302, data protection resource pool 405 comprising backup proxies 406, managed backup copies 416, and storage manager 440. Logical data paths for creating managed backup copies 416 from DBaaS instance 302 are depicted by the bold one-way arrows.

As depicted in the present figure, storage manager 440 executes outside cloud computing account 301, e.g., on a VM in another cloud computing account, on a VM in a non-cloud data center, on a non-virtualized computing device comprising one or more hardware processors.

As depicted in the present figure, some managed copies 416 are stored within cloud computing account 301. Other managed copies 416 are stored outside cloud computing account 301, even though the backup proxy 406 that created said managed copies operates within the cloud computing account 301.

Figure 4C:
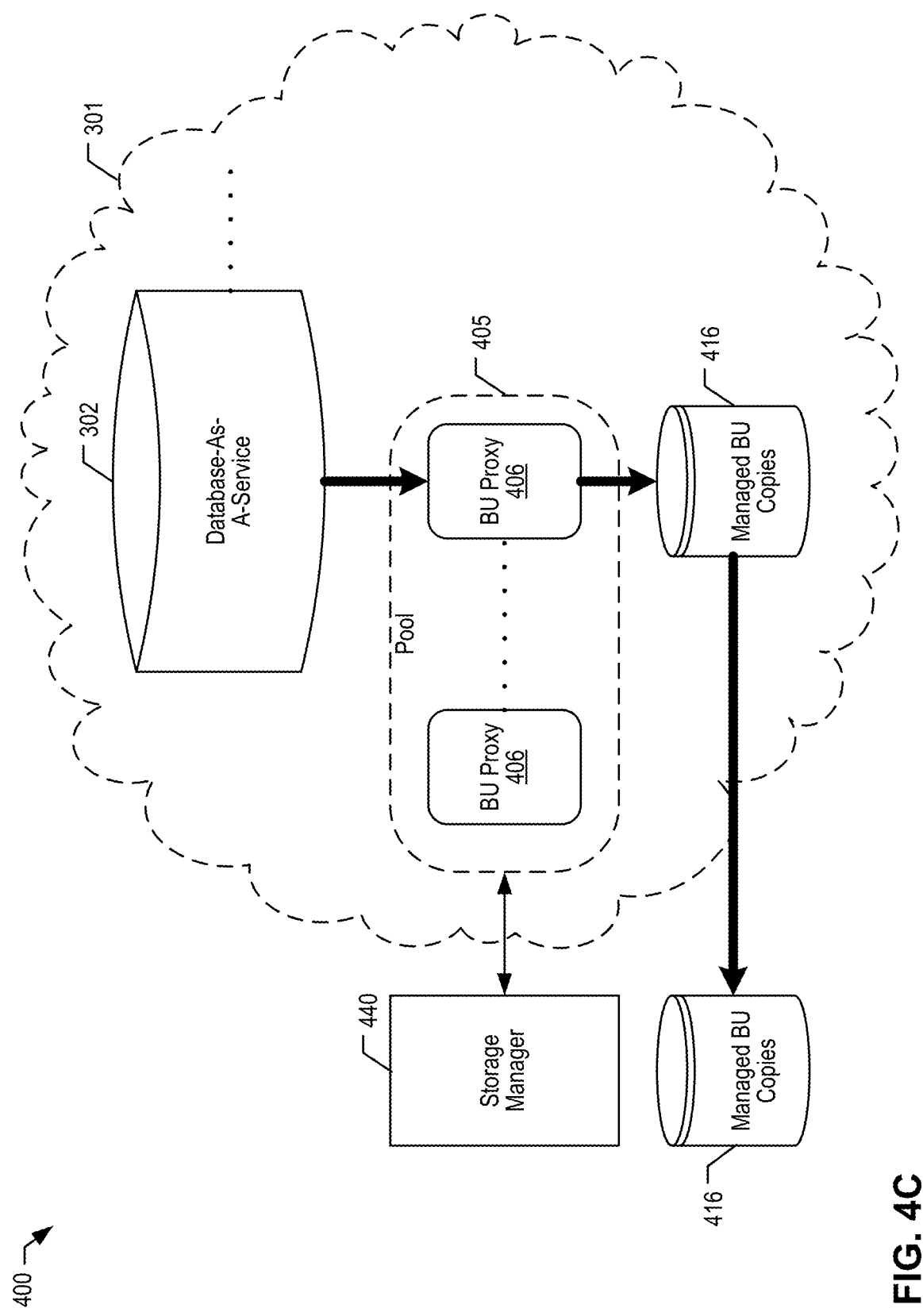
FIG. 4C is a block diagram illustrating some salient portions of system 400 with a storage manager and certain managed backup copies (e.g., auxiliary copies, archive copies, etc.) outside the DBaaS cloud computing environment.

FIG. 4C is a block diagram illustrating some salient portions of system 400 with a storage manager and certain managed backup copies (e.g., auxiliary copies, archive copies, etc.) outside the DBaaS cloud computing environment. The present figure depicts: cloud computing account 301, DBaaS instance 302, data protection resource pool 405 comprising backup proxies 406, managed backup copies 416, and storage manager 440. Logical data paths for creating managed backup copies 416 from DBaaS instance 302 are depicted by the bold one-way arrows.

As depicted in the present figure, storage manager 440 executes outside cloud computing account 301, e.g., on a VM in another cloud computing account, on a VM in a non-cloud data center, on a non-virtualized computing device comprising one or more hardware processors.

As depicted in the present figure, some managed copies 416 are stored within cloud computing account 301. Other managed copies 416 are generated from the cloud-based managed copies 416 and are stored outside cloud computing account 301.

Figure 4D:
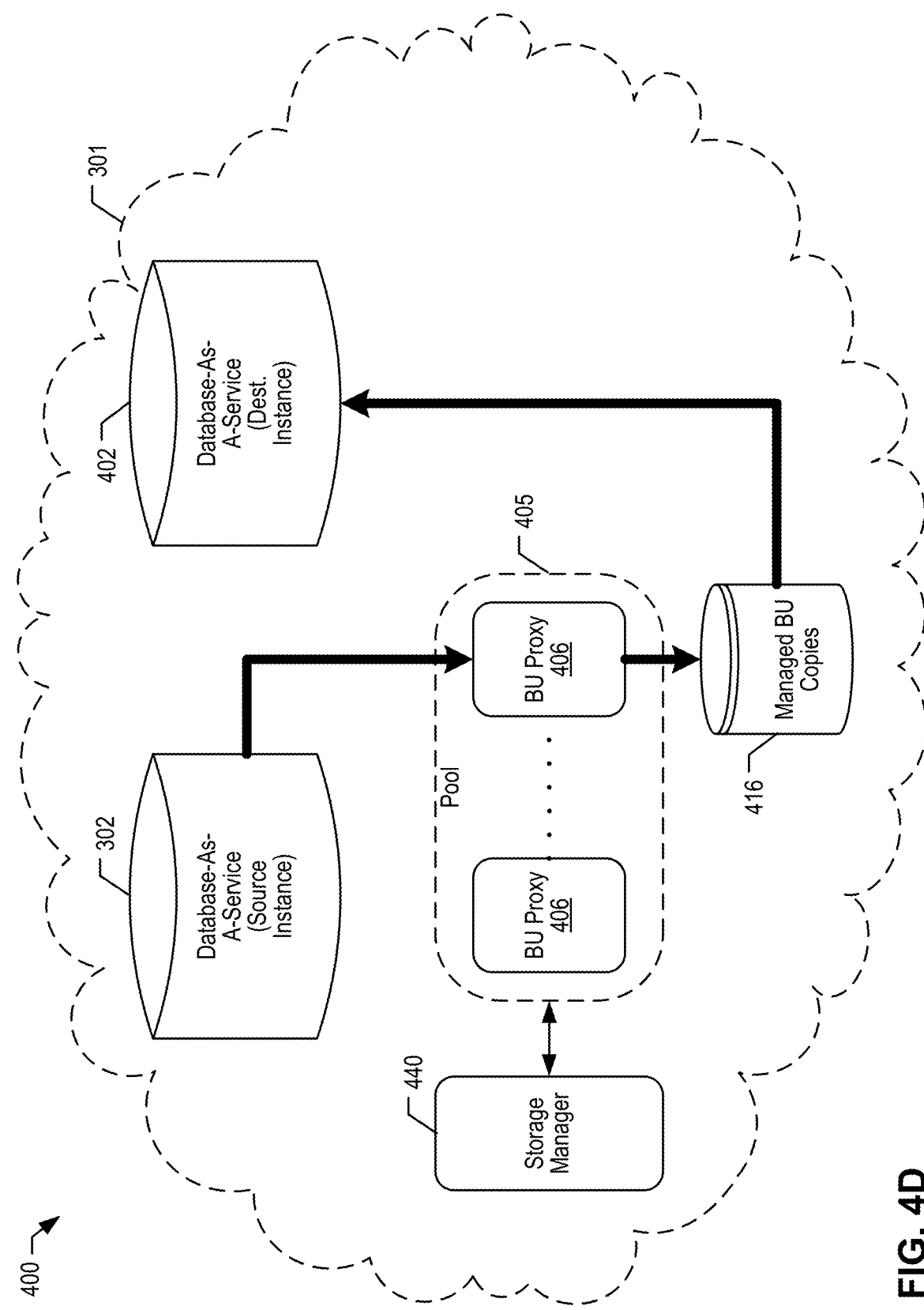
FIG. 4D is a block diagram illustrating a configuration of system 400 supporting database migration within the DBaaS cloud computing environment.

FIG. 4D is a block diagram illustrating a configuration of system 400 performing database migration within the DBaaS cloud computing environment. The present figure depicts: cloud computing account 301, DBaaS instance 302, DBaaS instance 402, data protection resource pool 405 comprising backup proxies 406, managed backup copies 416, and storage manager 440. Logical data paths for creating managed backup copies 416 from DBaaS instance 302 and for migrating therefrom to DBaaS instance 402 are depicted by the bold one-way arrows.

As depicted in the present figure, DBaaS instance 302 is a source for a migration operation to DBaaS instance 402, which is a migration destination. The invention is not so limited however, and in some embodiments backup copies of DBaaS instance 402 are generated and migrated to DBaaS instance 302.

As depicted in the present figure, storage manager 440 executes on a VM instance within cloud computing account 301. The invention is not so limited.

As depicted in the present figure, managed copies 416 from DBaaS instance 302 are stored within cloud computing account 301. The invention is not so limited. In some embodiments, managed copies 416 that are stored outside cloud computing account 301 are used for migrating to another DBaaS instance, e.g., 402.

The present depiction is not limited to migration scenarios. In some embodiments, one or more managed copies 416 are restored to DBaaS instance 302.

Figure 4E:
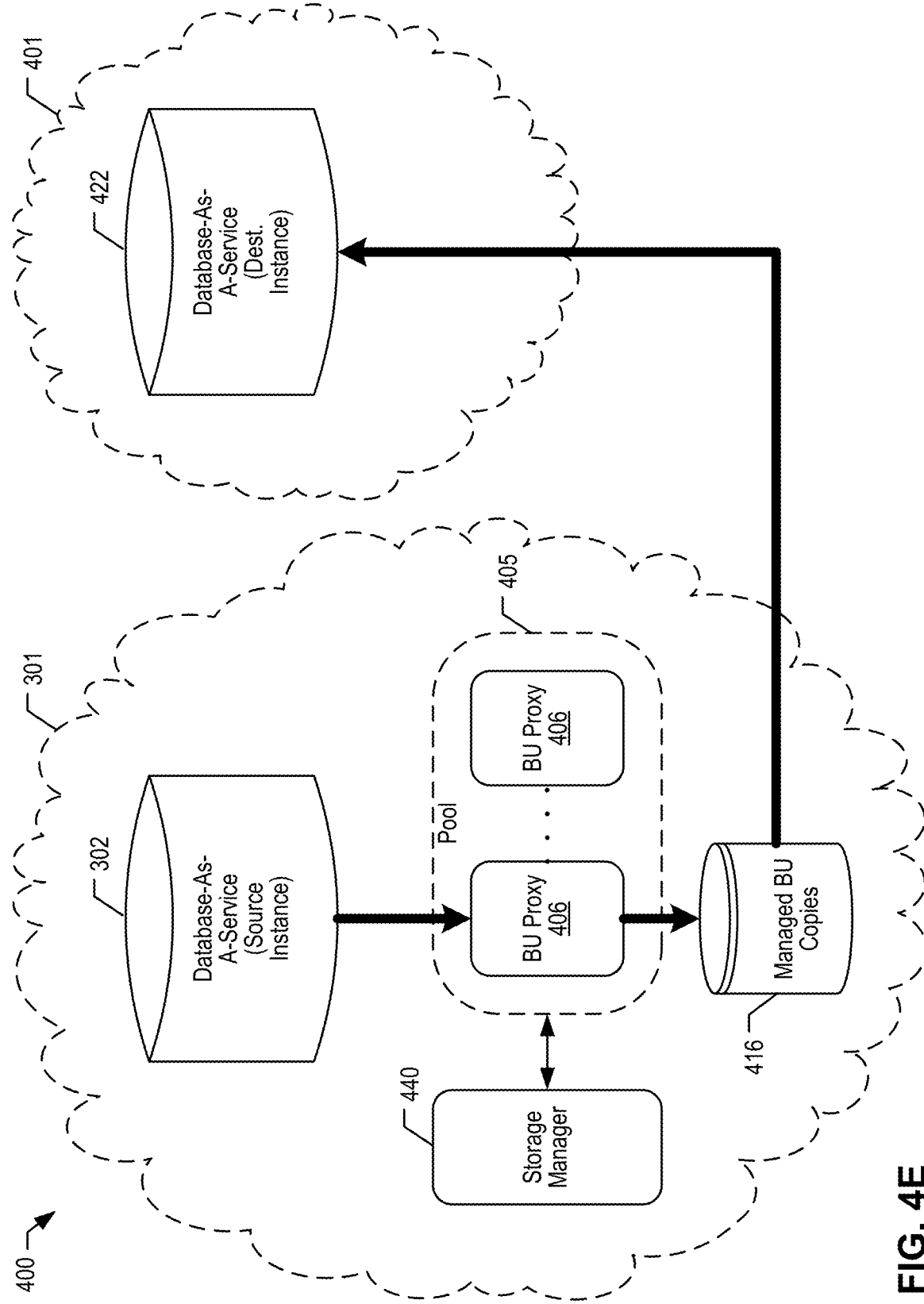
FIG. 4E is a block diagram illustrating a configuration of system 400 supporting database migration to a destination outside the DBaaS cloud computing environment.

FIG. 4E is a block diagram illustrating a configuration of system 400 performing database migration to a destination outside the DBaaS cloud computing environment. The present figure depicts: cloud computing account 301 comprising DBaaS instance 302, cloud computing account 401 comprising DBaaS instance 422, data protection resource pool 405 comprising backup proxies 406, managed backup copies 416, and storage manager 440. Logical data paths for creating managed backup copies 416 from DBaaS instance 302 and for migrating therefrom to DBaaS instance 422 are depicted by the bold one-way arrows.

As depicted in the present figure, DBaaS instance 302 is a source for a migration operation to DBaaS instance 422, which is a migration destination in another cloud computing account. The invention is not so limited however, and in some embodiments backup copies of DBaaS instance 422 are generated and migrated to DBaaS instance 302.

Cloud computing account 401 is distinct from cloud computing account 301. In some embodiments cloud computing account 401 is implemented in the same cloud computing environment (i.e., from the same cloud service provider) as account 301. In some embodiments cloud computing account 401 is implemented in a different availability zone from the same cloud service provider. In some embodiments cloud computing account 401 is implemented in a different cloud service provider's environment altogether.

As depicted in the present figure, storage manager 440 executes on a VM instance within cloud computing account 301. The invention is not so limited.

As depicted in the present figure, managed copies 416 from DBaaS instance 302 are stored within cloud computing account 301. The invention is not so limited. In some embodiments, managed copies 416 that are stored outside cloud computing account 301 are used for migrating to another DBaaS instance, e.g., 422.

There is no limitation on the location of the components of system 400 (e.g., storage manager 440, backup proxies 406) relative to source and destination in a migration operation. Thus, in some alternative embodiments where DBaaS instance 302 migrates to DBaaS instance 422 (using managed copies 416), storage manager 440 and/or backup proxy 406 operate in the destination cloud computing account 401 rather than in the source account 301. As noted earlier, in some embodiments storage manager operates outside cloud computing accounts 301/401. Furthermore, the invention is not limited to cloud-based backup proxies 406, and in some embodiments one or more proxies 406 operate outside cloud computing accounts 301/401. However, for improved performance, it is preferable to locate backup proxies 405 near the source DBaaS instance.

FIG. 4E1 is a block diagram illustrating a configuration of system 400 supporting database migration to a destination outside the DBaaS cloud computing environment. This figure is similar to FIG. 4E, but here a separate proxy pool 405 operates at the destination cloud computing environment 401. This configuration enables the backup proxy 406 that populates destination DBaaS 422 to be co-located therewith in the same cloud computing environment 401, which, in some scenarios, provides improved performance. Illustratively, storage manager 440 is configures outside the depicted cloud computing environments, though there is no limitation on where it can operate. Likewise, there is no limitation on where managed copies 416 are located, whether within or outside a cloud computing environment, whether co-located in the same cloud computing account as source or destination, etc.

Figure 4F:
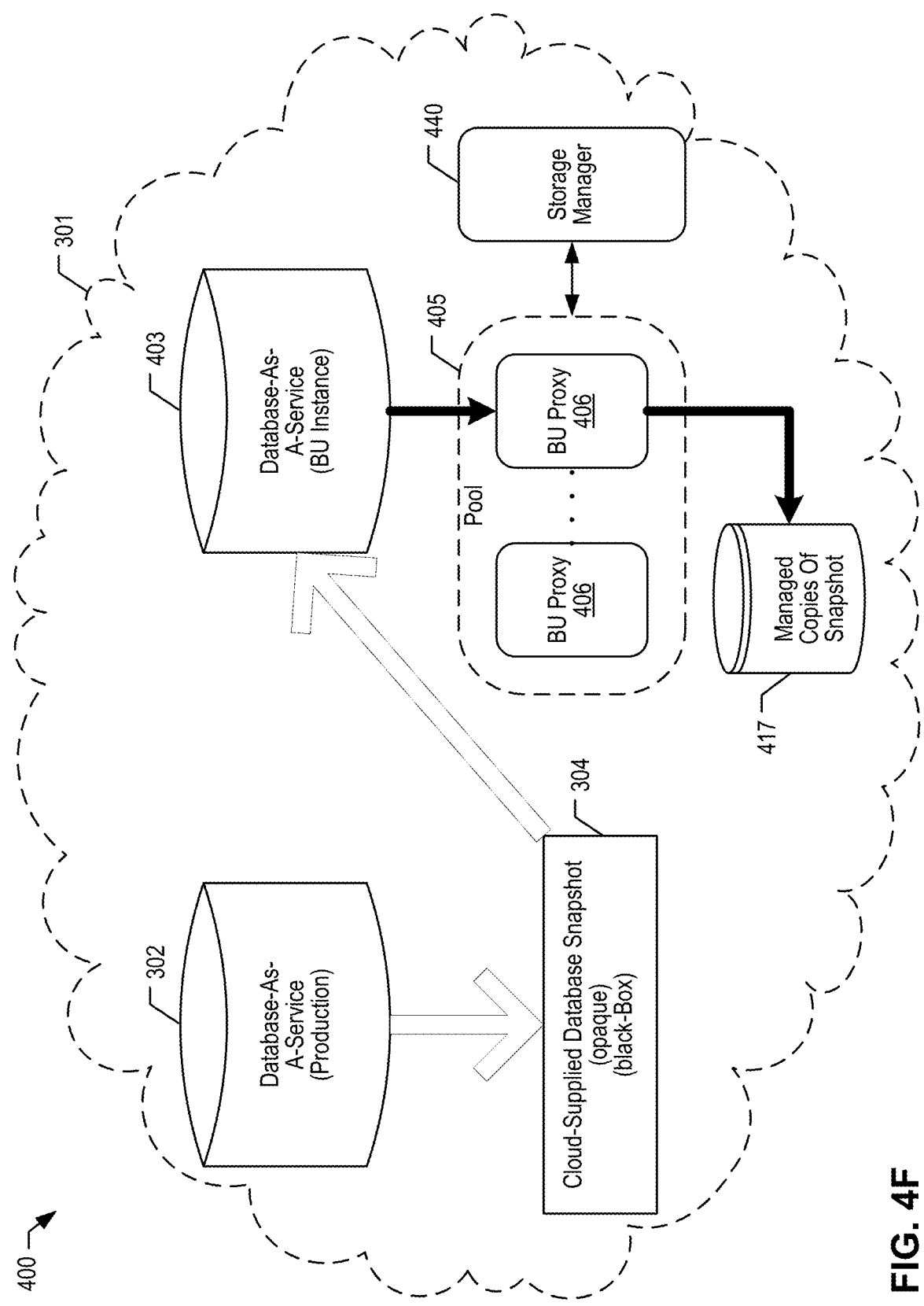
FIG. 4F is a block diagram illustrating a configuration of system 400 leveraging the cloud-supplied database snapshot into managed backup copies in the DBaaS cloud computing environment.

FIG. 4F is a block diagram illustrating a configuration of system 400 leveraging the cloud-supplied database snapshot into managed backup copies in the DBaaS cloud computing environment. The present figure depicts: cloud computing account 301 comprising DBaaS instance 302, cloud-supplied database snapshot 304, DBaaS instance 403, data protection resource pool 405 comprising backup proxies 406, managed copies of snapshot 417, and storage manager 440.

Logical data paths for creating and recovering cloud-supplied snapshot 304 are depicted by the double-wide (outlined) arrows (from component 302 to 304 to 403). The double-wide (outlined) arrows depict the use of cloud-supplied APIs to generate snapshot 304 and recover it at DBaaS instance 403. Logical data paths for creating managed backup copies 417 from cloud supplied snapshot 304 are depicted by the bold one-way arrows (from component 403 to 406 to 417).

DBaaS instance 403 is analogous to DBaaS instance 302 and is configured to act as a staging instance (backup instance) for recovering cloud-supplied snapshot 304.

Cloud supplied snapshot 304 was described in more detail in FIG. 3 in regard to deficiencies of the prior art. According to an embodiment of the illustrative data storage management system, snapshot 304 is recovered by migrating it to another DBaaS instance (e.g., backup instance 403) and from there is backed up into managed copies 417, as if it were the source DBaaS instance, as described in more detail elsewhere herein.

Managed snapshot copies 417, which result from backing up backup instance 403, are under the control of and managed by data storage management system 400. Thus, in contrast to cloud service providers that maintain DBaaS snapshots such as snapshot 304 in an opaque state, the illustrative system leverages the snapshot into managed copies (e.g., 417) that can be accessed at a more granular level; more generally, managed copies 417 are controlled by the cloud services subscriber and not by the cloud service provider.

The invention is not limited to the depicted configuration. For example, in other embodiments, as illustrated in regard to managed copies 416 in the preceding figures, managed snapshot copies 417 are stored in another cloud service account and/or outside a cloud computing environment in a non-cloud data center. Likewise, in regard to storage manager 440 and backup proxies 406, which need not be in the same cloud service account as source DBaaS 302 or backup DBaaS instance 403. Likewise, backup DBaaS instance 403 need not be in the same cloud service account 302 as source DBaaS 302. Any combination and permutation of configurations depicted in FIGS. 4A-4F is possible within data storage management system 400.

Figure 5:
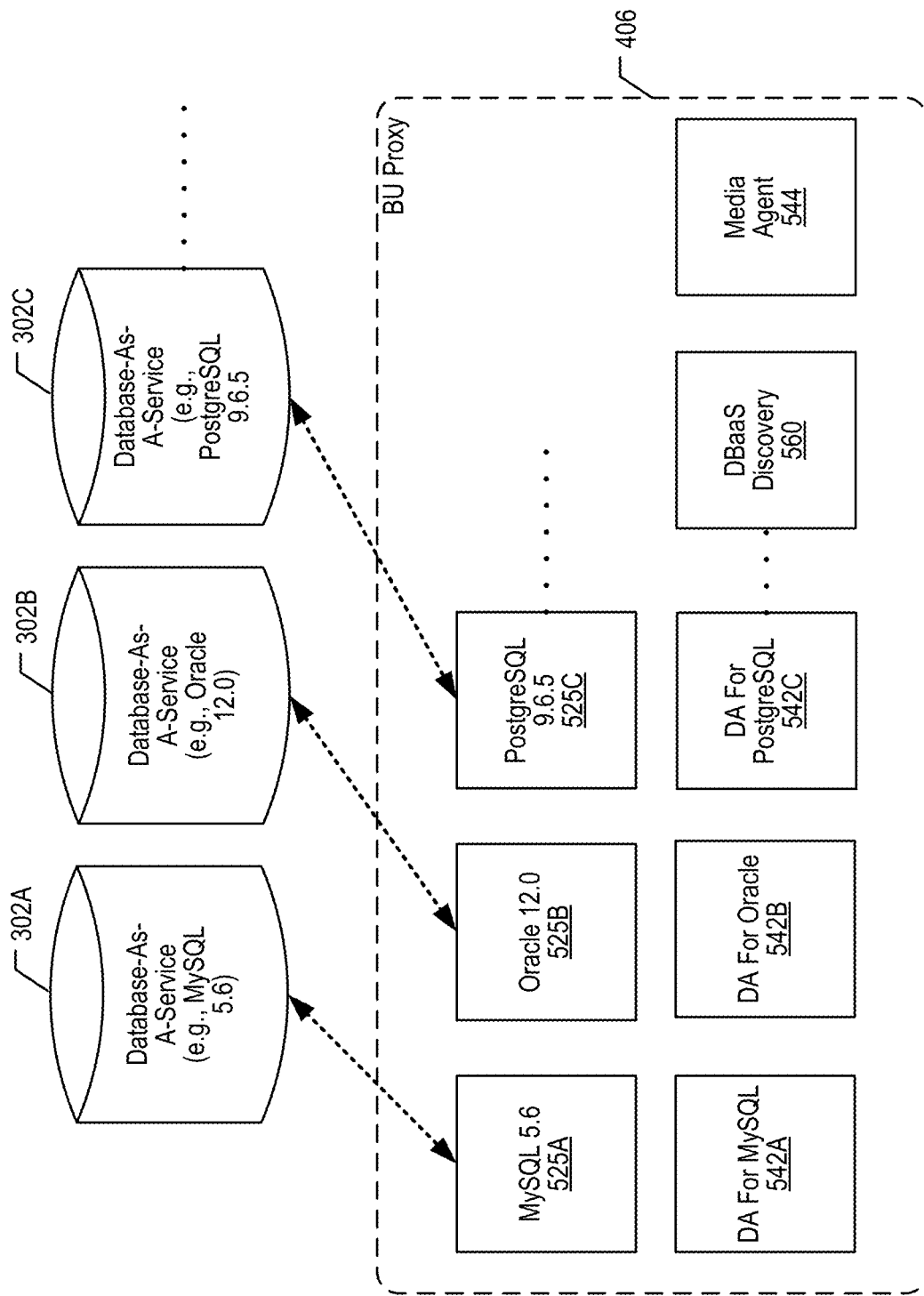
FIG. 5 is a block diagram illustrating some salient portions of a backup proxy 406 in relation to a plurality of DBaaS instances.

FIG. 5 is a block diagram illustrating some salient portions of a backup proxy 406 in relation to a plurality of DBaaS instances. The present figure depicts: DBaaS instance 302A (MySQL DBMS version 5.6); DBaaS instance 302B (Oracle DBMS version 12.0); DBaaS instance 302C (PostgreSQL DBMS version 9.6.5), etc.; and backup proxy 406 comprising: DBMS client 525A (MySQL DBMS version 5.6); DBMS client 525B (Oracle DBMS version 12.0); DBMS client 525C (PostgreSQL DBMS version 9.6.5); etc. corresponding to the DBaaS instances 302; data agent 542A (for MySQL); data agent 542B (for Oracle); data agent 542C (for PostgreSQL); etc. corresponding to the DBMS clients 525; DBaaS discovery routing 560; and media agent 544. Other elements depicted in earlier figures are not shown here, e.g., cloud computing account 301, storage manager 440, managed backup copies 416/417, etc.

DBaaS instance 302 (e.g., 302A, 302B, 302C) are described in more detail elsewhere herein. As depicted by the dotted bi-directional arrows, each DBaaS instance has a corresponding DBMS client 525 (e.g., 525A, 525B, 525C, respectively) configured in backup proxy 406.

Each DBMS client 525 (e.g., 525A, 525B, 525C) is provisioned in backup proxy 406 as a set of executables (e.g., binary files) that, when activated, execute on the backup proxy 406 and operate as a DBMS client, i.e., a database management system that lacks database data but has all the features, interfaces, utilities, etc. that are native to the particular DBMS version. Thus, an executing DBMS client 525 will establish communications with a DBaaS instance 302 that executes the same type of DBMS (e.g., MySQL, Oracle, PostgreSQL, DB2, etc.) and uses the same version or a compatible version of the DBMS. Thus, a correspondence and compatibility relationship between DBMS client 525 and DBaaS instance 302 ensures that they can communicate and transmit database data successfully. The correspondence and compatibility relationship further ensures that DBMA client 525 invokes API commands that DBaaS instance 302 can properly interpret and respond to.

In some scenarios, a cloud computing account 301 may have several versions of DBaaS instances of a certain kind of DBMS, e.g., MySQL 3.0 and MySQL 5.6, without limitation. Through they are of the same kind of DBMS (e.g., MySQL), the versions may be mutually incompatible. Therefore, a corresponding DBMS client 525 will be added to backup proxy 406 for each distinct version of MySQL DBaaS instance 302. On the other hand, when multiple DBaaS instances of the same kind of DBMS (e.g., MySQL) all have the same or substantially the same or compatible versions (e.g., 5.6 and 5.6.1) it is sufficient, according to the illustrative embodiment, to add only one DBMS client 525 (e.g., MySQL 5.6.1) to backup proxy 406, so long as it is compatible with the target DBaaS instances 302. Compatibility includes APIs that work at both ends, the ability to ingest database data at the DBMS client 525 as received from DBaaS instance 302, and conversely the ability to transmit database data from DBMS client 525 to DBaaS instance 302 so that it can be ingested therein without data corruption. Thus, so long as DBMS client 525 is compatible with one or more corresponding DBaaS instances 302, the DBMS client 525 can be invoked as needed to execute on backup proxy 406. There is no limit on how many DBMS clients 525 are configured within and execute on a backup proxy 405.

Data agent 542 (e.g., 542A, 542B, 542C) is analogous to data agent 142, which is described in more detail elsewhere herein. Like DBMS client 525, each data agent 542 is provisioned in backup proxy 406 as a set of executables (e.g., binary files) that, when activated, execute on the backup proxy 406 and operate as a data agent that is specially designed (suitable) to protect, recover, and migrate a certain kind of DBMS. Illustratively, data agent 542A is suitable for MySQL DBMS and is added to backup proxy 406 because one or more MySQL DBMS clients 525 are configured therein. Likewise, data agent 542B is suitable for Oracle DBMS and is added to backup proxy 406 because one or more Oracle DBMS clients 525 are configured therein. Likewise, data agent 542C is suitable for PostgreSQL DBMS and is added to backup proxy 406 because one or more PostgreSQL DBMS clients 525 are configured therein. So long as data agent 525 is compatible with one or more corresponding DBMS clients 525, data agent 542 can be invoked as needed to execute on backup proxy 406. There is no limit on how many data agents 542 are configured within and execute on a backup proxy 405.

DBaaS discovery routine 560 is provisioned in backup proxy 406 as a set of executables (e.g., binary files) that, when activated, execute on the backup proxy 406 and operate to discover any DBaaS instances 302 that are active/operational in cloud computing account 301. Discovery routing 560 is executed from time to time to determine whether cloud computing account 301 has new or discontinued DBaaS instances 302 and when changes are detected, to cascade the updates to storage manager 440, management database 646. The configuration (make up) of backup proxies 406 is updated on detecting new types and/or versions of DBaaS instances 302 that lack a corresponding DBMS client 525 and/or data agent 542 in backup proxy 406. Accordingly, suitable DBMS clients 525 and/or data agents 542 are added to backup proxies 406. Conversely, DBMS clients 525 and/or data agents 542 are removed from backup proxies 406 after detecting that certain DBaaS instances 302 have been discarded. In some scenarios, backup operations are applied to a DBaaS instance 302 before it is discarded.

Media agent 544 is analogous to data agent 144, which is described in more detail elsewhere herein. Like DBMS client 525 and data agent 542, media agent 544 is provisioned in backup proxy 406 as a set of executables (e.g., binary files) that, when activated, execute on the backup proxy 406 and operate as a media agent that is specially designed (suitable) to generate backup copies and transmit them to secondary storage, whether in-cloud, other-cloud, or off-cloud secondary storage. Media agent 544 is further responsible for associating multiple segment backup copies of a given DBaaS instance (i.e., individual backup copies of segments of data issued by the DBaaS instance 302) into a logical managed backup copy 416/417 that represents the entire result of the backup operation applied to DBaaS instance 302. Like media agent 144, media agent 544 maintains an index 153 that tracks certain information about the generated backup copies. Media agent 544 also is responsible for retrieving backup copies 416/417 when involved in a restore or migrate operation. Like media agent 144, media agent 544 communicates and collaborates with data agent 542 to generate and/or retrieve managed backup copies 416/417.

By equipping each backup proxy 405 with a DBMS client 525 that corresponds to each of the discovered DBaaS instances 302, system 400 is properly configured to protect, recover, and migrate any and all of the discovered DBaaS instances 302 using any of the configured backup proxies 406. By having every backup proxy 406 configured alike, system 400 gains flexibility in selecting and deploying backup proxies 406 from pool 405. For example, if a VM hosting a backup proxy 406 is already powered on when a backup proxy is needed, it can be put into service immediately by storage manager 440, because it is already fully equipped for any DBaaS instance in the cloud computing account 301.

Figure 5A:
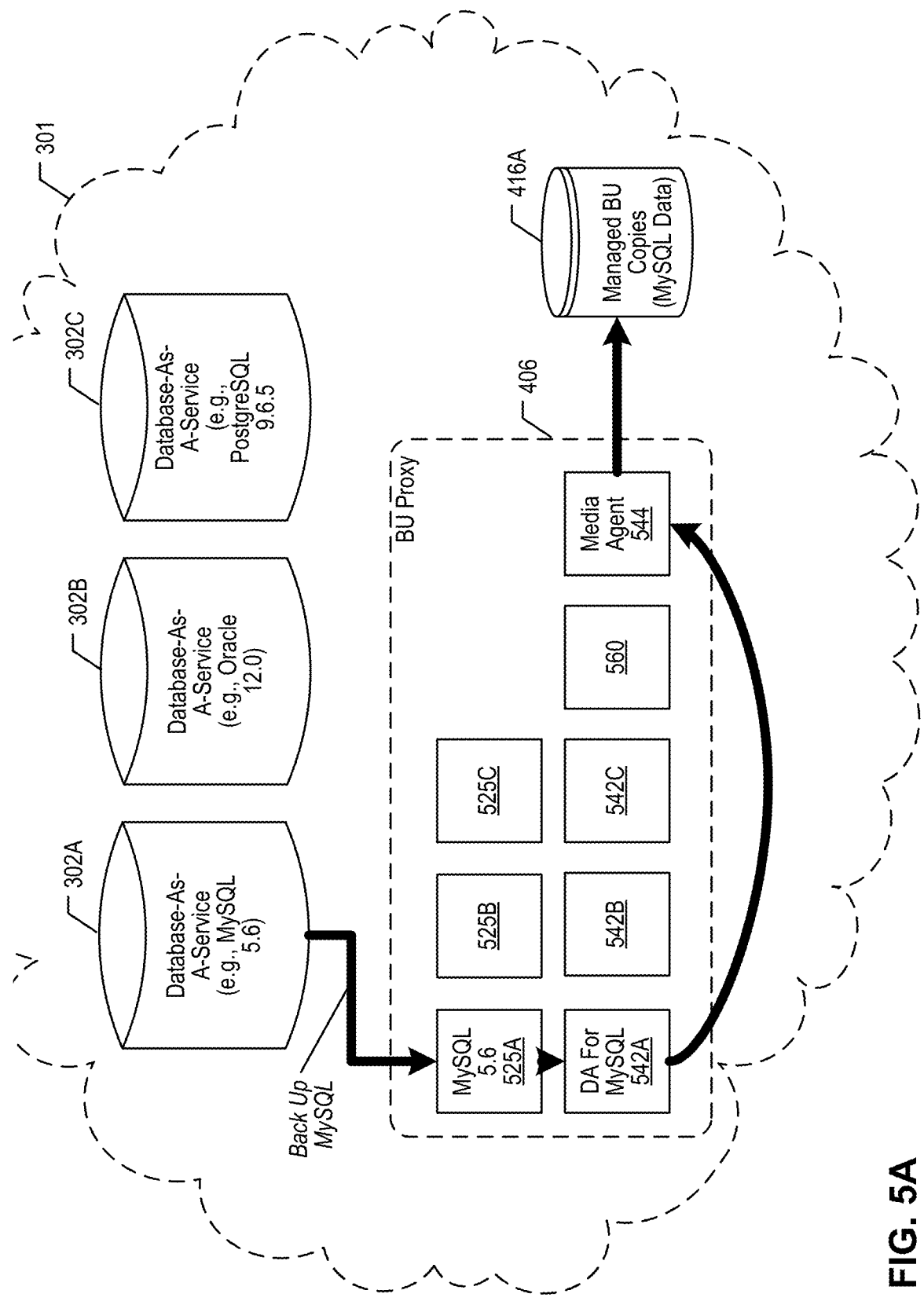
FIG. 5A is a block diagram illustrating some salient portions of system 400 in a multi-DBaaS environment and depicting backups of a MySQL DBaaS instance.

FIG. 5A is a block diagram illustrating some salient portions of system 400 in a multi-DBaaS environment and depicting backups of a MySQL DBaaS instance. The present figure depicts the same components shown in FIG. 5 plus: cloud computing account 301, and managed backup copies 416A resulting from a backup operation for DBaaS instance 302A (MySQL version 5.6). Logical data paths for creating managed backup copies 416A from DBaaS instance 302A are depicted by the bold one-way arrows. Illustratively, DBMS client 525A (MySQL version 5.6) executes on backup proxy 406 along with data agent 542A (suitable for MySQL DBMS) and media agent 544.

Figure 5B:
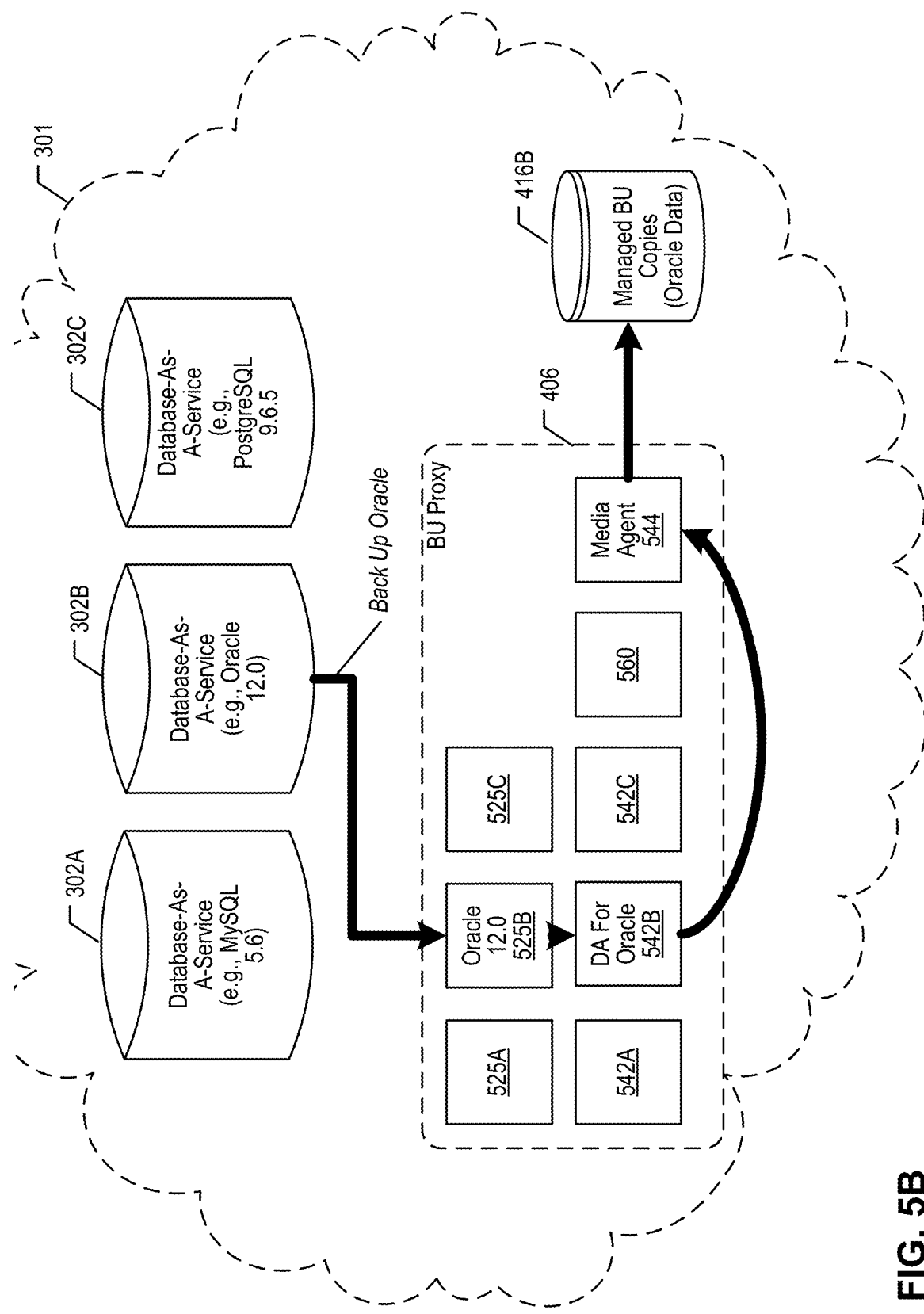
FIG. 5B is a block diagram illustrating some salient portions of system 400 in a multi-DBaaS environment and depicting backups of an Oracle DBaaS instance.

FIG. 5B is a block diagram illustrating some salient portions of system 400 in a multi-DBaaS environment and depicting backups of an Oracle DBaaS instance. The present figure depicts the same components shown in FIG. 5 plus: cloud computing account 301, and managed backup copies 416B resulting from a backup operation for DBaaS instance 302B (Oracle version 12.0). Logical data paths for creating managed backup copies 416B from DBaaS instance 302B are depicted by the bold one-way arrows. Illustratively, DBMS client 525B (Oracle version 12.0) executes on backup proxy 406 along with data agent 542B (suitable for Oracle DBMS) and media agent 544.

Figure 5C:
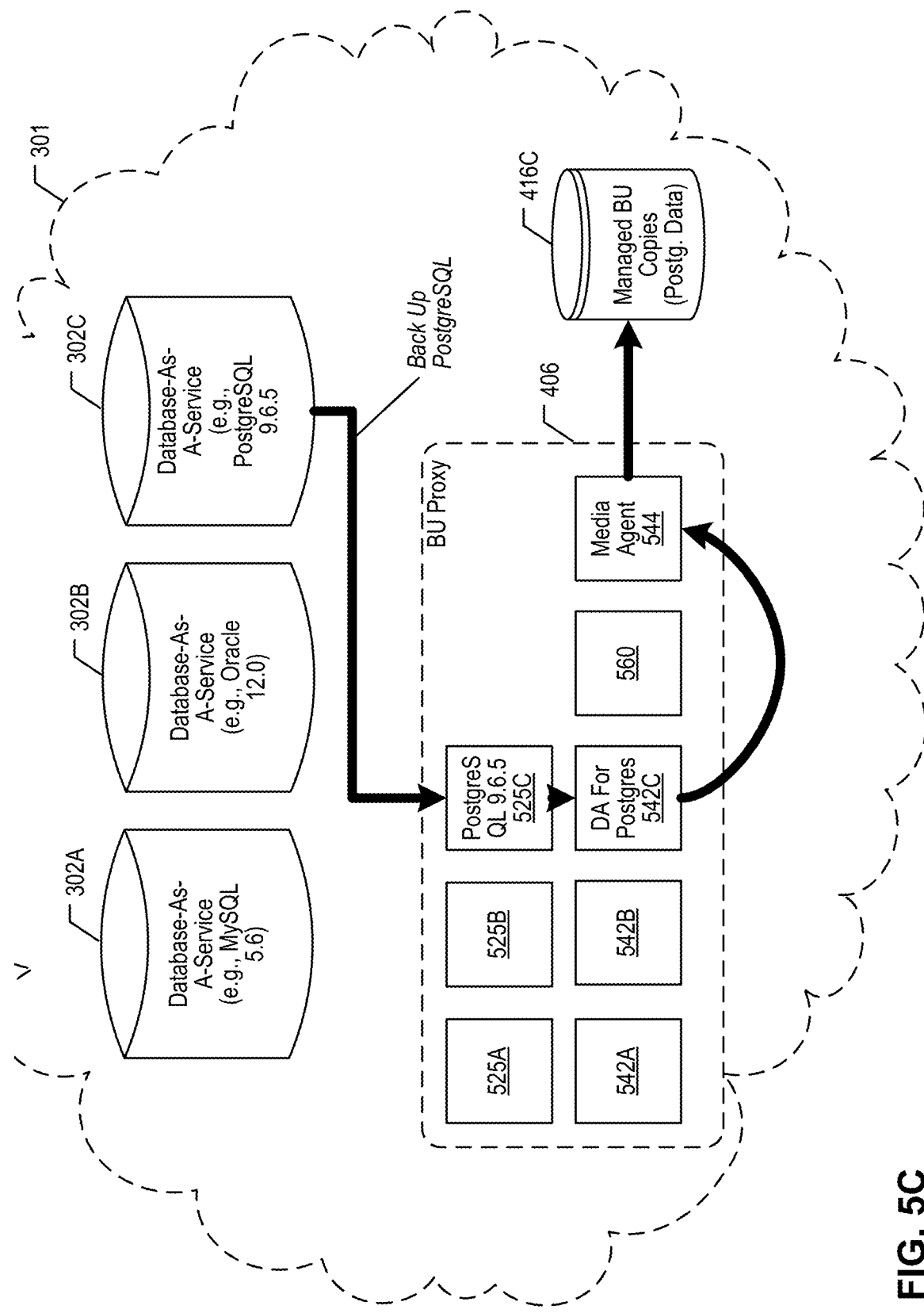
FIG. 5C is a block diagram illustrating some salient portions of system 400 in a multi-DBaaS environment and depicting backups of a PostgreSQL DBaaS instance.

FIG. 5C is a block diagram illustrating some salient portions of system 400 in a multi-DBaaS environment and depicting backups of a PostgreSQL DBaaS instance. The present figure depicts the same components shown in FIG. 5 plus: cloud computing account 301, and managed backup copies 416C resulting from a backup operation for DBaaS instance 302C (PostgreSQL version 9.6.5). Logical data paths for creating managed backup copies 416C from DBaaS instance 302C are depicted by the bold one-way arrows. Illustratively, DBMS client 525C (PostgreSQL version 9.6.5) executes on backup proxy 406 along with data agent 542C (suitable for PostgreSQL DBMS) and media agent 544.

Figure 5D:
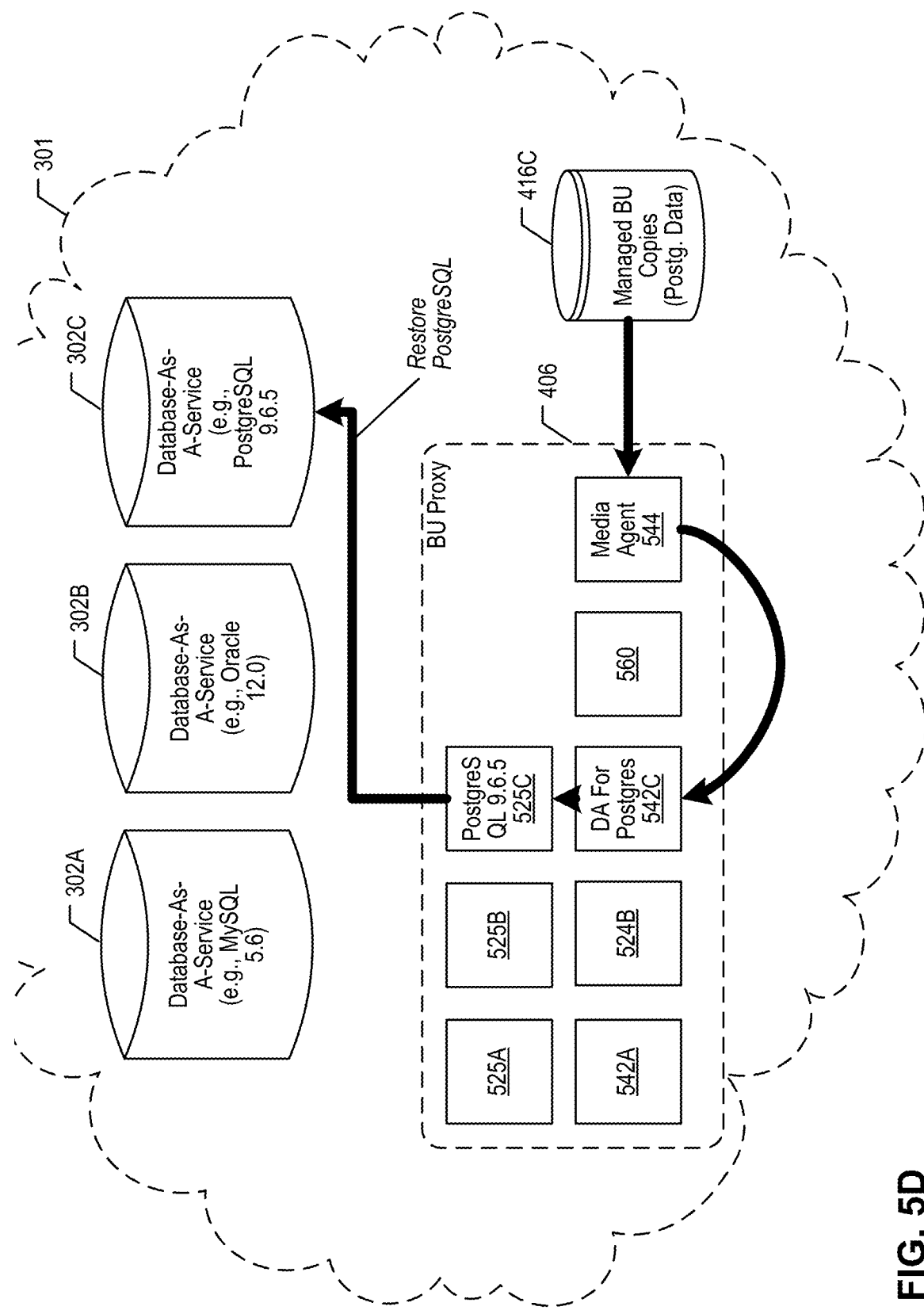
FIG. 5D is a block diagram illustrating some salient portions of system 400 in a multi-DBaaS environment and depicting restoring a MySQL DBaaS instance from a managed backup copy.

FIG. 5D is a block diagram illustrating some salient portions of system 400 in a multi-DBaaS environment and depicting restoring a MySQL DBaaS instance from a managed backup copy. The present figure depicts the same components shown in FIG. 5 plus: cloud computing account 301, and managed backup copies 416C resulting from a previous backup operation for DBaaS instance 302C (PostgreSQL version 9.6.5). Logical data paths for restoring managed backup copies 416C to DBaaS instance 302C are depicted by the bold one-way arrows. Illustratively, DBMS client 525C (PostgreSQL version 9.6.5) executes on backup proxy 406 along with data agent 542C (suitable for PostgreSQL DBMS) and media agent 544.

Figure 6:
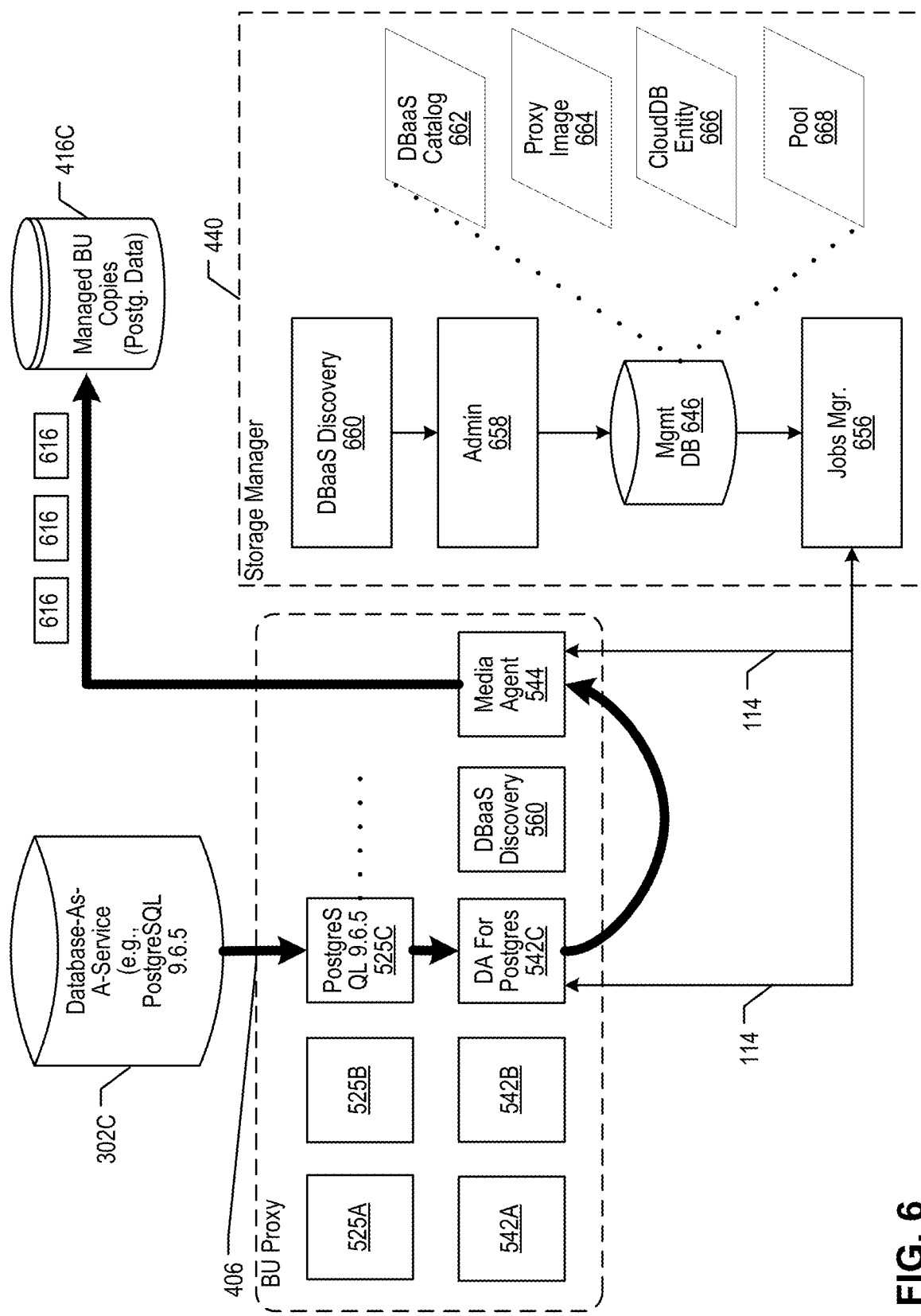
FIG. 6 is a block diagram depicting some salient portion of system 400, including certain aspects of the storage manager.

FIG. 6 is a block diagram depicting some salient portion of system 400, including certain aspects of illustrative storage manager 440. The present figure depicts the same components shown in FIG. 5B plus: segment backup copies 616; storage manager 440 comprising management database 646, jobs manager 656, administration manager 658, and DBaaS discovery routine 660. Management database 646 comprises illustrative data structures including DBaaS catalog 662, proxy image 664, CloudDB entity 666, and data protection resource pool 668. Storage manager 440 is in communication with data agent 542C and media agent 544 via communication pathways 114.

On a backup operation such as the one depicted here, data agent 542 instructs DBMS client 525 to instruct target DBaaS instance 302 to extract data (e.g., an API "data dump command"). As data segments come in from DBaaS instance 302, they are received by DBMS client 525 and/or by data agent 542. If not directly intercepting data segments, data agent 542 reads the data segments from DBMS client 525 (e.g., in local memory).

Depending on pre-administered preferences, data agent 542 applies certain processing to the received data segments and then transmits the resulting data to media agent 544. Media agent 544 applies further processing also based on pre-administered preferences, generates individual segment backup copies 616, stores them to appropriate secondary storage, and generates/updates indexing information for tracking the backup copies. Media agent 544 generates a logical managed backup copy 416C from the plurality of segment backup copies 616. Pre-administered preferences (e.g., storage policies, information management policies, etc.) are generally stored in management database 646 and include parameters such as whether to compress and/or encrypt and/or deduplicate the data, where to store secondary copies, how long to retain the copies, etc.

Storage manager 440 initiates backup, restore, and/or migration operations. Storage manager 440 selects backup proxy 406 from pool 405, instructs backup proxy 405 which executables to execute (activate, invoke) (e.g., DBMS client 525C, data agent 542C, media agent 544) so that the storage operation can proceed. Storage manager 440 instructs data agent 542 and media agent 544 on particulars based on the pre-administered preferences. Storage manager 440 initiates backup, restore, and/or migration operations, based on any number of criteria, e.g., a schedule, a dynamic trigger, on demand from a user, etc., without limitation.

Segment backup copies 616 are analogous to any backup copy 116, i.e., in formatting, metadata, etc. According to the illustrative embodiments, because DBaaS instances 302 transmit their data in segments (e.g., chunks, extents, groupings, etc.) when performing a "data dump," system 400 is configured to process and back up each segment individually or in groups of segments rather than gathering all the data at the backup proxy and generating a unitary backup copy thereof. By processing the data segments individually or in relatively small groupings, the illustrative system gains performance speed. Media agent 544 tracks all the segment backup copies 616 resulting from a backup of a DBaaS instance 302 and creates associations such that a logical view exists of a managed backup copy 416/417, even though the managed backup copy was created and stored in segment backup copies 616.

Management database 646 is analogous to management database 146 and further comprises data structures for system 400, e.g., DBaaS catalog 662, proxy image 664, CloudDB entity 666, and data protection resource pool 668.

Jobs manager 656 is analogous to jobs manager 156 and further comprises additional features for operating in system 400. For example, jobs manager 656 is enhanced with certain trigger mechanisms for backing up a DBaaS instance 302 and is further enhanced to select an appropriate backup proxy 406 (e.g., by determining that the host VM is powered on and the backup proxy is not overloaded). In regard to trigger mechanisms for backing up a DBaaS instance 302, jobs manager is enhanced with one or more of the following features: to monitor resource usage at the DBaaS instance 302 and initiate a backup when DBaaS load is low, e.g., after hours; to monitor configuration information of the DBaaS instance 302 and trigger a backup when it detects a version upgrade and/or on detecting that a new database has been added to the DBaaS instance 302. Of course, jobs manager 656 also will trigger a backup based on pre-administered preferences such as a schedule, or in response to an on-demand request from a user/administrator. These features are illustratively included in jobs manager 656, but the invention is not so limited and in alternative embodiments other parts of storage manager 440 perform one or more of these features. For example, a management agent 154 or a resource manager (not shown) might be tasked with selecting a backup proxy from the proxy pool 405.

Administration manager 658 is analogous to admin manager module 156 and further comprises features for administering new entities and data structures in system 400, e.g., for administering CloudDB entities.

DBaaS discovery routine 660 is analogous to discovery routine 560 but it is part of storage manager 440. Thus, manager 440 is said to discover (e.g., using discovery routine 660) all the DBaaS instances 302 in a given cloud computing account 301. In some embodiments, storage manager 440 causes a backup proxy 406 to activate in the cloud computing account 301, to execute discovery routine 560, and to report results to storage manager 440, which generates DBaaS catalog 662.

DBaaS catalog 662 is a data structure preferably stored in management database 646, though the invention is not so limited. DBaaS catalog 662 comprises information about all the DBaaS instances 302 discovered in one or more given cloud computing accounts, e.g., 301. DBaaS discovery routine 660 and/or 560, which performs the discovery operations collects information about each discovered DBaaS instance 302. The information is then collected and stored in DBaaS catalog 662. Catalog 662 includes information such as: identity of cloud computing account; identity of cloud service provider; name of DBaaS instance; type of DBMS (e.g., Oracle, MySQL, PostgreSQL, etc.); version of the DBMS; last upgrade date; start-up date; database size; etc., without limitation. Any number of catalogs 662 can be stored in management database 646.

Proxy image 664 is a data structure preferably stored in management database 646, though the invention is not so limited. In some embodiments, proxy image 664 is stored outside storage manager 664 and a pointer thereto is stored in management database 646. Proxy image 664 is based on information in catalog 662. Each proxy image 664 is a collection of executables (e.g., binary files), wherein the collection reflects the discovered DBaaS instances 302. The collection comprises executables for: all the DBMS client types/versions 525 corresponding to the discovered DBaaS instances 302; all the data agents 542 suitable to back up the DBMS client types/versions 525; media agent 544; and DBaaS discovery routine 560. Proxy image 664 is configured into each of a plurality of VMs that will operate as backup proxies 406. Proxy image 664 is updated as needed when DBaaS catalog 662 changes after a discovery routine 560/660 runs. Thus, proxy image 664 is generated and maintained by storage manager 440, e.g., using a resource manager (not shown), using jobs manager 656, etc.

CloudDB entity 666 is a data structure that is administered to represent a discovered DBaaS instance 302 within data storage management system 400. Thus, each discovered DBaaS instance 302 is represented by a corresponding CloudDB entity 666. The CloudDB entity acts as a "client" entity within system 400, i.e., becomes associated with preferences and other criteria.

Data protection resource pool 668 is a data structure preferably stored in management database 646, though the invention is not so limited. Backup resource pool 668 tracks all the virtual machines configured as backup proxies 406 (i.e., configured with proxy image 664), i.e., it represents and tracks data protection resource pool 405. Preferably, the VMs configured with proxy image 664 are instantiated in the same cloud computing account as the target DBaaS instance 302 that is to be backed up, because this arrangement will provide faster backup performance, but the invention is not so limited. Data protection resource pool 668 also tracks what proxy image 664 is configured into any given VM, so that updates can be implemented as needed when proxy image 664 changes. When it triggers a backup, recovery, and/or migration operation for a DBaaS instance 302, storage manager 440 (e.g., using jobs manager 656) selects a backup proxy 406 by consulting pool data structure 668. Criteria for selection include one or more of: a round robin algorithm that cycles through all the proxies 406 in pool 405; whether a host VM is already powered on; whether a powered on backup proxy 406 is carrying a processing load light enough to sustain the contemplated backup operation; etc., without limitation.

Figure 7:
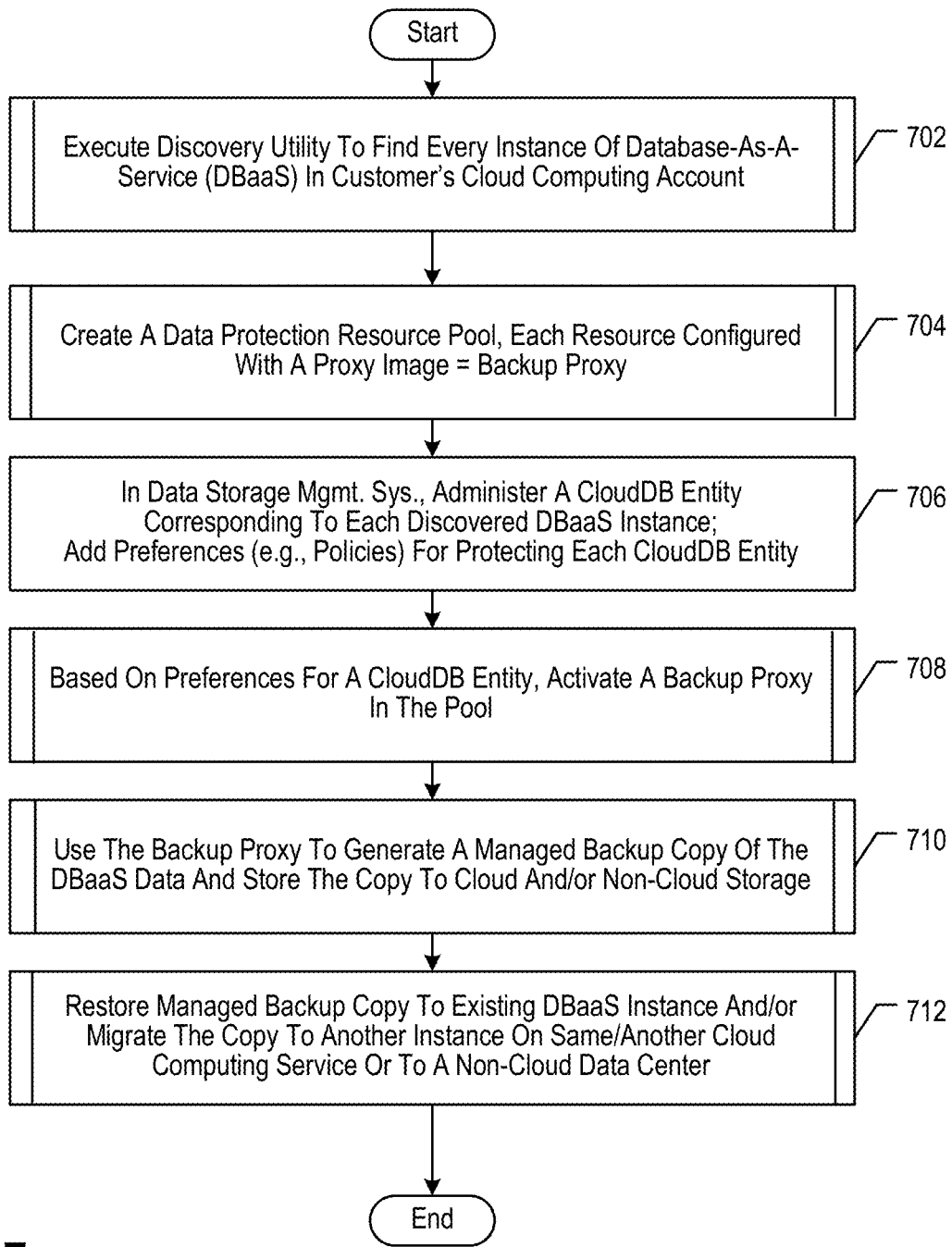
FIG. 7 depicts some salient operations of a method 700 according to an illustrative embodiment of the present invention.

FIG. 7 depicts some salient operations of a method 700 according to an illustrative embodiment of the present invention. Method 700 is performed by one or more components of system 400, e.g., storage manager 440, data agents 542, media agents 544, backup proxies 406, etc.

At block 702, discovery utility (e.g., 560, 660) is executed to find every instance of database-as-a-Service (DBaaS) 302 in a cloud computing account 301. In some embodiments, the discovery utility is configured in a cloud computing account 301 apart from backup proxy 405 or is executed from a computing devices such as 310 that has access to the cloud computing account. More details are given in another figure.

At block 704, storage manager 440 creates a data protection resource pool 405, by configuring each resource therein (e.g., VMs in a plurality of VMs) with proxy image 664, thereby creating backup proxies 406. More details are given in another figure.

At block 706, a cloudDB entity 666 is administered (e.g., using administration manager 658) corresponding to each discovered DBaaS instance 302. CloudDB entity 666 includes information about DBaaS instance 302, such as type of DBMS, version of DBMS, etc. Additional administration includes preferences (e.g., policies) for protecting each CloudDB entity 666, i.e., for protecting the DBaaS instance 302 it represents. For example, each CloudDB entity 666 has an associated storage policy that defines where managed backup copies 416 are to be stored and how long they are to be retained. For example, each CloudDB entity 666 has associated criteria for triggering backups, such as a schedule, version upgrades, new databases, database size, etc. These criteria will cause storage manager 440 to trigger a backup operation for the DBaaS instance 302 that is represented by its corresponding CloudDB entity 666. See also FIG. 6.

At block 708, based on preferences administered for a CloudDB entity 666, storage manager 440 activates a backup proxy 406 in the pool 405. In some embodiments, backup proxies 406 are activated (powered on) on demand within cloud computing account 301 and de-activated when the backup, restore, and/or migration operation ends, thereby achieving substantial economies in the cost of cloud-based protection for DBaaS instances. The ability to power on and off the VMs that act as backup proxies 406 provides a considerable advantage to customers who use cloud services for DBaaS instances and also wish to maintain control over how and when to protect the database data in those instances. The advantages include limiting the cost of running VMs in the cloud computing environment and speedy and scalable backup/restore/migration. More details are given in another figure.

At block 710, backup proxy 406 is used for generating one or more managed backup copies 416/417 of DBaaS instance data. The managed copies 416/417 are stored to cloud and/or non-cloud storage. The illustrative embodiments offer many choices of where to store managed backup copies with the further advantage of controlling retention and migration plans. More details are given in another figure.

At block 712, backup proxy 406 is used for restoring a managed backup copy 416/417 to an existing DBaaS instance 302 and/or for migrating the copy to another instance on the same or on another cloud computing service or to a non-cloud data center. More details are given in another figure.

Figure 8:
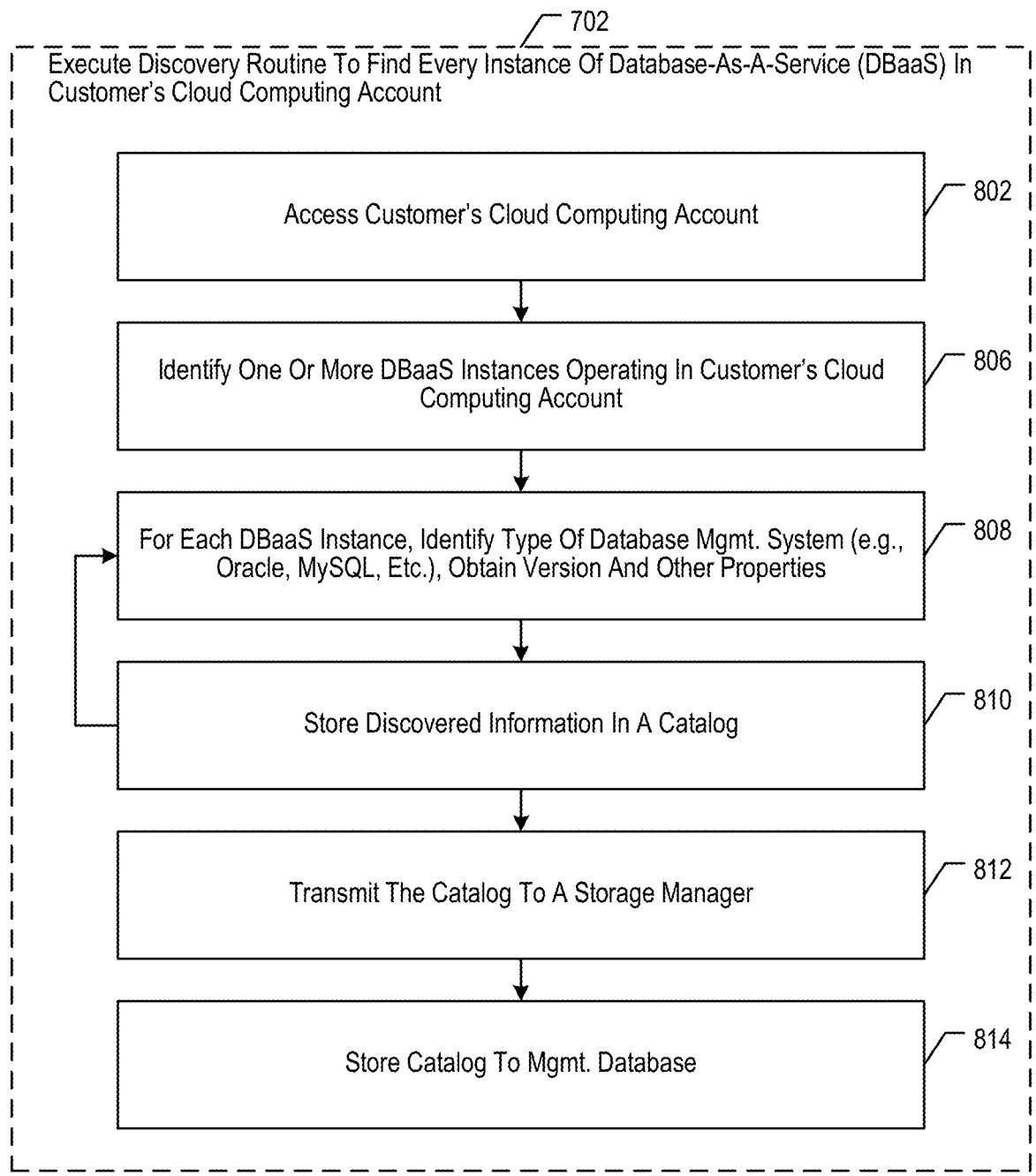
FIG. 8 depicts certain sub-operations of block 702 of method 700.

FIG. 8 depicts certain sub-operations of block 702 of method 700. Block 702 is generally directed to executing a discovery routine (utility) to find every DBaaS in a cloud computing account 301. Discovery routine 560 is illustratively implemented and executed by backup proxy; discovery routine 660 is illustratively implemented and executed by storage manager 440. In some embodiments, the discovery routine is configured in a cloud computing account 301 apart from backup proxy 405, such as by configuring the routine in a VM instance in cloud computing account 301 and executing the routine on demand as triggered by storage manager 440. In some embodiments, the discovery routine is executed from a computing device such as 310 that has access to the cloud computing account.

At block 802, access is made to the customer's cloud computing account, e.g., authentication process, password, etc. and the discovery routine is activated to execute.

At block 806, the discovery routine identifies one or more DBaaS instances operating in the customer's cloud computing account. The discovery routine is tuned to operate in different cloud computing environments (e.g., Amazon AWS, Microsoft Azure, Oracle Cloud, etc.) to perform the discovery operations, e.g., using certain APIs that are environment-specific.

At block 808, for each DBaaS instance, the discovery routine identifies type of DBMS and obtains version and other properties for each discovered DBaaS instance. Examples of types or kinds of DBMS include: MySQL, Oracle, PostgreSQL, Microsoft SQL, Aurora, Maria DB, Dynamo DB, Redshift, Data Lake, Microsoft Office 365 Suite, Cosmos DB, MongoDB, IBM DB2, etc., without limitation. Examples of other properties for a DBaaS instance include which cloud computing environment hosts it (e.g., Amazon AWS, Microsoft Azure, etc.), database size, and other database metadata, such as creation/change dates, permissions, etc.

At block 810, the discovery utility stores the discovered information in a catalog, e.g., catalog 662.

At block 812, the discovery utility transmits the catalog to a storage manager, e.g., 440. Of course, if storage manager 440 is the one that executes the discovery utility, this step is skipped, as the storage manager is already in possession of the catalog.

At block 814, storage manager 440 stores the DBaaS catalog to management database 646.

Figure 9:
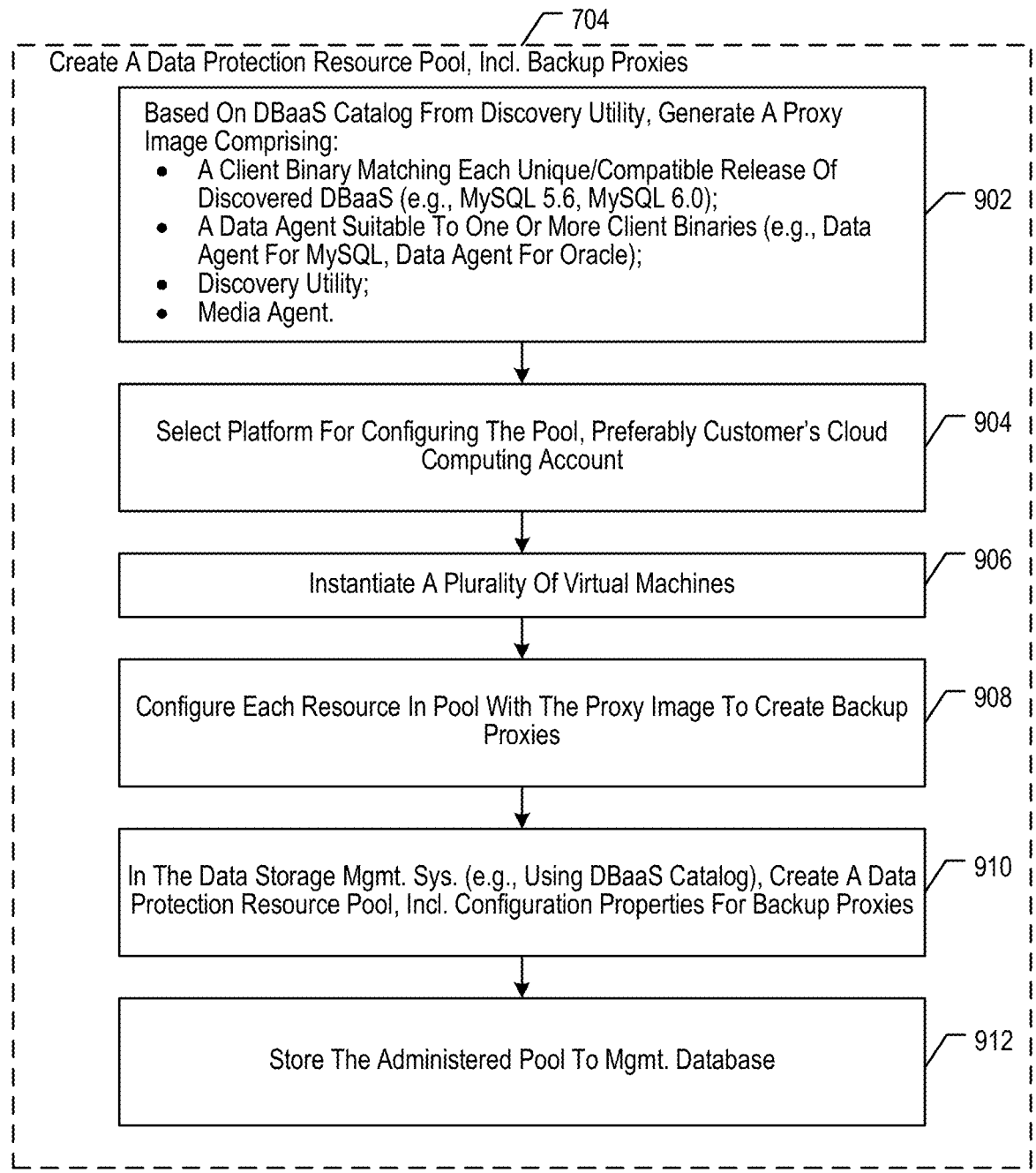
FIG. 9 depicts certain sub-operations of block 704 of method 700.

FIG. 9 depicts certain sub-operations of block 704 of method 700. Block 704 is generally directed to creating a data protection resource pool 405, incl. backup proxies 406. This block is executed by storage manager 440, except where stated otherwise.

At block 902, based on the DBaaS catalog from the discovery utility, a proxy image 664 is generated. The proxy image illustratively comprises:

- A DBMS client binary matching each unique/compatible release of discovered DBaaS instances (e.g., MySQL 5.6, MySQL 6.0). The client binary is a set of executable files for executing a database management system (DBMS) of the given version. The client binary does not comprise database data.
- Binaries (e.g., executable files) for data agents 542 suitable to one or more client binaries (e.g., data agent for MySQL, data agent for Oracle). A particular kind of data agent 542 may be suitable to back up/restore one or more kinds of DBMS. Storage manager 440 is aware of the compatibilities. Accordingly, storage manager 440 selects the data agent types needed for the DBMS client binaries above.
- The discovery routine 560.
- Binaries (e.g., executable files) for media agent 544.

At block 904, storage manager 440 selects a computing platform for configuring the data protection resource pool 405, preferably customer's cloud computing account 301. Any computing platform that can establish a communicative connection with cloud computing account 301 can be selected, e.g., another cloud computing account, another cloud service environment, a non-cloud data center, etc., but better performance will be achieved when the backup proxies are in the same cloud computing account as the target DBaaS instances, e.g., 301.

At block 906, storage manager 440 causes instantiation of a plurality of virtual machines that will become backup proxies 406. In a non-cloud data center, the VMs will be instantiated on a VM server or like computing device.

At block 908, storage manager 440 causes each resource in pool 405 to be configured with proxy image 664 to create backup proxies 406. Thus, each instantiated VM is equipped with a full complement of DBMS client binaries 525, data agents 542, media agent 544, and, optionally, with the discovery routine 560, thereby becoming a backup proxy 406. Preferably, backup proxies 406 are specially-configured VMs, but the invention is not so limited, and therefore backup proxies 406 are implemented in non-virtualized computing devices in some alternative embodiments. Sometimes the VM designated a backup proxy is referred to as the VM hosting the backup proxy.

At block 910, storage manager 440 (e.g., as administered by a system administrator, automatically configured by storage manager 440, and/or a combination thereof, etc.) creates an administrative data protection resource pool 668 that is based on and reflects the resources available in pool 405, including the configuration properties for backup proxies 406.

At block 912, storage manager 440 stores the administered pool 668 to management database 646. Thus, storage manager 440 tracks resource pool 405 via one or more data structures 668 that are stored in management database 646.

Figure 10:
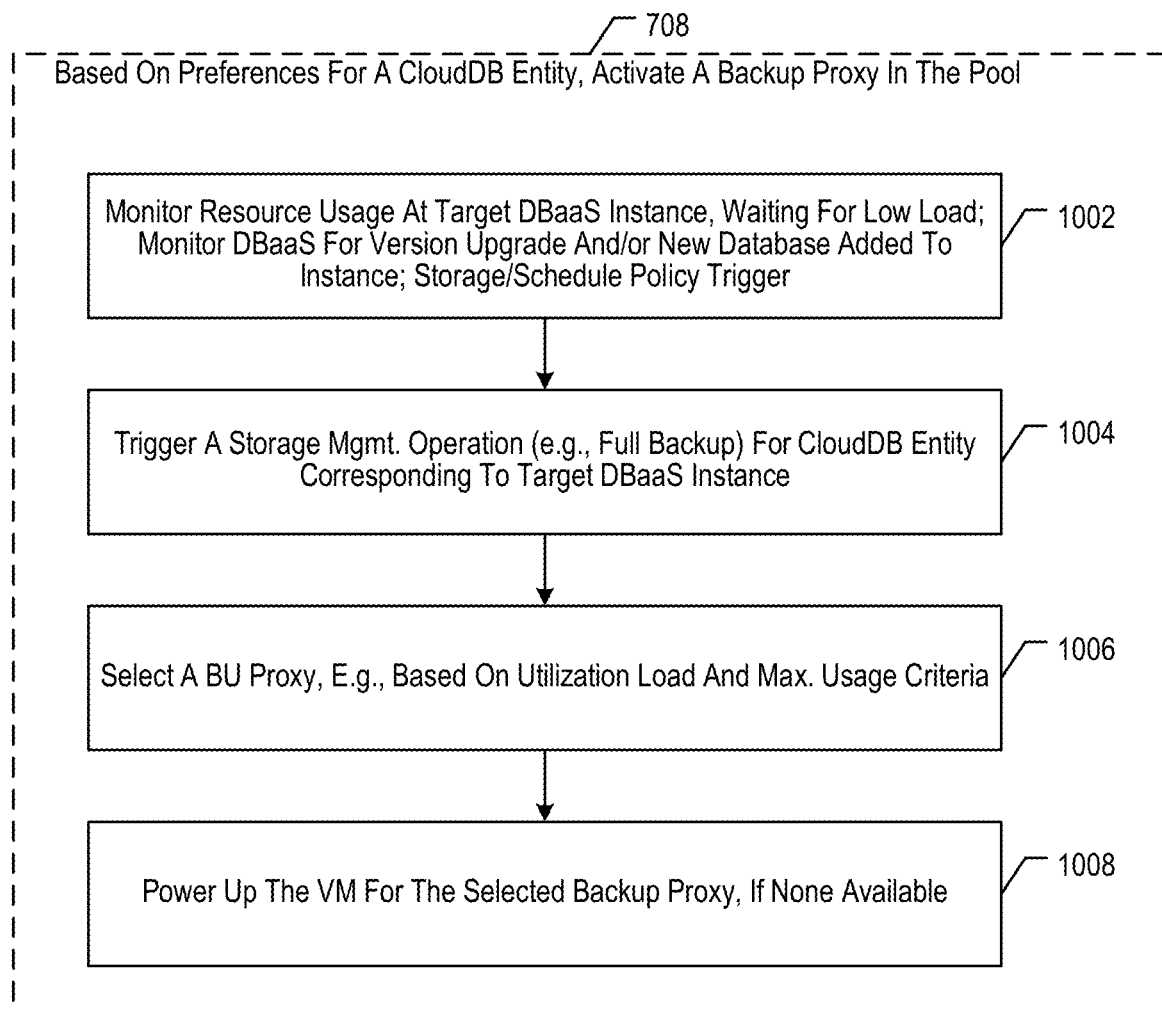
FIG. 10 depicts certain sub-operations of block 708 of method 700.

FIG. 10 depicts certain sub-operations of block 708 of method 700. Block 708 is generally directed to activating a backup proxy 406 in the resources pool 405, based on preferences for a CloudDB entity that corresponds to a target DBaaS instance 302. Block 708 is performed by storage manager 440, unless otherwise noted.

At block 1002, storage manager 440 monitors resource usage at each DBaaS instance 302. The monitoring is performed by one or more of a feature within storage manager 440 and a routine/utility running in the cloud computing account 301 where the DBaaS instances 302 operate. Resource usage monitoring enables storage manager 440 to determine a proper time to trigger a backup operation, a restore operation, or a migration operation for each target DBaaS instance 302. A fixed schedule (e.g., from a schedule policy) for such triggers is used in some embodiments. A more dynamic trigger is preferable in addition or instead of a fixed schedule, because it tends to optimize performance and lower costs incurred in the cloud computing account 301. Example monitoring criteria include without limitation: waiting for low load at the target DBaaS instance 302; monitoring the DBaaS instance for a DBaaS version upgrade; and/or monitoring the DBaaS instance to detect whether a new database is added to instance. It is generally advantageous to trigger a backup operation when detecting certain behaviors at a DBaaS instance.

At block 1004, storage manager 440 triggers (or initiates) a storage management operation (e.g., a full backup, an incremental backup, a differential backup, a migration, etc.) for the CloudDB entity 666 corresponding to the target DBaaS instance 302. Generally, the operation is initiated based on the monitoring in the preceding block, although as noted, a schedule also/instead could be the trigger.

At block 1006, storage manager 440 selects a backup proxy 406 from the various backup proxies in pool 405. One illustrative criterion for selecting a given backup proxy 406 is a utilization load currently at the given backup proxy 406, such that storage manager 440 will choose an unloaded or lightly loaded backup proxy 406, but not one over a threshold load, e.g., over 50%. Another illustrative example is a maximum usage criterion, such that storage manager 440 will choose a backup proxy that is the least used among the backup proxies in pool 405. Another illustrative example is a round robin approach.

At block 1008, storage manager 440 causes the VM hosting the selected backup proxy 406 to be powered up, if no powered up backup proxy 406 is available. One illustrative consideration is to prefer a backup proxy 406 that is already powered up (i.e., the host VM is in a powered up state) over another backup proxy that is not currently powered up (i.e., the host VM is in a powered down state). The advantage of this consideration is that in some cloud computing accounts 301 it saves considerable power-up fees that are changed by some cloud service providers. Thus, if a powered up backup proxy 406 satisfies the applicable selection criterion in block 1006 it will be selected by storage manager 440 over another backup proxy 406 that is in a powered down state. The backup proxy 406 selected by storage manager 440 will supply the resources (e.g., DBMS client 525, data agent 542, media agent 544) needed to complete the storage management operation.

Figure 11:
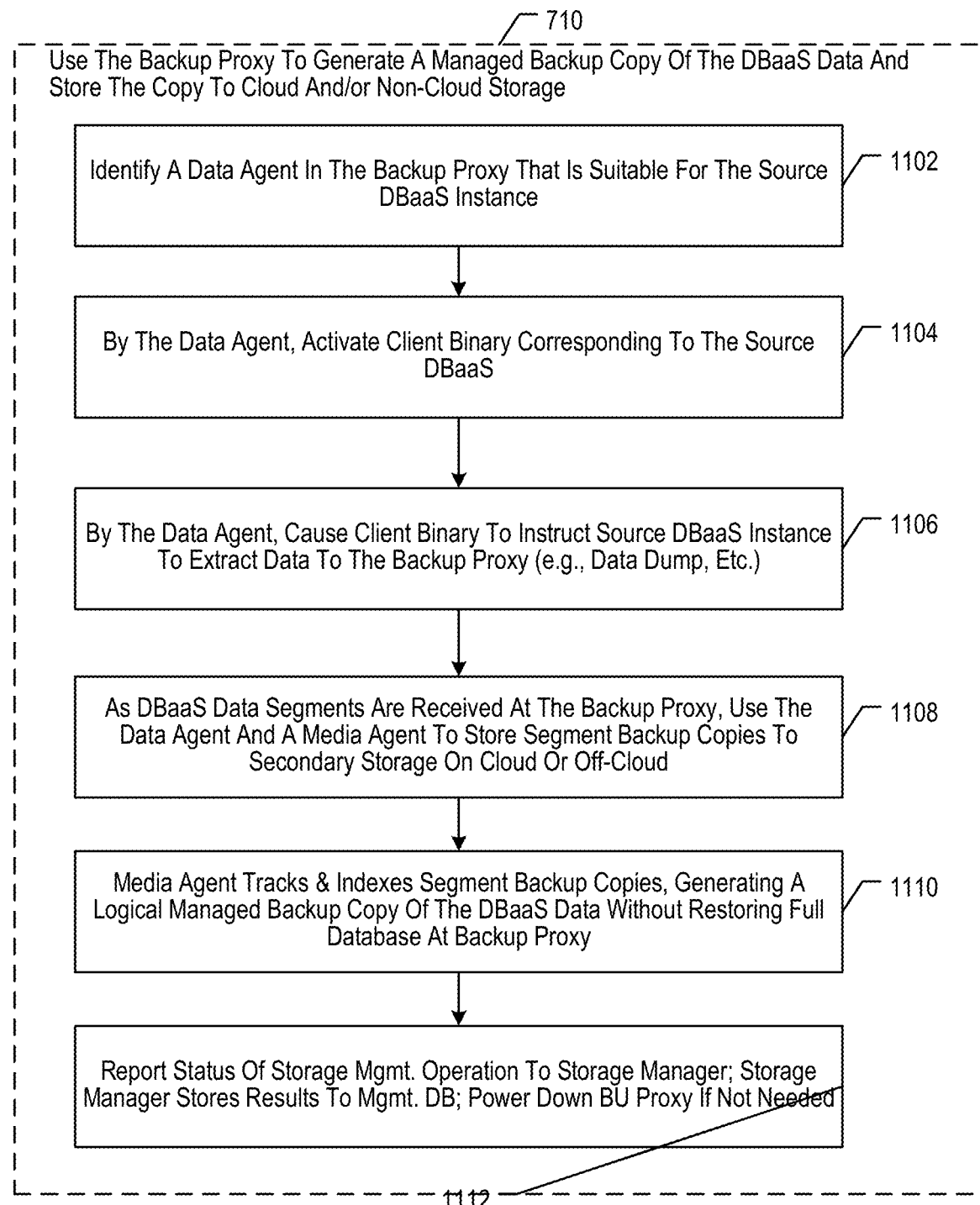
FIG. 11 depicts certain sub-operations of block 710 of method 700.

FIG. 11 depicts certain sub-operations of block 710 of method 700. Block 710 is generally directed to using the backup proxy 406 to generate a managed backup copy 416 of the DBaaS data and store the copy 416 to cloud and/or non-cloud storage. See also FIGS. 4A-4C. Managed copies 417 are generated in a like fashion after restoring a cloud supplied snapshot 304 to another DBaaS instance 403, which becomes the DBaaS instance targeted for backup. See also FIG. 4F. Block 710 is performed by storage manager 440, unless otherwise noted.

At block 1102, storage manager 440 identifies a data agent 542 in the backup proxy 406 wherein the identified data agent 542 is suitable for the target DBaaS instance 302 that is being backed up. See also FIGS. 5A-5C. Storage manager 440 causes the data agent 542 to execute on the backup proxy 406. For example, storage manager 440 causes data agent 542A to execute and instructs data agent 542A to begin a backup operation in reference to DBMS client 525A and/or DBaaS instance 302A.

At block 1104, the identified data agent activates the client DBMS binary corresponding to the target DBaaS instance. Illustratively, data agent 542A causes DBMS client 525A to execute on backup proxy 406 and establishes a communicative coupling therewith.

At block 1106, the data agent causes the client DBMS binary to instruct the DBaaS instance to extract data to the backup proxy (e.g., to execute a "data dump" command, etc.). Illustratively, data agent 542A instructs client DBMS 525A to establish communications with DBaaS instance 302A; and further instructs client DBMS 525A to transmit one or more commands to DBaaS instance 302A that cause the DBaaS instance 302 to dump data to DBMS client 525A. Illustratively, DBMS-specific APIs are used here by data agent 542A to communicate with DBMS client 525A and likewise, DBMS-specific APIs are used by DBMS client 525A to communicate with DBaaS instance 302A. These commands are typically defined by the DBMS provider and are well known in the art. Once DBMS client 525A has instructed DBaaS instance 302A to extract data and send to backup proxy 406 (e.g., to DBMS instance 525A, to a memory storage location configured on backup proxy 406, etc.), DBaaS instance 302A begins transmitting data according to its own proprietary formatting and segmentation scheme. Typically, data is transmitted in groups of data blocks that are referred to herein as "segments." Different DBaaS instances 302 will have different size segments. The invention is not limited to any particular segment size or format.

At block 1108, as DBaaS data segments are received at the backup proxy 406, the data agent 542A and a media agent 544 that also executes on the backup proxy 406 are pressed into service by storage manager 440 to make backup copies out of the data segments—co-called "segment backup copies." Data agent 542 intercepts data segments are they arrive at backup proxy 406 and/or reads them from a memory/cache location where DBMS client 525 has placed the segment on backup proxy 406. Data agent 542 processes the data segment if so instructed by storage manager 440 and passes the resulting data to media agent 544 for further processing and for forming and storing backup copies. Thus, data agent 542 and media agent 544 are said to collectively process the data segments and generate segment backup copies that are formatted for and stored to secondary storage. Secondary storage is configured on cloud and/or off-cloud, without limitation. See also FIGS. 5A-5C.

At block 1110, media agent 544 stores each segment backup copy 616 to secondary storage as specified by storage manager 440. Media agent 544 tracks and indexes the segment backup copies 616, generating a logical backup copy 416 of the database at the DBaaS instance 302—yet without restoring the full database at the backup proxy 406. Thus, backup proxy 406 acts as a pass-through service for backing up DBaaS databases but is not a repository for database data, whether on its way to secondary storage in a backup operation or vice-versa during a restore/migration.

At block 1112, media agent 544 and/or data agent 542 reports status of the storage management operation to storage manager 440, e.g., success, amount of data processed, etc. Storage manager 440 stores results to management database 646. Additionally, the backup proxy's host VM is powered down unless needed for another storage management operation. As noted earlier, powering down maintains a low-cost profile for the backup proxy and consequently for the data storage management system whose data protection resources are in the backup proxies 406. See also text accompanying block 1008.

Figure 12:
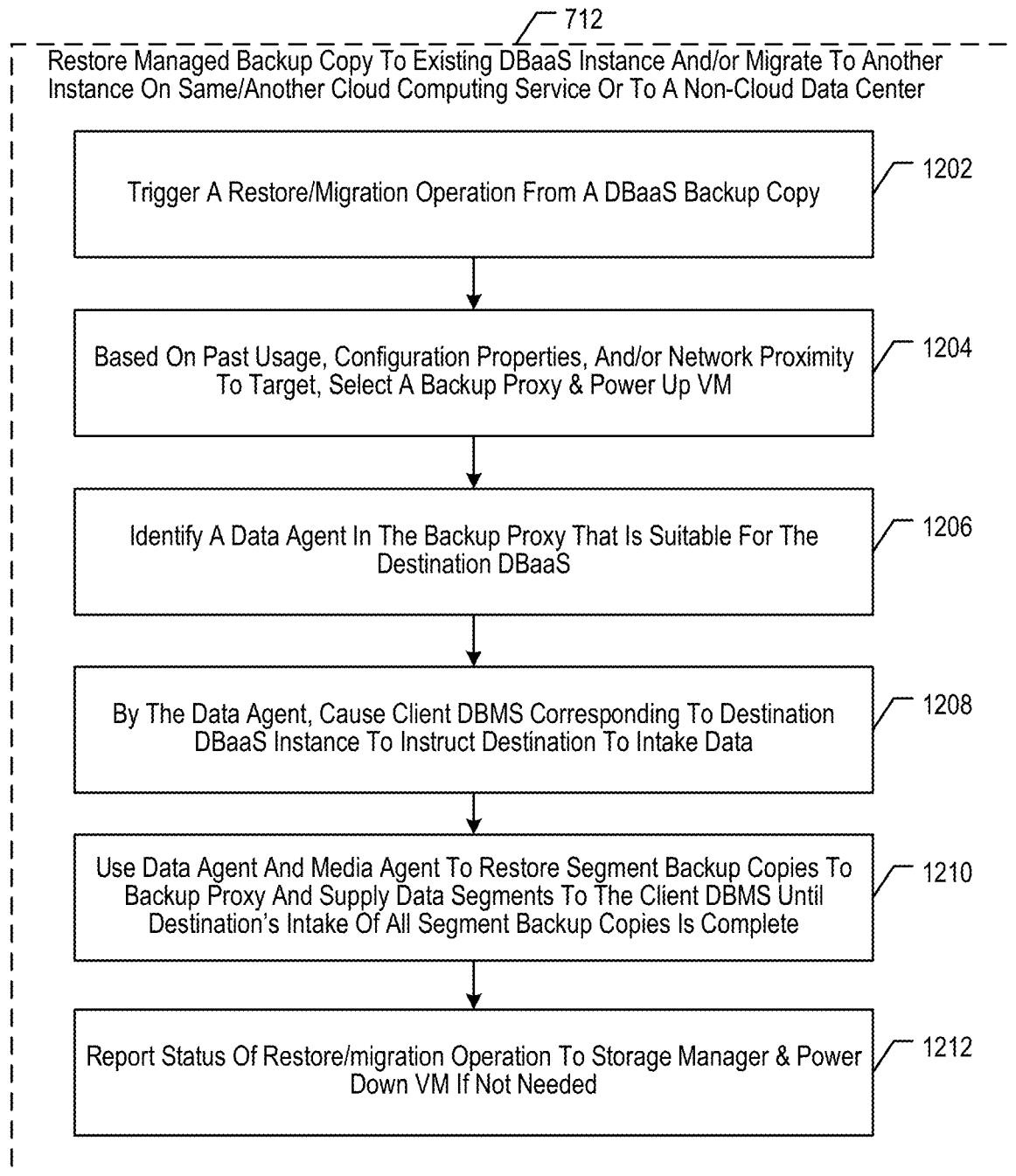
FIG. 12 depicts certain sub-operations of block 712 of method 700.

FIG. 12 depicts certain sub-operations of block 712 of method 700. Block 712 is generally directed to restoring a managed backup copy 416/417 to an existing DBaaS instance 302 and/or migrating to another DBaaS instance 402/422 on the same or another cloud computing service or to a non-cloud data center. See also FIGS. 4D, 4E, 5D. Block 712 is performed by storage manager 440, unless otherwise noted.

At block 1202, storage manager 440 triggers a restore or migration operation from a DBaaS managed backup copy 416/417 to a DBaaS destination instance, e.g., 302, 402, 422. Typically, restore and migration operations are performed on demand as needed, rather than based on trigger criteria like the backup operations at block 1004. However, in some embodiments, migration operations are employed as a vehicle for synchronization or replication of a source DBaaS instance 302 to another DBaaS instance. In such embodiments, there are automatic triggers for the migration operation, such as immediately after the source DBaaS instance 302 has been backup up or using a schedule. These scenarios are useful for maintaining a disaster recovery site or a testbed that is substantially current with the source DBaaS instance 302.

At block 1204, storage manager 440 selects a backup proxy 406, and if necessary, causes its host VM to be powered up. Like in block 1006, selection criteria are employed for choosing a backup proxy 406. See also blocks 1006-1008. In some embodiments, network proximity to the destination DBaaS instance may be used as a criterion for choosing a backup proxy 406 over another, because network proximity (e.g., being in the same cloud computing account) will produce better restore/migration performance.

At block 1206, which is analogous to block 1102, storage manager 440 identifies a data agent 542 in the backup proxy 406 that is suitable for the target DBaaS.

At block 1208, which is analogous to block 1106, the data agent causes a client DBMS binary corresponding to the destination DBaaS to instruct the destination DBaaS instance to intake data from DBMS client 525.

At block 1210, which reverses the backup operation at block 1108, data agent 542 and media agent 544 restore segment backup copies 616 to backup proxy 406 and supply data segments to the client DBMS until the destination's intake of all segment backup copies 616 is complete.

At block 1212, which is analogous to block 1112, media agent 544 and/or data agent 542 report status of the restore/migration operation to storage manager 440. If the VM hosting backup proxy 406 is not needed for another storage management operation, storage manager 440 causes the VM to be powered down.

Figure 13A:
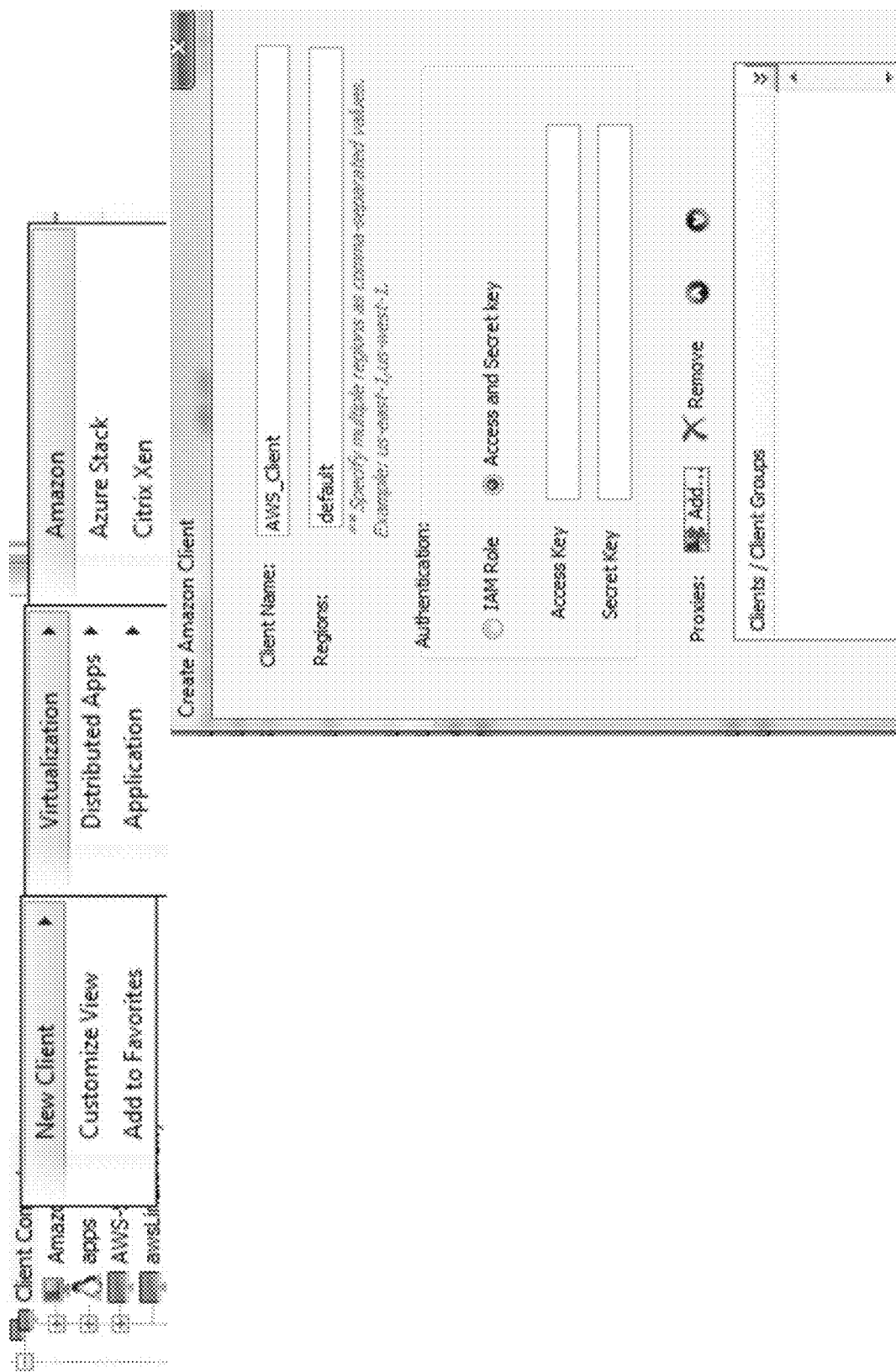
Figure 13B:
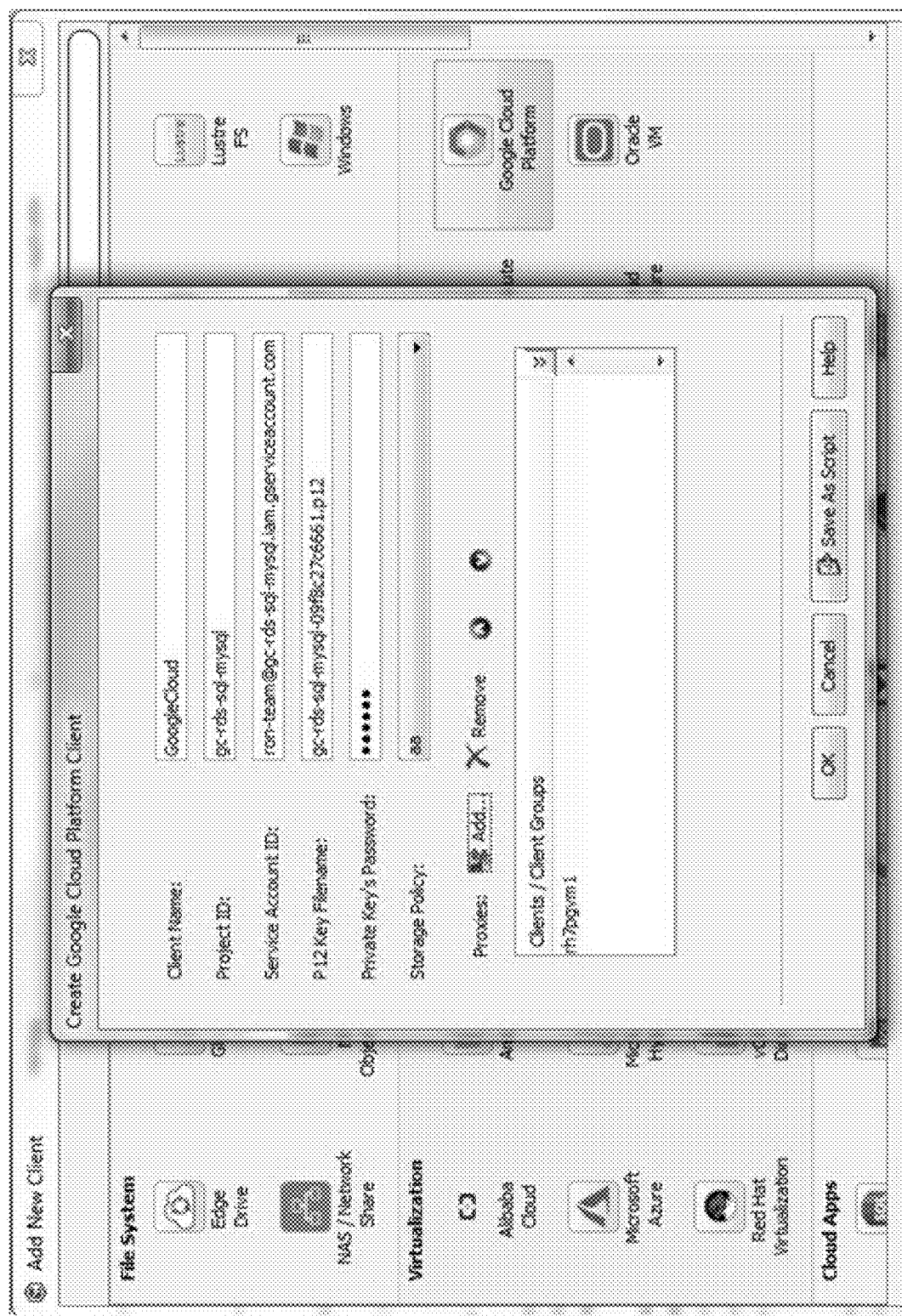
Figure 13C:
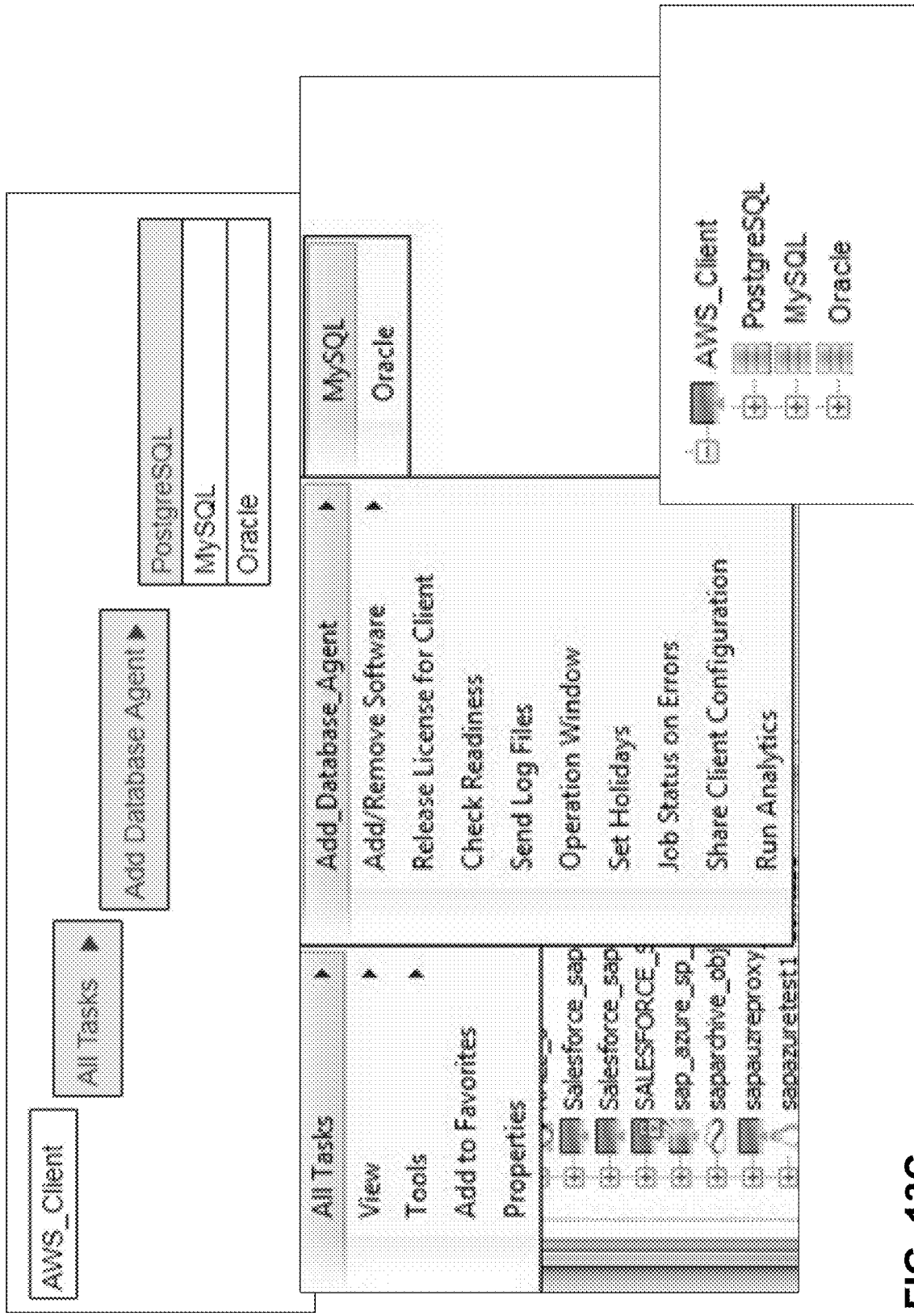
Figure 13D:
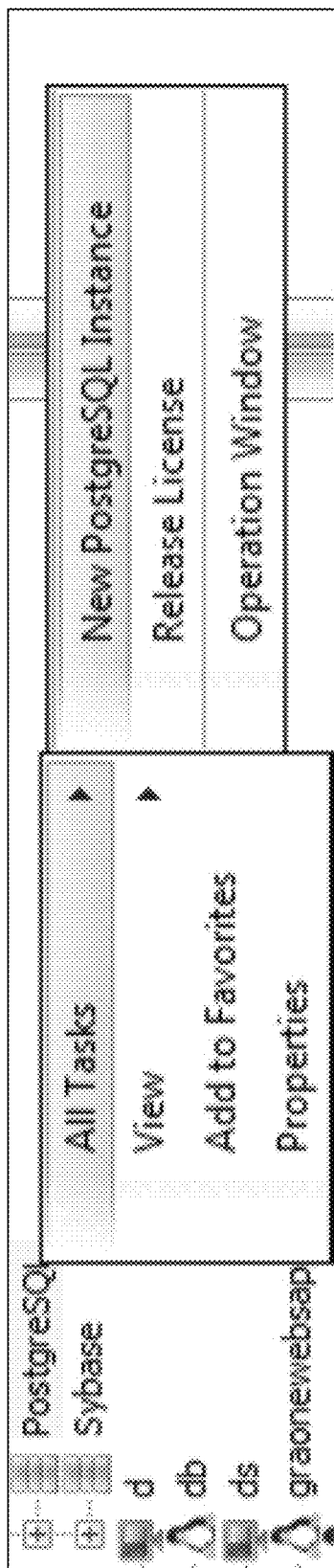
Figure 13E:
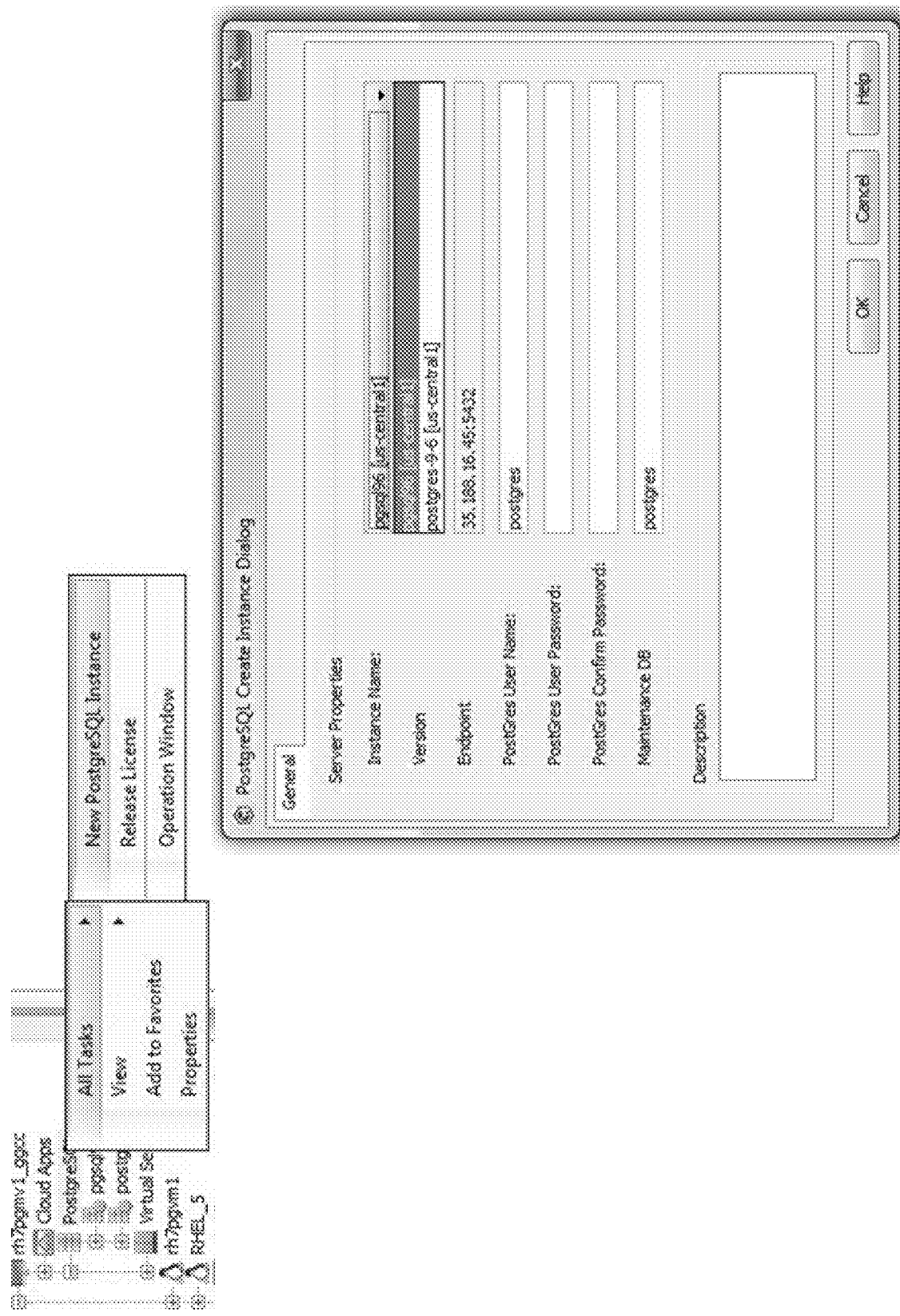
Figure 13F:
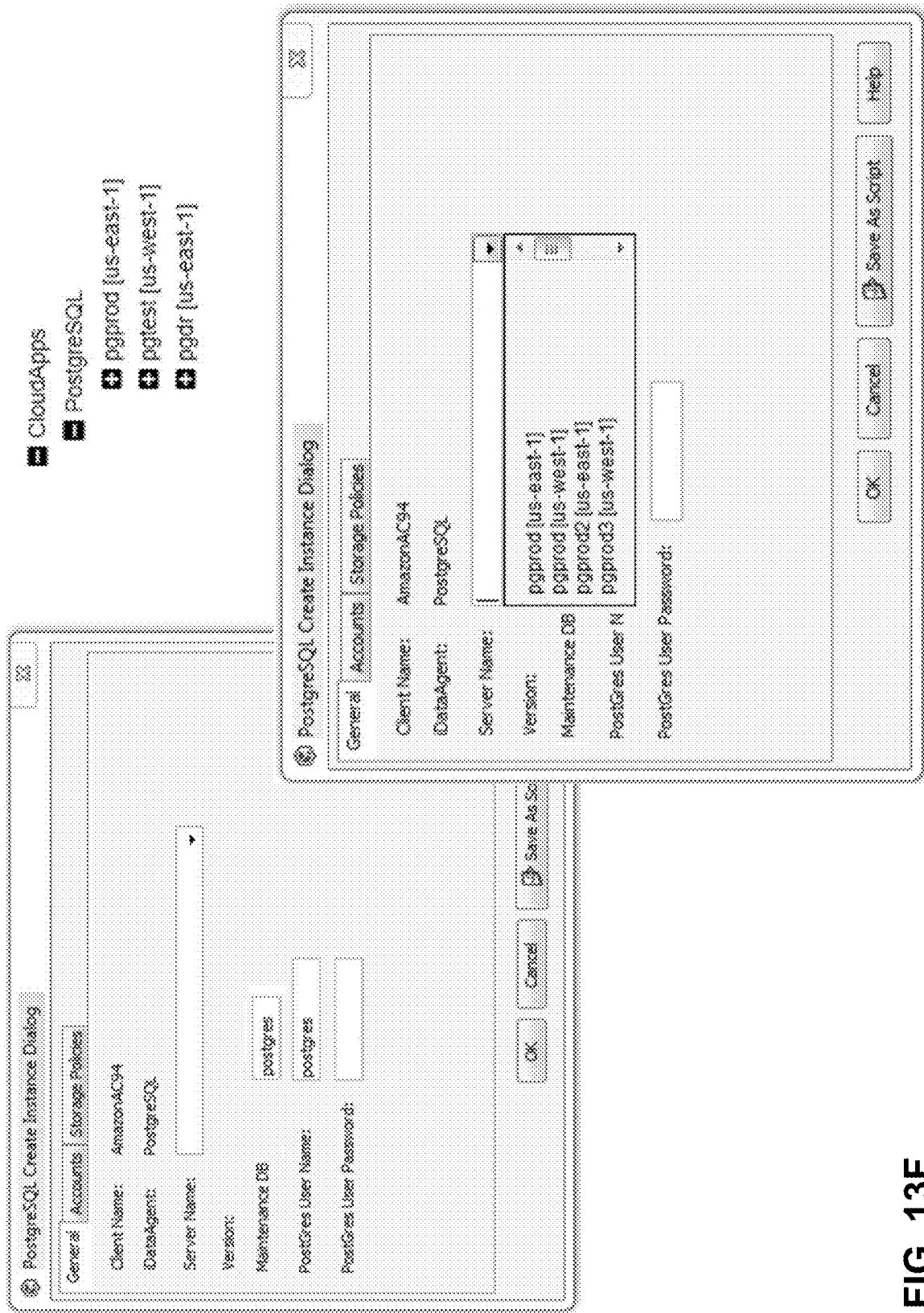

FIGS. 13A-13G depict illustrative screenshots of administrative features, such as in block 706 of method 700. Illustratively, administration manager 658 enables administrators to enter the information into system 400. These screen shots are included here to provide examples of administrative functions of storage manager 440, but they are not limiting. FIG. 13A depicts an administrative screen for adding an AWS client (i.e., for specifying a cloud computing account 301). FIG. 13B depicts an administrative screen for adding a Google Cloud client (i.e., for specifying a cloud computing account 301). FIG. 13C depicts a view of cascading operations for adding database agent (data agent 542) for an AWS client. FIG. 13D depicts a view of cascading operations for adding a CloudDB entity (i.e., corresponding to a DBaaS instance). FIG. 13E depicts an administrative screen for administering a cloudDB entity, e.g., adding properties and access credentials to a PostgreSQL DBaaS instance. FIG. 13F depicts an administrative screen for adding additional information when administering a CloudDB entity, e.g., adding cloud availability zones associated with a PostgreSQL DBaaS instance in an AWS account. FIG. 13G depicts information about different DBaaS instances that is found in a DBaaS catalog. In regard to the figures described herein, other embodiments are possible within the scope of the present invention, such that the above-recited components, steps, blocks, operations, messages, requests, queries, and/or instructions are differently arranged, sequenced, sub-divided, organized, and/or combined. In some embodiments, a different component may initiate or execute a given operation.

In regard to the figures described herein, other embodiments are possible within the scope of the present invention, such that the above-recited components, steps, blocks, operations, and/or messages/requests/queries/instructions are differently arranged, sequenced, sub-divided, organized, and/or combined. In some embodiments, a different component may initiate or execute a given operation.

Example Embodiments

Some example enumerated embodiments of the present invention are recited in this section in the form of methods, systems, and non-transitory computer-readable media, without limitation.

According to an embodiment, a method for using a data storage management system to back up a plurality of database-as-a-service (DBaaS) instances operating in a cloud computing account, the method comprising: by a storage manager, generating a catalog that identifies a type and a version of each DBaaS instance operating in the cloud computing account, wherein the storage manager executes on one of: a virtual machine in the cloud computing account, a virtual machine outside the cloud computing account, and a non-virtualized computing device comprising one or more processors and computer memory; by the storage manager, generating a proxy image comprising: (i) for each type and version of DBaaS instance in the catalog, corresponding executable code for a database management system (DBMS), (ii) executable code for one or more data agents, wherein each data agent is suitable to back up one or more DBMS having executable code in the proxy image, and (iii) executable code for a media agent, wherein the storage manager, the one or more data agents, and the media agent are components of the data storage management system; by the storage manager, causing virtual machines to be instantiated in the cloud computing account, wherein each virtual machine configured with the proxy image is designated a backup proxy; and by the storage manager, administering a pool comprising the backup proxies, wherein the pool is configured to back up, restore, and migrate each DBaaS instance in the catalog.

The above-recited method further comprises: by the storage manager, initiating a backup operation for a first DBaaS instance of a first type by: (I) selecting a first backup proxy from the pool, (II) activating a first DBMS of the first type in the first backup proxy, (III) in the first backup proxy, activating a first data agent that is suitable to back up the first DBMS of the first type, and (IV) activating a first media agent in the first backup proxy; by the first data agent, causing the first DBMS to instruct the first DBaaS instance to extract data from the first DBaaS instance and transmit extracted data to the backup proxy; and by the first data agent and the first media agent at the first backup proxy, processing segments of extracted data received from the first DBaaS instance into corresponding segment backup copies that are stored to secondary storage by the media agent. The above-recited method wherein a logical backup copy of the first DBaaS instance comprises all segment backup copies generated in the backup operation for the first DBaaS instance. The above-recited method wherein the segment backup copies are generated in the backup operation for the first DBaaS instance without first staging all data extracted from the first DBaaS instance at the first backup proxy. The above-recited method migrating the first DBaaS instance of the first type to a second DBaaS instance of the first type comprising: by the storage manager, (1) selecting a second backup proxy from the pool, (2) activating a second DBMS of the first type in the second backup proxy, (3) activating a second data agent in the second backup proxy, wherein the second data agent is suitable to migrate the DBMS of the first type, and (4) activating a second media agent in the second backup proxy; by the second data agent, causing the second DBMS at the second backup proxy to establish communications with the second DBaaS instance; by the second data agent, causing the second DBMS to instruct the second DBaaS instance to receive data from the second backup proxy for populating the second DBaaS instance; by the second data agent and the second media agent at the second backup proxy, processing data from the segment backup copies into restored data segments suitable for the second DBMS to transmit to the second DBaaS instance; and by the second data agent, causing the second DBMS at the second backup proxy to transmit each restored data segment to the second DBaaS instance without first restoring all the segment backup copies to the second backup proxy.

The above-recited method wherein the second DBaaS instance executes in a second cloud availability zone that is different from a first cloud availability zone that hosts the first DBaaS instance. The above-recited method wherein the second DBaaS instance executes in another cloud computing account of a same cloud computing environment as the cloud computing account. The above-recited method further comprises: restoring the first DBaaS instance of the first type comprising: by the storage manager, (1) selecting a second backup proxy from the pool, (2) activating a second DBMS of the first type in the second backup proxy, (3) activating a second data agent in the second backup proxy, wherein the second data agent is suitable to restore the DBMS of the first type, and (4) activating a second media agent in the second backup proxy; by the second data agent, causing the second DBMS at the second backup proxy to establish communications with the first DBaaS instance; by the second data agent, causing the second DBMS to instruct the first DBaaS instance to receive data from the second backup proxy for populating the first DBaaS instance; by the second data agent and the second media agent at the second backup proxy, processing data from the segment backup copies into restored data segments suitable for the second DBMS to transmit to the first DBaaS instance; and by the second data agent, causing the second DBMS at the second backup proxy to transmit each restored data segment to the first DBaaS instance without first restoring all the segment backup copies to the second backup proxy. The above-recited method further comprises: by the storage manager, administering a plurality of cloud-database entities, wherein each cloud-database entity corresponds to a DBaaS instance identified in the catalog; and wherein a backup operation for the first DBaaS instance is initiated based on a preference administered for a first cloud-database entity that corresponds to the first DBaaS instance. The above-recited method further comprises: executing a discovery routine that identifies a changed plurality of DBaaS instances operating in the cloud computing account; by the storage manager, generating an updated catalog based on the changed plurality of DBaaS instances; and by the storage manager, generating an updated proxy image configured for backing up each DBaaS instance in the changed plurality of DBaaS instances.

The above-recited method further comprises: wherein the catalog is generated based on a discovery routine that identifies each DBaaS instance operating in the cloud computing account, and wherein one of: the storage manager executes the discovery routine, and the discovery routine executes on one of the virtual machines designated backup proxies. The above-recited method wherein after all of the first backup copy has been transmitted to the second DBaaS instance, the virtual machine designated the second backup proxy is powered down. The above-recited method wherein a second virtual machine designated the second backup proxy is powered up when the second backup proxy is selected from the pool. The above-recited method wherein the second DBaaS instance executes in the cloud computing account. The above-recited method wherein the second DBaaS instance executes in another cloud computing account of a same cloud computing environment as the cloud computing account. The above-recited method wherein the second DBaaS instance executes in another cloud availability zone of a same cloud computing environment as the cloud computing account. The above-recited method wherein the second DBaaS instance executes in a second cloud computing account of a second cloud computing environment different from a first cloud computing environment that hosts the first DBaaS instance. The above-recited method wherein the second DBaaS instance comprises a DBMS that executes on a virtual machine outside the cloud computing account. The above-recited method wherein the second DBaaS instance comprises a DBMS that executes on a non-virtualized computing device outside the cloud computing account. The above-recited method further comprises: by the storage manager, administering a plurality of cloud-database entities, wherein each cloud-database entity corresponds to a DBaaS instance identified in the catalog; and wherein the backup operation for the first DBaaS instance is initiated based on a preference administered for a first cloud-database entity that corresponds to the first DBaaS instance. The above-recited method wherein after selecting the first backup proxy from the pool, the storage manager causes a first virtual machine designated the first backup proxy to be powered up. The above-recited method wherein after selecting the first backup proxy from the pool, the storage manager determines that a first virtual machine designated the first backup proxy is already powered up. The above-recited method wherein a first virtual machine designated the first backup proxy is powered up when the first backup proxy is selected from the pool. The above-recited wherein the initiating of the backup operation for the first DBaaS instance causes a virtual machine designated the first backup proxy to be powered up. The above-recited method wherein the initiating of the backup operation for the first DBaaS instance causes a virtual machine designated the first backup proxy to be powered up; and wherein ending the backup operation for the first DBaaS instance causes the virtual machine designated the first backup proxy to be powered down. The above-recited method wherein the proxy image based on the catalog enables each backup proxy to back up any DBaaS instance operating in the cloud computing account. The above-recited method wherein the proxy image based on the catalog enables each backup proxy to restore any DBaaS instance operating in the cloud computing account. The above-recited method wherein the proxy image based on the catalog enables each backup proxy to migrate any DBaaS instance operating in the cloud computing account.

According to another embodiment, a data storage management system for backing up a plurality of database-as-a-service (DBaaS) instances operating in a cloud computing account, the system comprising: a storage manager that executes on one of: a virtual machine in the cloud computing account, a virtual machine outside the cloud computing account, and a non-virtualized computing device comprising one or more processors and computer memory; a plurality of virtual machines instantiated in the cloud computing account; wherein the storage manager is configured to: generate a catalog that identifies a type and a version of each DBaaS instance operating in the cloud computing account, generate a proxy image that comprises: (i) for each type and version of DBaaS instance in the catalog, corresponding executable code for a database management system (DBMS), (ii) executable code for one or more data agents, wherein each data agent is suitable to back up one or more DBMS having executable code in the proxy image, and (iii) executable code for a media agent, cause each virtual machine in the plurality of virtual machines to be configured with the proxy image, thereby becoming a backup proxy, administer a pool comprising the backup proxies, and initiate a backup operation for a first DBaaS instance of a first type by: (I) selecting a first backup proxy from the pool, (II) activating a first DBMS of the first type in the first backup proxy, (III) activating a first data agent in the first backup proxy, wherein the first data agent is suitable to back up the first DBMS of the first type, and (IV) activating a first media agent in the first backup proxy; wherein the first data agent and the first media agent at the first backup proxy are configured to process segments of extracted data received from the first DBaaS instance into corresponding segment backup copies that are stored to secondary storage by the first media agent; and wherein a logical backup copy of the first DBaaS instance comprises all segment backup copies generated in the backup operation for the first DBaaS instance.

The above-recited system wherein the first data agent is configured to: cause the first DBMS to instruct the first DBaaS instance to extract data from the first DBaaS instance and transmit the extracted data to the first backup proxy. The above-recited system wherein the segment backup copies are generated in the backup operation for the first DBaaS instance without first staging all extracted data received from the DBaaS instance at the first backup proxy. The above-recited system wherein the storage manager is further configured to: initiate a migration operation for the first DBaaS instance of the first type to a second DBaaS instance of the first type by: (1) selecting a second backup proxy from the pool, (2) activating a second DBMS of the first type in the second backup proxy, (3) activating a second data agent in the second backup proxy, wherein the second data agent is suitable to migrate the DBMS of the first type, and (4) activating a second media agent in the second backup proxy; wherein the second data agent is configured to cause the second DBMS at the second backup proxy to establish communications with the second DBaaS instance, and further to cause the second DBMS to instruct the second DBaaS instance to receive data from the second backup proxy for populating the second DBaaS instance; and wherein the second data agent and the second media agent at the second backup proxy are configured to process data from the logical backup copy of the first DBaaS instance into restored data segments suitable for the second DBMS to transmit to the second DBaaS instance; and by the second data agent, causing the second DBMS at the second backup proxy to transmit each restored data segment to the second DBaaS instance without first restoring the logical backup copy in its entirety to the second backup proxy. The above-recited system wherein the secondary storage comprising the segment backup copies operates in one or more of: the cloud computing account, another cloud computing account, a data storage device outside a cloud computing environment that provides the cloud computing account. The above-recited system wherein the second DBaaS instance executes in another cloud computing account of a same cloud computing environment as the cloud computing account. The above-recited system wherein the second DBaaS instance executes in one of: the cloud computing account and another cloud availability zone of a same cloud computing environment as the cloud computing account. The above-recited system wherein the second DBaaS instance comprises a DBMS that executes on one of: a virtual machine outside the cloud computing account and a non-virtualized computing device outside the cloud computing account. The above-recited system wherein the catalog is generated based on a discovery routine that identifies the plurality of DBaaS instances operating in the cloud computing account, and wherein the discovery routine executes on one of: the storage manager and one of the backup proxies.

According to yet another embodiment, a method for using a data storage management system to migrate database-as-a-service (DBaaS) instances from one cloud computing environment to another, comprises: by a storage manager, generating a catalog that identifies a type and a version of each DBaaS instance operating in a cloud computing account, wherein the storage manager executes on one of: a virtual machine in the cloud computing account, a virtual machine outside the cloud computing account, and a non-virtualized computing device comprising one or more processors and computer memory; by the storage manager, generating a proxy image configured for backing up any of the DBaaS instances in the catalog, wherein the proxy image comprises: (i) for each type and version of DBaaS instance in the catalog, corresponding executable code for a database management system (DBMS), (ii) executable code for one or more data agents, wherein each data agent is suitable to back up one or more DBMS having executable code in the proxy image, and (iii) executable code for a media agent, wherein the storage manager, the one or more data agents, and the media agent are components of the data storage management system; by the storage manager, designating virtual machines instantiated in the cloud computing account and configured with the proxy image as backup proxies; and by the storage manager, administering a pool comprising the backup proxies; by the storage manager, initiating a backup operation for a first DBaaS instance of a first type by: (a) activating a first media agent in a first backup proxy selected from the pool, and (b) in the first backup proxy, activating a first DBMS of the first type and a first data agent that is suitable to back up the first DBMS of the first type, wherein the first data agent and the first media agent at the first backup proxy process segments of extracted data received from the first DBaaS instance into corresponding segment backup copies that are stored by the media agent to one or more storage resources; by the storage manager, initiating a migration operation for the first DBaaS instance of the first type to a second DBaaS instance of the first type by: (1) activating a second media agent in a second backup proxy selected from the pool, (2) in the second backup proxy, activating a second DBMS of the first type and a second data agent that is suitable to migrate the DBMS of the first type; by the second data agent and the second media agent at the second backup proxy, processing data from the segment backup copies into restored data segments that are suitable for the second DBMS to transmit to the second DBaaS instance; by the second data agent, causing the second DBMS at the second backup proxy to transmit each restored data segment to the second DBaaS instance without first restoring all the segment backup copies to the second backup proxy; and wherein, using data restored from the first DBaaS instance, the second DBaaS instance executes in a second cloud computing environment that is different from a first cloud computing environment that provides the first cloud computing account.

The above-recited method further comprises: by the first data agent, causing the first DBMS to instruct the first DBaaS instance to extract data from the first DBaaS instance and transmit extracted data to the backup proxy. The above-recited method further comprises: by the second data agent, causing the second DBMS at the second backup proxy to establish communications with the second DBaaS instance; and by the second data agent, causing the second DBMS to instruct the second DBaaS instance to receive data from the second backup proxy for populating the second DBaaS instance. The above-recited method wherein a logical backup copy of the first DBaaS instance comprises all segment backup copies generated in the backup operation for the first DBaaS instance. The above-recited method wherein the segment backup copies are generated in the backup operation for the first DBaaS instance without first staging all data extracted from the DBaaS instance at the first backup proxy. The above-recited method wherein the second DBaaS instance executes in one of: the cloud computing account and another cloud availability zone of a same cloud computing environment as the cloud computing account. The above-recited method wherein a first virtual machine designated the first backup proxy is powered up when the first backup proxy is selected from the pool. The above-recited method wherein the first virtual machine designated the first backup proxy is powered down when the backup operation is completed. The above-recited method further comprises: by the storage manager, administering a plurality of cloud-database entities, wherein each cloud-database entity corresponds to a DBaaS instance identified in the catalog; and wherein a backup operation for the first DBaaS instance is initiated based on a preference administered for a first cloud-database entity that corresponds to the first DBaaS instance.

The above-recited method further comprises: executing a discovery routine that identifies a changed plurality of DBaaS instances operating in the cloud computing account; by the storage manager, generating an updated catalog based on the changed plurality of DBaaS instances; by the storage manager, generating an updated proxy image configured for backing up any of the DBaaS instances in the changed plurality of DBaaS instances; and wherein one of: the storage manager executes the discovery routine, and the discovery routine executes on one of the virtual machines designated backup proxies. The above-recited method wherein the catalog is generated based on a discovery routine that identifies each DBaaS instance operating in the cloud computing account.

According to an exemplary embodiment, a data storage management system for migrating database-as-a-service (DBaaS) instances from one cloud computing environment to another comprises: a storage manager that executes on one of: a virtual machine in a cloud computing account, a virtual machine outside the cloud computing account, and a non-virtualized computing device comprising one or more processors and computer memory; wherein the storage manager is configured to: generate a proxy image that comprises: (i) for each type and version of DBaaS instance in a catalog that identifies a type and a version of each DBaaS instance operating in the cloud computing account, corresponding executable code for a database management system (DBMS), (ii) executable code for one or more data agents, wherein each data agent is suitable to back up one or more DBMS having executable code in the proxy image, and (iii) executable code for a media agent, designate virtual machines instantiated in the cloud computing account and configured with the proxy image as backup proxies, administer a pool comprising the backup proxies, initiate a backup operation for a first DBaaS instance of a first type by: (a) activating a first media agent in a first backup proxy selected by the storage manager from the pool, and (b) in the first backup proxy, activating a first DBMS of the first type and a first data agent that is suitable to back up the first DBMS of the first type; wherein the first data agent and the first media agent at the first backup proxy are configured to process segments of extracted data received from the first DBaaS instance into corresponding segment backup copies that are stored by the media agent to one or more storage resources, and wherein a logical backup copy of the first DBaaS instance comprises all segment backup copies generated in the backup operation for the first DBaaS instance; wherein the storage manager is further configured to initiate a migration operation for the first DBaaS instance of the first type to a second DBaaS instance of the first type by: (1) activating a second media agent in a second backup proxy selected from the pool, and (2) in the second backup proxy, activating a second DBMS of the first type and a second data agent that is suitable to migrate the DBMS of the first type; wherein the second data agent and the second media agent at the second backup proxy are configured to process data from the logical backup copy of the first DBaaS instance into restored data segments suitable for the second DBMS to transmit to the second DBaaS instance; wherein the second data agent is further configured to cause the second DBMS at the second backup proxy to transmit each restored data segment to the second DBaaS instance without first restoring the logical backup copy in its entirety to the second backup proxy; and wherein the migration operation results in the second DBaaS instance using data restored from the first DBaaS instance to execute in a second cloud computing environment that is different from a first cloud computing environment that provides the first cloud computing account.

The above-recited system wherein the second data agent is further configured to cause the second DBMS at the second backup proxy to establish communications with the second DBaaS instance, and further to cause the second DBMS to instruct the second DBaaS instance to receive the restored data segments from the second backup proxy for populating the second DBaaS instance. The above-recited system wherein the first data agent is configured to: cause the first DBMS to instruct the first DBaaS instance to extract data from the first DBaaS instance and transmit the extracted data to the first backup proxy. The above-recited system wherein the segment backup copies are generated in the backup operation for the first DBaaS instance without first staging all extracted data received from the first DBaaS instance at the first backup proxy. The above-recited system wherein the pool is configured to back up, restore, and migrate each DBaaS instance in the catalog. The above-recited system wherein the storage manager is further configured to initiate a secondary copy operation wherein the logical backup copy of the first DBaaS instance is copied to one or more storage devices operating outside the second cloud computing environment and also outside the first cloud computing environment that provides the first cloud computing account. The above-recited system wherein the storage manager is further configured to initiate a secondary copy operation wherein the logical backup copy of the first DBaaS instance is copied to one or more storage devices operating outside the cloud computing account. The above-recited system wherein the catalog is generated based on a discovery routine that identifies each DBaaS instance operating in the cloud computing account, and wherein the discovery routine executes on one of: the storage manager and one of the backup proxies. The above-recited system wherein the one or more storage resources operate in the second cloud computing environment.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

TERMINOLOGY

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method comprising:
cataloguing database-as-a-service (DBaaS) instances operating in a cloud computing account into a catalog that identifies a type and a version of each of the DBaaS instances,
wherein the cataloguing is performed by a first computing device that comprises one or more hardware processors and is configured as one of: a virtual machine in the cloud computing account, a virtual machine outside the cloud computing account, and a non-virtualized computing device;
by the first computing device, generating a proxy image that comprises executable code for a database management system (DBMS) corresponding to each type and version of DBaaS instance in the catalog, and that further comprises executable code for backing up one or more DBMSs having executable code in the proxy image;
by the first computing device, configuring a pool of backup proxies, wherein each backup proxy in the pool is a virtual machine that is configured with the proxy image and is hosted by a host computing device in the cloud computing account;
by the first computing device, initiating a backup operation for a first DBaaS instance of a first type by: (a) activating a first backup proxy selected from the pool, and (b) in the first backup proxy, activating a first DBMS of the first type;
by the first backup proxy, backing up data received from the first DBaaS instance into segment backup copies that are stored by the first backup proxy to one or more storage resources;
by the first computing device, initiating a migration of the first DBaaS instance by: (i) activating a second backup proxy selected from the pool, and (ii) in the second backup proxy, activating a second DBMS of the first type;
restoring, to the second backup proxy, each segment backup copy into one or more restored data segments;
by the second backup proxy, without first restoring all of the segment backup copies to the second backup proxy, causing the second DBMS to transmit each restored data segment to a second DBaaS instance,
wherein the second DBaaS instance is of the first type and executes in one of: another cloud availability zone of a first cloud computing environment that provides the cloud computing account, and a second cloud computing environment that is different from the first cloud computing environment.

2. The method of claim 1, further comprising:
by the first backup proxy, causing the first DBMS to instruct the first DBaaS instance to extract data from the first DBaaS instance and to transmit the data to the first backup proxy.

3. The method of claim 1, further comprising:
by the second backup proxy, causing the second DBMS to establish communications with the second DBaaS instance; and
by the second backup proxy, causing the second DBMS to instruct the second DBaaS instance to populate the second DBaaS instance with restored data segments received from the second backup proxy.

4. The method of claim 1, wherein a logical backup copy of the first DBaaS instance comprises all segment backup copies generated in the backup operation for the first DBaaS instance.

5. The method of claim 1, wherein the segment backup copies are generated in the backup operation for the first DBaaS instance without first staging, at the first backup proxy, all data received from the first DBaaS instance.

6. The method of claim 1, wherein a first virtual machine designated the first backup proxy is powered up when the first backup proxy is selected from the pool.

7. The method of claim 6, wherein the first virtual machine designated the first backup proxy is powered down when the backup operation is completed.

8. The method of claim 1, wherein the backup operation for the first DBaaS instance is initiated based on a preference associated with a first cloud-database entity, which is administered in a database associated with the first computing device, wherein the first cloud-database entity corresponds to the first DBaaS instance.

9. The method of claim 1, further comprising:
executing a discovery routine that identifies a changed plurality of DBaaS instances operating in the cloud computing account, wherein the discovery routine is executed by one of: the first computing device and one of the backup proxies in the pool;
generating an updated catalog based on the changed plurality of DBaaS instances; and
by the first computing device, generating an updated proxy image that comprises for each type and version of DBaaS instance in the updated catalog, corresponding executable code for a database management system (DBMS), and further comprises executable code for backing up one or more DBMSs having executable code in the updated proxy image.

10. The method of claim 1, wherein the executable code for backing up one or more DBMSs having executable code in the proxy image comprises one or more of: executable code for a media agent, and executable code for one or more data agents, wherein each data agent is suitable for backing up one or more DBMSs having executable code in the proxy image;
wherein a data agent selected for the backup operation for the first DBaaS instance is configured to receive the data received by the first backup proxy from the first DBaaS instance; and
wherein the media agent selected for the backup operation for the first DBaaS instance is configured to store the segment backup copies to the one or more storage resources.

11. A system comprising:
a first computing device that comprises one or more hardware processors and is configured as one of: a virtual machine in a cloud computing account, a virtual machine outside the cloud computing account, and a non-virtualized computing device, wherein the first computing device is further configured to:
generate a catalog of database-as-a-service (DBaaS) instances operating in the cloud computing account, wherein the catalog identifies a type and a version of each of the DBaaS instances, generate a proxy image that comprises executable code for a database management system (DBMS) corresponding to each type and version of DBaaS instance in the catalog, and further comprises executable code for backing up one or more DBMSs having executable code in the proxy image;

configure a pool of backup proxies, wherein each backup proxy in the pool is a virtual machine that is configured with the proxy image and is hosted by a host computing device in the cloud computing account;

initiate a backup operation for a first DBaaS instance of a first type by: (a) activating a first backup proxy selected from the pool, and (b) in the first backup proxy, activating a first DBMS of the first type;

wherein the first backup proxy is configured to:
back up data received from the first DBaaS instance into segment backup copies, and
store the segment backup copies to one or more storage resources;

wherein the first computing device is further configured to: initiate a migration of the first DBaaS instance by: (i) activating a second backup proxy selected from the pool, and (ii) in the second backup proxy, activating a second DBMS of the first type;

wherein the second backup proxy is configured to:
restore, to the second backup proxy, each segment backup copy into one or more restored data segments, and
without first restoring all of the segment backup copies to the second backup proxy, cause the second DBMS to transmit each restored data segment to a second DBaaS instance; and wherein the second DBaaS instance is of the first type and executes in one of: another cloud availability zone of a first cloud computing environment that provides the cloud computing account, and a second cloud computing environment that is different from the first cloud computing environment.

12. The system of claim 11, wherein the pool is configured to back up, restore, and migrate each DBaaS instance in the catalog.

13. The system of claim 11, further comprising:
wherein the first backup proxy is configured to: cause the first DBMS to instruct the first DBaaS instance to extract data from the first DBaaS instance and to transmit the data to the first backup proxy.

14. The system of claim 11, further comprising:
wherein the second backup proxy is configured to: cause the second DBMS to instruct the second DBaaS instance to populate the second DBaaS instance with restored data segments received from the second backup proxy.

15. The system of claim 11, wherein a logical backup copy of the first DBaaS instance comprises all segment backup copies generated in the backup operation for the first DBaaS instance, and wherein the first computing device is further configured to: initiate a secondary copy operation that copies the logical backup copy of the first DBaaS instance to one or more storage resources operating outside the cloud computing account.

16. The system of claim 11, wherein the segment backup copies are generated in the backup operation for the first DBaaS instance without first staging, at the first backup proxy, all data received from the first DBaaS instance.

17. The system of claim 11, wherein a first virtual machine designated the first backup proxy is powered up when the first backup proxy is selected from the pool, and further wherein the first virtual machine designated the first backup proxy is powered down when the backup operation is completed.

18. The system of claim 11, wherein the backup operation for the first DBaaS instance is initiated based on a preference associated with a first cloud-database entity, which is administered in a database associated with the first computing device, wherein the first cloud-database entity corresponds to the first DBaaS instance.

19. The system of claim 11, wherein one of: the first computing device and one of the backup proxies in the pool is configured to: execute a discovery routine that identifies a changed plurality of DBaaS instances operating in the cloud computing account; and wherein the first computing device is further configured to:
generate an updated catalog based on the changed plurality of DBaaS instances, and
generate an updated proxy image that comprises for each type and version of DBaaS instance in the updated catalog, corresponding executable code for a database management system (DBMS), and further comprises executable code for backing up one or more DBMSs having executable code in the updated proxy image.

20. The system of claim 11, wherein the executable code for backing up one or more DBMSs having executable code in the proxy image comprises one or more of: executable code for a media agent, and executable code for one or more data agents, wherein each data agent is suitable for backing up one or more DBMSs having executable code in the proxy image;

wherein a data agent selected for the backup operation for the first DBaaS instance is configured to receive the data received by the first backup proxy from the first DBaaS instance; and wherein the media agent selected for the backup operation for the first DBaaS instance is configured to store the segment backup copies to the one or more storage resources.

\* \* \* \* \*